United States Patent
Erickson et al.

(10) Patent No.: US 12,485,134 B2
(45) Date of Patent: Dec. 2, 2025

(54) USE OF NICOTINAMIDE RIBOSIDE, NICOTINIC ACID RIBOSIDE, REDUCED NICOTINYL RIBOSIDE COMPOUNDS, AND NICOTINYL RIBOSIDE COMPOUND DERIVATIVES IN FORMULATIONS

(71) Applicant: ChromaDex Inc., Irvine, CA (US)

(72) Inventors: Aron Erickson, Longmont, CO (US); Amanda Storjohann, Westminster, CO (US); Philip Redpath, Longmont, CO (US); Matthew Roberts, Woodland Hills, CA (US)

(73) Assignee: ChromaDex Inc., Los Angeles, CA (US)

( * ) Notice: Subject to any disclaimer, the term of this patent is extended or adjusted under 35 U.S.C. 154(b) by 595 days.

(21) Appl. No.: 16/798,207

(22) Filed: Feb. 21, 2020

(65) Prior Publication Data

US 2020/0268778 A1 Aug. 27, 2020

Related U.S. Application Data

(60) Provisional application No. 62/808,802, filed on Feb. 21, 2019.

(51) Int. Cl.
| | | |
|---|---|---|
| *A61K 31/706* | (2006.01) | |
| *A61K 9/00* | (2006.01) | |
| *A61K 9/14* | (2006.01) | |
| *A61K 45/06* | (2006.01) | |
| *A61K 47/44* | (2017.01) | |

(52) U.S. Cl.
CPC .......... *A61K 31/706* (2013.01); *A61K 9/0056* (2013.01); *A61K 9/14* (2013.01); *A61K 45/06* (2013.01); *A61K 47/44* (2013.01)

(58) Field of Classification Search
CPC .......... A61K 9/14; A61K 47/44; A23L 33/13; A23L 33/17
See application file for complete search history.

(56) References Cited

U.S. PATENT DOCUMENTS

| | | |
|---|---|---|
| 5,213,810 A | 5/1993 | Steber |
| 6,340,671 B1 | 1/2002 | Cody et al. |
| 7,794,752 B1 | 9/2010 | Dietrich et al. |
| 2003/0232091 A1 | 12/2003 | Shefer |
| 2007/0053858 A1* | 3/2007 | Tanner .................. A61Q 19/00 424/70.13 |
| 2016/0374908 A1 | 12/2016 | Hakozaki et al. |
| 2016/0374918 A1 | 12/2016 | Dihora et al. |
| 2017/0296564 A1 | 10/2017 | Dellinger et al. |
| 2017/0304338 A1 | 10/2017 | Dellinger et al. |
| 2018/0071273 A1 | 3/2018 | Horn |

FOREIGN PATENT DOCUMENTS

| | | |
|---|---|---|
| WO | 2007150047 A1 | 12/2007 |
| WO | 2015127007 A1 | 8/2015 |
| WO | 2015186114 A1 | 12/2015 |
| WO | 2016014927 A2 | 1/2016 |
| WO | 2017/004100 A1 | 1/2017 |
| WO | 2017045966 A1 | 3/2017 |

* cited by examiner

*Primary Examiner* — Genevieve S Alley
(74) *Attorney, Agent, or Firm* — Amin Wasserman Gurnani LLP; George M. Carrera, Jr.; José J. Aparicio

(57) ABSTRACT

Methods for stabilizing or encapsulating at least one compound selected from the group consisting of nicotinamide riboside (NR), nicotinic acid riboside (NAR), nicotinamide mononucleotide (NMN), nicotinic acid mononucleotide (NaMN), derivatives thereof, or salts thereof, are provided. Compositions including wax prills, stabilized, or encapsulated forms of at least one compound selected from the group consisting of nicotinamide riboside (NR), nicotinic acid riboside (NAR), and nicotinamide mononucleotide (NMN), derivatives thereof, or salts thereof, are also provided.

11 Claims, 27 Drawing Sheets

USE OF NICOTINAMIDE RIBOSIDE, NICOTINIC ACID RIBOSIDE, REDUCED NICOTINYL RIBOSIDE COMPOUNDS, AND NICOTINYL RIBOSIDE COMPOUND DERIVATIVES IN FORMULATIONS

This application claims the benefit of U.S. Provisional application No. 62/808,802 filed on Feb. 21, 2019, which is hereby incorporated by reference herein in its entirety.

TECHNICAL FIELD

In certain embodiments, the present invention relates to methods for binding proteins directly to and stabilizing at least one compound selected from the group consisting of NR, NAR, NaMN, and NMN, derivatives thereof, or salts thereof, in liquid. In further embodiments, the invention relates to compositions including proteins bound directly to at least one compound selected from the group consisting of NR, NAR, NaMN, and NMN, derivatives thereof, or salts thereof. In further embodiments, the invention relates to compositions including proteins bound directly to at least one compound selected from the group consisting of NR, NAR, NaMN, and NMN, derivatives thereof, or salts thereof, alone or in combination with at least one of thiamine (vitamin B1), riboflavin (vitamin B2), niacin (vitamin B3), pyridoxine (vitamin B6), biotin (vitamin B7), folic acid (vitamin B9), cobalamin (vitamin B12), retinol (vitamin $A_1$), ascorbic acid (vitamin C), cholecalciferol (vitamin $D_3$), ergocalciferol (vitamin $D_2$), alpha-tocopherol (vitamin E), and phytomenadione (vitamin $K_1$). In further embodiments, the invention relates to methods for encapsulating at least one compound selected from the group consisting of NR, NAR, NaMN, and NMN, derivatives thereof, or salts thereof, alone or in combination with at least one of thiamine (vitamin B1), riboflavin (vitamin B2), niacin (vitamin B3), pyridoxine (vitamin B6), biotin (vitamin B7), folic acid (vitamin B9), cobalamin (vitamin B12), retinol (vitamin $A_1$), ascorbic acid (vitamin C), cholecalciferol (vitamin $D_3$), ergocalciferol (vitamin $D_2$), alpha-tocopherol (vitamin E), and phytomenadione (vitamin $K_1$). In further embodiments, the invention relates to methods for encapsulating at least one compound selected from the group consisting of NR, NAR, NaMN, and NMN, derivatives thereof, or salts thereof, alone or in combination with at least one of thiamine (vitamin B1), riboflavin (vitamin B2), niacin (vitamin B3), pyridoxine (vitamin B6), biotin (vitamin B7), folic acid (vitamin B9), cobalamin (vitamin B12), retinol (vitamin $A_1$), ascorbic acid (vitamin C), cholecalciferol (vitamin $D_3$), ergocalciferol (vitamin $D_2$), alpha-tocopherol (vitamin E), and phytomenadione (vitamin $K_1$) in alginate beads. In further embodiments, the invention relates to compositions including encapsulated beads including at least one compound selected from the group consisting of NR, NAR, NaMN, and NMN, derivatives thereof, or salts thereof, alone or in combination with at least one of thiamine (vitamin B1), riboflavin (vitamin B2), niacin (vitamin B3), pyridoxine (vitamin B6), biotin (vitamin B7), folic acid (vitamin B9), cobalamin (vitamin B12), retinol (vitamin $A_1$), ascorbic acid (vitamin C), cholecalciferol (vitamin $D_3$), ergocalciferol (vitamin $D_2$), alpha-tocopherol (vitamin E), and phytomenadione (vitamin $K_1$), wherein the at least one compound selected from the group consisting of NR, NAR, NaMN, and NMN, derivatives thereof, or salts thereof, hydrolyzes less when the encapsulated beads are added to water compared to the at least one compound selected from the group consisting of NR, NAR, NaMN, and NMN, derivatives thereof, or salts thereof, added to water without encapsulation. In further embodiments, the invention relates to compositions including encapsulated alginate beads including at least one compound selected from the group consisting of NR, NAR, NaMN, and NMN, derivatives thereof, or salts thereof, alone or in combination with at least one of thiamine (vitamin B1), riboflavin (vitamin B2), niacin (vitamin B3), pyridoxine (vitamin B6), biotin (vitamin B7), folic acid (vitamin B9), cobalamin (vitamin B12), retinol (vitamin $A_1$), ascorbic acid (vitamin C), cholecalciferol (vitamin $D_3$), ergocalciferol (vitamin $D_2$), alpha-tocopherol (vitamin E), and phytomenadione (vitamin $K_1$), wherein the at least one compound selected from the group consisting of NR, NAR, NaMN, and NMN, derivatives thereof, or salts thereof, hydrolyzes less when the encapsulated alginate beads are added to water compared to the at least one compound selected from the group consisting of NR, NAR, NaMN, and NMN, derivatives thereof, or salts thereof, added to water without encapsulation. In further embodiments, the invention relates to methods for prilling at least one compound selected from the group consisting of NR, NAR, NaMN, and NMN, derivatives thereof, or salts thereof, alone or in combination with at least one of thiamine (vitamin B1), riboflavin (vitamin B2), niacin (vitamin B3), pyridoxine (vitamin B6), biotin (vitamin B7), folic acid (vitamin B9), cobalamin (vitamin B12), retinol (vitamin $A_1$), ascorbic acid (vitamin C), cholecalciferol (vitamin $D_3$), ergocalciferol (vitamin $D_2$), alpha-tocopherol (vitamin E), and phytomenadione (vitamin $K_1$), in combination with a molten solid, slurry, or solution, so as to produce solidified liquid compositions. In further embodiments, the invention relates to compositions prepared by prilling at least one compound selected from the group consisting of NR, NAR, NaMN, and NMN, derivatives thereof, or salts thereof, alone or in combination with at least one of thiamine (vitamin B1), riboflavin (vitamin B2), niacin (vitamin B3), pyridoxine (vitamin B6), biotin (vitamin B7), folic acid (vitamin B9), cobalamin (vitamin B12), retinol (vitamin $A_1$), ascorbic acid (vitamin C), cholecalciferol (vitamin $D_3$), ergocalciferol (vitamin $D_2$), alpha-tocopherol (vitamin E), and phytomenadione (vitamin $K_1$), in combination with a molten solid, slurry, or solution.

BACKGROUND

Vitamin B3, and other B-vitamins such as thiamine (vitamin B1), riboflavin (vitamin B2), and pyridoxine (vitamin B6) are extracted in their coenzyme forms from foodstuffs. During digestion, the coenzymes are catabolized to the free circulating vitamins, which are then passively or actively transported across membranes, and salvaged intracellularly to their respective cofactors. Mammals are entirely reliant on a dietary source of vitamin B1 and heavily dependent on the dietary supply of vitamins B2, B3, and B6. Of note, acute deficiencies in vitamin B1 and vitamin B3 affect identical organs, with identical outcomes if left untreated: dementia and death.

During normal healthy development, it is critical that an infant receive the proper essential nutrients. Human breast milk is the most suitable for delivery of these essential nutrients as long as the maternal diet is adequate and human breast milk is in adequate supply. Therefore, knowledge of the composition of human breast milk, coupled with the nutrient intakes of healthy young infants, is essential to understanding nutritional requirements of human babies. This knowledge is also key to producing appropriate substitutes (i.e., infant formula) when human breast milk is not fed to an infant, irrespective of the reason for not feeding human breast milk to an infant.

Water-soluble vitamins are a vital component of human milk. However, the vitamin content of human milk can be affected by numerous factors, chief among them the nutritional status of the mother. In general, when maternal vitamin intakes are low, this corresponds to low vitamin content in the breast milk. See, e.g., M. F. Picciano, *Human Milk: Nutritional Aspects of a Dynamic Food*, 74 NEONATOLOGY 84 (1998), incorporated by reference here in its entirety. Thus, these women and infants would be candidates for supplementation with vitamins and/or infant formula. Vitamin B3s are among the essential water soluble vitamins found naturally in human breast milk. See Picciano, 1998. Vitamin B3s, along with the essential amino acid tryptophan, play an essential role in biology as nicotinamide adenine dinucleotide ("NAD$^+$") precursors.

The dietary vitamin B3, which encompasses nicotinamide ("Nam" or "NM"), nicotinic acid ("NA"), and nicotinamide riboside ("NR"), is a precursor to the coenzyme nicotinamide adenine dinucleotide (NAD$^+$), its phosphorylated parent ("NADP$^+$" or "NAD(P)$^+$"), and their respective reduced forms ("NADH" and "NADPH," respectively).

Eukaryotes can synthesize NAD$^+$ de novo via the kynurenine pathway from tryptophan. See, e.g., W. A. Krehl et al., *Growth-retarding Effect of Corn in Nicotinic Acid-Low Rations and its Counteraction by Tryptophane*, 101 SCIENCE 489 (1945); Gunther Schutz & Philip Feigelson, *Purification and Properties of Rat Liver Tryptophan Oxygenase*, 247 J. BIOL. CHEM. 5327 (1972); each of which is incorporated by reference herein in its entirety. The kynurenine pathway is a de novo pathway that originates from tryptophan. Through the sequential enzymatic action of tryptophan 2,3-dioxygenase ("TDO"), indoleamine 2,3-dioxygenase ("IDO"), kynurenine formamidase ("KFase"), kynurenine 3-hydroxylase ("K3H"), kynureninase, and 3-hydroxyanthranylate 3,4-dioxygenase ("3HAO"), tryptophan ("Trp") is converted to quinolinic acid ("QA"). See, e.g., Javed A. Khan et al., *Nicotinamide adenine dinucleotide metabolism as an attractive target for drug discovery*, 11 EXPERT OPIN. THER. TARGETS 695 (2007), incorporated by reference herein in its entirety. Quinolinic acid (QA) is converted to nicotinic acid mononucleotide ("NaMN") through the action of quinolinic phosphoribosyltransferase ("QAPRTase"). See Khan et al., 2007.

The de novo kynureninase pathway, which produces nicotinic acid mononucleotide (NaMN) from quinolinic acid (QA), feeds into the well-established Preiss-Handler pathway, in which nicotinic acid mononucleotide (NaMN) is an intermediate. The Preiss-Handler pathway is a salvage pathway that starts with the conversion of nicotinic acid (NA) to nicotinic acid mononucleotide (NaMN), catalyzed by the enzyme nicotinate phosphoribosyltransferase ("NAPRT" or "NAPRTase"). Nicotinic acid mononucleotide (NaMN) is then adenylylated to form nicotinic acid adenine dinucleotide ("NaAD"), catalyzed by the enzyme nicotinic acid/nicotinamide mononucleotide adenylyltransferase ("NMNAT"). Nicotinic acid adenine dinucleotide (NaAD) is in turn amidated to form nicotinamide adenine dinucleotide (NAD$^+$), catalyzed by the enzyme nicotinamide adenine dinucleotide synthetase ("NADS"). Nicotinamide (Nam or NM), which is a breakdown product of NAD$^+$, can be converted to nicotinic acid (NA), catalyzed by the enzyme nicotinamide deamidase ("NM deamidase"). See, e.g., Jack Preiss & Philip Handler, *Biosynthesis of Diphosphopyridine Nucleotide*, 233 J. BIOL. CHEM. 493 (1958), incorporated by reference herein in its entirety. See also, Khan et al., 2007.

Another salvage pathway can convert nicotinamide (Nam or NM), the breakdown product of nicotinamide adenine dinucleotide (NAD$^+$), into nicotinamide mononucleotide ("NMN"), by the action of the coenzyme nicotinamide phosphoribosyltransferase ("NMPRT" or "NMPRTase"). Nicotinamide mononucleotide (NMN) can then be directly converted into nicotinamide adenine dinucleotide (NAD$^+$) by nicotinic acid/nicotinamide mononucleotide adenylyltransferase (NMNAT). Alternatively, nicotinamide (Nam or NM) can be deamidated to form nicotinic acid (NA), which can then enter the Preiss-Handler pathway. Analysis of genome sequences suggests that the above two salvage pathways are often mutually exclusive; many organisms contain either NM deamidase or NMPRTase. See Khan et al., 2007.

Nicotinamide riboside (NR) can also be used as a precursor for nicotinamide adenine dinucleotide (NAD$^+$) biosynthesis, and nicotinamide riboside kinase ("NRK") catalyzes the phosphorylation of nicotinamide riboside (NR) to produce nicotinamide mononucleotide (NMN). See Khan et al., 2007.

Notably, nicotinamide riboside (NR) has been considered a precursor to nicotinamide adenine dinucleotide (NAD$^+$) via the Preiss-Handler salvage pathway. Instead, the biosynthetic pathway for nicotinic acid riboside (NAR) is known to proceed directly to nicotinic acid mononucleotide (NaMN), then nicotinic acid adenine dinucleotide (NaAD), and ultimately to form NAD$^+$.

Nicotinamide adenine dinucleotide (NAD$^+$) is an enzyme co-factor and the central reduction-oxidation coenzyme that is essential for the function of several enzymes related to reduction-oxidation reactions and cellular energy metabolism. See, e.g., Peter Belenky et al., *NAD$^+$ metabolism in health and disease*, 32 TRENDS IN BIOCHEMICAL SCIS. 12 (2007); Katrina L. Bogan & Charles Brenner, *Nicotinic Acid, Nicotinamide, and Nicotinamide Riboside: A Molecular Evaluation of NAD$^+$ Precursor Vitamins in Human Nutrition*, 28 ANNUAL REV. OF NUTRITION 115 (2008); each of which is incorporated by reference herein in its entirety. Nicotinamide adenine dinucleotide (NAD$^+$) functions as an electron carrier or hydride group acceptor in cell metabolism, forming reduced nicotinamide adenine dinucleotide (NADH), with concomitant oxidation of metabolites derived from carbohydrates, amino acids, and fats. See Bogan & Brenner, 2008. The NAD$^+$/NADH ratio controls the degree to which such reactions proceed in oxidative versus reductive directions. Whereas fuel oxidation reactions require NAD$^+$ as a hydride acceptor, the processes of gluconeogenesis, oxidative phosphorylation, ketogenesis, detoxification of reactive oxygen species, and lipogenesis require reduced co-factors, NADH and NADPH, to act as hydride donors.

In addition to its role as a coenzyme, NAD$^+$ is the consumed substrate, and thus activator of enzymes such as: poly-ADP-ribose polymerases ("PARPs"); sirtuins, a family of protein deacetylases that have been implicated in metabolic function and extended lifespan in lower organisms; and cyclic ADP-ribose synthetases. See, e.g., Laurent Mouchiroud et al., *The NAD$^+$ /Sirtuin Pathway Modulates Longevity through Activation of Mitochondrial UPR and FOXO Signaling*, 154 CELL 430 (2013), incorporated by reference herein in its entirety. See also Belenky et al., 2006. The co-enzymatic activity of NAD$^+$, together with the tight regulation of its biosynthesis and bioavailability, makes it an important metabolic monitoring system that is clearly involved in the aging process.

Once converted intracellularly to NADP$^+$, vitamin B3 is used as a co-substrate in two types of intracellular modifications, which control numerous essential signaling events (adenosine diphosphate ribosylation and deacetylation), and is a cofactor for over 400 reduction-oxidation enzymes, thus controlling metabolism. This is demonstrated by a range of metabolic endpoints including the deacetylation of key regulatory proteins, increased mitochondrial activity, and oxygen consumption. Critically, the NADPH-cofactor family can promote mitochondrial dysfunction and cellular impairment if present in sub-optimal intracellular concentrations. Vitamin B3 deficiency yields to evidenced compromised cellular activity through $NAD^+$ depletion, and the beneficial effect of additional $NAD^+$ bioavailability through nicotinic acid (NA), nicotinamide (Nam or NM), and nicotinamide riboside (NR) supplementation is primarily observed in cell and tissues where metabolism and mitochondrial function had been compromised.

In reduction-oxidation reactions, the nucleotide structures of $NAD^+$, NADH, $NADP^+$, and NADPH are preserved. In contrast, PARP, sirtuin, and cyclic ADP-ribose synthetase activities hydrolyze the glycosidic linkage between the nicotinamide (Nam or NM) and the ADP-ribosyl moieties of $NAD^+$ to signal DNA damage, alter gene expression, control post-translational modifications, and regulate calcium signaling.

In animals, $NAD^+$-consuming activities and cell division necessitate ongoing $NAD^+$ synthesis, either through the de novo pathway that originates with tryptophan, or via the salvage pathways from $NAD^+$-precursor vitamins nicotinamide (Nam or NM), nicotinic acid (NA), and nicotinamide riboside (NR). See Bogan & Brenner, 2008. Dietary $NAD^+$ precursors, which include tryptophan and the three $NAD^+$-precursor vitamins, prevent pellagra, a disease characterized by dermatitis, diarrhea, and dementia. The beneficial effect of additional $NAD^+$ bioavailability through nicotinamide (Nam or NM), nicotinic acid (NA), and nicotinamide riboside (NR) supplementation is primarily observed in cell and tissues where metabolism and mitochondrial function had been compromised.

Interestingly, supplementation with nicotinic acid (NA) and/or with nicotinamide (Nam or NM), while critical in acute vitamin B3 deficiency, does not demonstrate the same physiological outcomes compared with that of nicotinamide riboside (NR) supplementation, even though, at the cellular level, all three metabolites are responsible for $NAD^+$ biosynthesis. This emphasizes the complexity of the pharmacokinetics and bio-distribution of B3-vitamin components. The bulk of intracellular $NAD^+$ is believed to be regenerated via the effective salvage of nicotinamide (Nam or NM), while de novo $NAD^+$ is obtained from tryptophan. See, e.g., Anthony Rongvaux et al., *Reconstructing eukaryotic NAD metabolism*, 25 BIOESSAYS 683 (2003), incorporated by reference herein in its entirety. These salvage and de novo pathways depend on the functional forms of vitamin B1, B2, and B6 to generate $NAD^+$ via a phosphoriboside pyrophosphate intermediate. Nicotinamide riboside (NR) is the only form of vitamin B3 from which $NAD^+$ can be generated in a manner independent of vitamin B1, B2, and B6, and the salvage pathway using NR for the production of $NAD^+$ is expressed in most eukaryotes.

Thiamine (vitamin B1), riboflavin (vitamin B2), niacin (vitamin B3), and pyridoxine (vitamin B6) are salvaged from food and converted back intracellularly to their respective, bioactive forms: Thiamine DiPhosphate ("ThDP"); Flavin Adenine Dinucleotide ("FAD"); Nicotinamide Adenine Dinucleotide ($NAD^+$); and PyridoxaL Phosphate ("PLP"). The conversion of vitamins B1, B2, and B6 to ThDP, FAD, and PLP, respectively, is ATP-dependent. Two of the three salvage pathways that convert vitamin B3 to $NAD^+$ are dependent on ThDP (B1), with the de novo production of $NAD^+$ from tryptophan depending on the bioactive forms of vitamins B1, B2, and B6. The vitamin B1 dependency comes from the fact that ThDP (B1) is a cofactor for the transketolases involved in the biosynthesis of phosphoriboside pyrophosphate, an essential substrate in these aforementioned $NAD^+$ salvage and de novo pathways. The most recently identified, yet so far believed redundant, third $NAD^+$ salvage pathway, the Nicotinamide Riboside (NR) dependent $NAD^+$ biosynthetic pathway, does not require phosphoriboside pyrophosphate and is independent of vitamins B1, B2, and B6.

Though nicotinamide riboside (NR) is present in milk, the cellular concentrations of $NAD^+$, NADH, $NADP^+$, and NADPH are much higher than those of any other $NAD^+$ metabolites, such that dietary $NAD^+$ precursor vitamins are largely derived from enzymatic breakdown of $NAD^+$. See, e.g., Pawel Bieganowski & Charles Brenner, *Discoveries of Nicotinamide Riboside as a Nutrient and Conserved NRK Genes Establish a Preiss-Handler Independent Route to $NAD^+$ in Fungi and Humans*, 117 CELL 495 (2002); Charles Evans et al., *$NAD^+$ metabolite levels as a function of vitamins and calorie restriction: evidence for different mechanisms of longevity*, 10 BMC CHEM. BIOL. 2 (2010); Samuel A. J. Trammell & Charles Brenner, *Targeted, LCMS-Based Metabolomics for Quantitative Measurement of $NAD^+$ Metabolites*, 4 COMPUTATIONAL & STRUCTURAL BIOTECH. J. 1 (2013); each of which is incorporated by reference herein in its entirety. Put another away, though milk is a source of nicotinamide riboside (NR), the more abundant sources of nicotinamide riboside (NR), nicotinamide (Nam or NM), and nicotinic acid (NA) are any whole foodstuffs in which cellular $NAD^+$ is broken down to these compounds. Human digestion and the microbiome play roles in the provision of these vitamins in ways that are not fully characterized.

Different tissues maintain $NAD^+$ levels through reliance of different biosynthetic routes. See, e.g., Federica Zamporlini et al., *Novel assay for simultaneous measurement of pyridine mononucleotides synthesizing activities allow dissection of the $NAD^+$ biosynthetic machinery in mammalian cells*, 281 FEBS J. 5104 (2014); Valerio Mori et al., *Metabolic Profiling of Alternative NAD Biosynthetic Routes in Mouse Tissues*, 9 PLOS ONE e113939 (2014); each of which is incorporated by reference herein in its entirety. Because $NAD^+$-consuming activities frequently occur as a function of cellular stresses and produce nicotinamide (Nam or NM), the ability of a cell to salvage nicotinamide (Nam or NM) into productive $NAD^+$ synthesis through nicotinamide phosphoribosyltransferase ("NAMPT") activity versus methylation of nicotinamide (Nam or NM) to N-methylnicotinamide ("MeNam") regulates the efficiency of $NAD^+$-dependent processes. See, e.g., Charles Brenner, Metabolism: Targeting a fat-accumulation gene, 508 NATURE 194 (2014); Veronique J. Bouchard et al., *PARP-1, a determinant of cell survival in response to DNA damage*, 31 EXPERIMENTAL HEMATOLOGY 446 (2003); each of which is incorporated by reference herein in its entirety. $NAD^+$ biosynthetic genes are also under circadian control, and both NAMPT expression and $NAD^+$ levels are reported to decline in a number of tissues as a function of aging and overnutrition. See, e.g., Kathryn Moynihan Ramsey et al., *Circadian Clock Feedback Cycle Through NAMPT-Mediated $NAD^+$ Biosynthesis*, 324 SCIENCE 651 (2009); Yasukazo Nakahata et al., *Circadian Control of the $NAD^+$ Salvage Pathway by CLOCK-SIRT1*, 324 SCIENCE 654 (2009); Jun Yoshino et al., *Nicotinamide Mononucleotide, a Key NAD$^+$ Intermediate Treats the Pathophysiology of Diet- and Age-Induced Diabetes in Mice,* 14 CELL METABOLISM 528 (2011); Ana P. Gomes et al., *Declining NAD$^+$ Induces a Pseudohypoxic State Disrupting Nuclear-Mitochondrial Communication during Aging,* 155 CELL 1624 (2013); Nady Braidy et al., *Mapping NAD$^+$ metabolism in the brain of ageing Wistar rats: potential targets for influencing brain senescence,* 15 BIOGERONTOLOGY 177 (2014); Eric Verdin, NAD$^+$ in aging, metabolism, and neurodegeneration, 350 SCIENCE 1208 (2015); each of which is incorporated by reference herein in its entirety.

High-dose nicotinic acid (NA), but not high-dose nicotinamide (Nam or NM), has been used by people for decades to treat and prevent dyslipidemias, though its use is limited by painful flushing. See, e.g., Joseph R. DiPalma & William S. Thayer, *Use of Niacin as a Drug,* 11 ANNUAL REV. OF NUTRITION 169 (1991); Jeffrey T. Kuvin et al., *Effects of Extended-Release Niacin on Lipoprotein Particle Size, Distribution, and Inflammatory Markers in Patients With Coronary Artery Disease,* 98 AM. J. OF CARDIOLOGY 743 (2006); each of which is incorporated by reference herein in its entirety. Though only approximately 15 milligrams per day of either nicotinic acid (NA) or nicotinamide (Nam or NM) is required to prevent pellagra, pharmacological doses of nicotinic acid (NA) can be as high as 2-4 grams. Despite the >100-fold difference in effective dose between pellagra prevention and treatment of dyslipidemias, the beneficial effects of nicotinic acid (NA) on plasma lipids depend on function of nicotinic acid (NA) as an NAD$^+$-boosting compound. See Belenky et al., 2007. According to this view, sirtuin activation would likely be part of the mechanism because nicotinamide (Nam or NM) is an NAD$^+$ precursor in most cells but is a sirtuin inhibitor at high doses. See, e.g., Kevin J. Bitterman et al., *Inhibition of Silencing and Accelerated Aging by Nicotinamide, a Putative Negative Regulator of Yeast Sir2 and Human SIRT1,* 277 J. BIOL. CHEM. 45099 (2002), incorporated by reference herein in its entirety. See also Zamporlini et al., 2014; Mori et al., 2014.

As discussed above, the main NAD$^+$ precursors that feed the Preiss-Handler salvage pathway and other salvage pathways are nicotinamide (Nam or NM) and nicotinamide riboside (NR). See Bogan & Brenner, 2008. Further, studies have shown that nicotinamide riboside (NR) is used in a conserved salvage pathway that leads to NAD$^+$ synthesis through the formation of nicotinamide mononucleotide (NMN). Upon entry into the cell, nicotinamide riboside (NR) is phosphorylated by the NR kinases ("NRKs"), generating nicotinamide mononucleotide (NMN), which is then converted to NAD$^+$ by nicotinic acid/nicotinamide mononucleotide adenylyltransferase (NMNAT). See Bogan & Brenner, 2008. Because nicotinamide mononucleotide (NMN) is the only metabolite that can be converted to NAD$^+$ in mitochondria, nicotinamide (Nam or NM) and nicotinamide riboside (NR) are the two candidate NAD$^+$ precursors that can replenish NAD$^+$ and thus improve mitochondrial fuel oxidation. A key difference is that nicotinamide riboside (NR) has a direct two-step pathway to NAD$^+$ synthesis that bypasses the rate-limiting step of the salvage pathway, nicotinamide phosphoribosyltransferase (NAMPT). Nicotinamide (Nam or NM) requires NAMPT activity to produce NAD$^+$. This reinforces the fact that nicotinamide riboside (NR) is a very effective NAD$^+$ precursor. Conversely, deficiency in dietary NAD$^+$ precursors and/or tryptophan (Trp) causes pellagra. See Bogan & Brenner, 2008. In summary, NAD$^+$ is required for normal mitochondrial function, and because mitochondria are the powerhouses of the cell, NAD$^+$ is required for energy production within cells.

NAD$^+$ was initially characterized as a co-enzyme for oxidoreductases. Though conversions between NAD$^+$, NADH, NADP$^+$, and NADPH would not be accompanied by a loss of total co-enzyme, it was discovered that NAD$^+$ is also turned over in cells for unknown purposes. See, e.g., Morelly L. Maayan, *NAD$^+$-Glycohydrolase of Thyroid Homogenates,* 204 NATURE 1169 (1964), incorporated by reference herein in its entirety. Sirtuin enzymes such as Sir2 of *S. cerevisiae* and its homologs deacetylate lysine residues with consumption of an equivalent of NAD$^+$, and this activity is required for Sir2 function as a transcriptional silencer. See, e.g., S. Imai et al., *Sir2: An NAD-dependent Histone Deacetylase That Connects Chromatin Silencing, Metabolism, and Aging,* 65 COLD SPRING HARBOR SYMPOSIA ON QUANTITATIVE BIOLOGY 297 (2000), incorporated by reference herein in its entirety. NAD$^+$-dependent deacetylation reactions are required, not only for alterations in gene expression, but also for repression of ribosomal DNA recombination and extension of lifespan in response to calorie restriction. See, e.g., Lin et al., *Requirement of NAD and SIR2 for Life-Span Extension by Calorie Restriction in Saccharomyces cerevisiae,* 289 SCIENCE 2126 (2000); Lin et al., *Calorie Restriction extends Saccharomyces cerevisiae lifespan by increasing respiration,* 418 NATURE 344 (2002); each of which is incorporated by reference herein in its entirety. NAD$^+$ is consumed by Sir2 to produce a mixture of 2'- and 3'-O-acetylated ADP-ribose plus nicotinamide (Nam or NM) and the deacetylated polypeptide. See, e.g., Anthony A. Sauve et al., *Chemistry of Gene Silencing: the Mechanism of NAD$^+$-Dependent Deacetylation Reactions,* 40 BIOCHEMISTRY 15456 (2001), incorporated by reference herein in its entirety. Additional enzymes, including poly(ADP-ribose) polymerases and cADP-ribose synthases are also NAD$^+$-dependent and produce nicotinamide (Nam or NM) and ADP-ribosyl products. See, e.g., Mathias Ziegler, *New functions of a long-known molecule,* 267 FEBS J. 1550 (2000); Alexander Bürkle, *Physiology and pathophysiology of poly (ADP-ribosyl)ation,* 23 BIOESSAYS 795 (2001); each of which is incorporated by reference herein in its entirety.

The non-coenzymatic properties of NAD$^+$ have renewed interest in NAD$^+$ biosynthesis. Based on the ability of nicotinamide riboside (NR) to elevate NAD$^+$ synthesis, increase sirtuin activity, and extend lifespan in yeast, nicotinamide riboside (NR) has been employed in mice to elevate NAD$^+$ metabolism and improve health in models of metabolic stress. See, e.g., Peter Belenky et al., *Nicotinamide Ribosides Promotes Sir2 Silencing and Extends Lifespan via Nrk and Urh1/Pnp1/Meu1 Pathways to NAD$^+$,* 129 CELL 473 (2007), incorporated by reference here in its entirety. See also Bieganowski & Brenner, 2004. Notably, nicotinamide riboside (NR) allowed mice to resist weight gain on a high-fat diet, and to prevent noise-induced hearing loss. See, e.g., Carles Cantó et al., *The NAD$^+$ Precursor Nicotinamide Riboside Enhances Oxidative Metabolism and Protects against High-Fat Diet-Induced Obesity,* 15 CELL METABOLISM 838 (2012); Kevin D. Brown et al., *Activation of SIRT3 by the NAD$^+$ Precursor Nicotinamide Riboside Protects from Noise-Induced Hearing Loss,* 20 CELL METABOLISM 1059 (2014); each of which is incorporated by reference herein in its entirety. Data indicate that nicotinamide riboside (NR) have been interpreted as depending upon mitochondrial sirtuin activities, though not to the exclusion of nucleocytosolic targets. See, e.g., Andrey Nikiforov et al., *Pathways and Subcellular Compartmentatino of NAD Bio-*

*synthesis in Human Cells,* 286 J. BIOLOGICAL CHEM. 21767 (2011); Charles Brenner, *Boosting NAD to Spare Hearing* 20 CELL METABOLISM 926 (2014); Carles Cantó et al., *NAD$^+$ Metabolism and the Control of Energy Homeostasis: A Balancing Act between Mitochondria and the Nucleus,* 22 CELL METABOLISM 31 (2015); each of which is incorporated by reference herein in its entirety. Similarly, nicotinamide mononucleotide (NMN), the phosphorylated form of nicotinamide riboside (NR), had been used to treat declining NAD$^+$ in mouse models of overnutrition and aging. See J. Yoshino et al., 2011; A. P. Gomes et al., 2013. Because of the abundance of NAD$^+$-dependent processes, it is not known to what degree NAD$^+$-boosting strategies are mechanistically dependent upon particular molecules such as SIRT1 or SIRT3. In addition, the quantitative effect of nicotinamide riboside (NR) on the NAD$^+$ metabolome has not been reported in any system.

Vitamins B1, B2, B3, and B6 are closely intertwined in their biosynthetic pathways, with the maintenance and regeneration of the NADPH intracellular pool depending on the availability of ThDP (vitamin B1), FAD (vitamin B2), and PLP (vitamin B6), along with that of ATP.

ATP is believed to be produced through NAD$^+$-dependent OXPHOS and glycolysis, and is necessary for the functionalization of the vitamins B1, B2, and B6 to ThDP, FAD, and PLP, respectively. A shortage of any of these vitamins would impact negatively on the biology of the others.

A healthy, growing infant requires a steady intake of essential nutrients and a key component of that would be an NAD$^+$ precursor. A human study examining NAD$^+$ levels in human skin tissues demonstrated that the amount of NAD$^+$ decreases with age. See, e.g., Hassina Massudi et al., *Age-associated changes in oxidative stress and NAD$^+$ metabolism in human tissue,* 7 PUBLIC LIBRARY OF SCIENCE ONE e42357 (2012), which is incorporated by reference herein in its entirety. Thus, human infants have the highest concentration of NAD$^+$ in their skin cells compared to older humans. Specifically, almost three times as much NAD$^+$ is present in human newborns as compared to adults thirty to fifty years old. Further, human infants have approximately eight times as much NAD$^+$ as compared to adults fifty-one to seventy years old. See Massudi et al., 2012. These results support the idea that human infants naturally need higher NAD$^+$ levels during that stage of development.

A rationale for synergy between nicotinamide riboside (NR), nicotinic acid riboside (NAR), nicotinic acid mononucleotide (NaMN), and nicotinamide mononucleotide (NMN), derivatives thereof, or salts thereof, and vitamins $A_1$, B1, B2, B3, B6, B7, B9, B12, C, D2, D3, E, and $K_1$ is explained herein. Pairing at least one compound selected from nicotinamide riboside (NR), nicotinic acid riboside (NAR), nicotinic acid mononucleotide (NaMN), and nicotinamide mononucleotide (NMN), derivatives thereof, or salts thereof, with at least one of vitamins $A_1$, B1, B2, B3, B6, B7, B9, B12, C, D2, D3, E, and $K_1$ is hypothesized to act synergistically on the NAD$^+$ biosynthetic pathway and have a positive effect. This is due to the fact that vitamins B1, B2, and B6 are required for NAD$^+$ biosynthesis through NAMPT-dependent pathways, allowing for the further recycling of nicotinamide (Nam or NM) generated from the NR-produced NAD$^+$. Of all the B3-vitamins, only NR functions independently of NAMPT for NAD$^+$ synthesis, in a mole to mole perspective. See, e.g., W. Todd Penberthy & James B. Kirkland, *Niacin,* in PRESENT KNOWLEDGE IN NUTRITION 293 (10th ed. 2012); Yuling Chi & Anthony A. Sauve, *Nicotinamide riboside, a trace nutrient in foods, is a vitamin B3 with effects on energy metabolism and neuroprotection,* 16 CURR. OPINION IN CLIN. NUTRITION & METABOLIC CARE 657 (2013); each of which is incorporated by reference herein in its entirety. Additionally, vitamin B2 (FAD precursor) is a key vitamin for mitochondrial fatty acid oxidation and OXPHOS processes. Mitochondrial dysfunction can arise from FAD/FADH$_2$ imbalance or deficiency, and it is hypothesized that pairing vitamin B2 to vitamin B3 NAD-precursors would address multiple pathways of mitochondrial dysfunction.

Therefore, it is hypothesized herein that that providing at least one compound selected from nicotinamide riboside (NR), nicotinic acid riboside (NAR), nicotinic acid mononucleotide (NaMN), and nicotinamide mononucleotide (NMN), derivatives thereof, or salts thereof, individually or optionally in combination with at least one of vitamins $A_1$, B1, B2, B3, B6, B7, B9, B12, C, $D_2$, $D_3$, E, and $K_1$, to a human individual, would supply elevated levels of NAD$^+$ to said human individual. Further, providing said at least one compound selected from nicotinamide riboside (NR), nicotinic acid riboside (NAR), nicotinic acid mononucleotide (NaMN), and nicotinamide mononucleotide (NMN), derivatives thereof, or salts thereof, individually or optionally in combination with at least one of vitamins $A_1$, B1, B2, B3, B6, B7, B9, B12, C, $D_2$, $D_3$, E, and $K_1$, to a human individual, would be effective in treating and/or preventing symptoms, diseases, disorders, or conditions associated with vitamin B3-deficiency and/or that would benefit from increased mitochondrial activity.

If new methods could be found of providing at least one compound selected from nicotinamide riboside (NR), nicotinic acid riboside (NAR), nicotinic acid mononucleotide (NaMN), and nicotinamide mononucleotide (NMN), derivatives thereof, or salts thereof, individually or optionally in combination with at least one of vitamins $A_1$, B1, B2, B3, B6, B7, B9, B12, C, $D_2$, $D_3$, E, and $K_1$, to a human individual, this would represent a useful contribution to the art. Furthermore, if new methods could be found of treating and/or preventing symptoms, diseases, disorders, or conditions associated with vitamin B3-deficiency and/or that would benefit from increased mitochondrial activity by providing at least one compound selected from nicotinamide riboside (NR), nicotinic acid riboside (NAR), nicotinic acid mononucleotide (NaMN), and nicotinamide mononucleotide (NMN), derivatives thereof, or salts thereof, individually or optionally in combination with at least one of vitamins $A_1$, B1, B2, B3, B6, B7, B9, B12, C, $D_2$, $D_3$, E, and $K_1$, to a human individual, this would also represent a useful contribution to the art.

If new compositions and formulations including at least one compound selected from nicotinamide riboside (NR), nicotinic acid riboside (NAR), nicotinic acid mononucleotide (NaMN), and nicotinamide mononucleotide (NMN), derivatives thereof, or salts thereof, individually or optionally in combination with at least one of vitamins $A_1$, B1, B2, B3, B6, B7, B9, B12, C, $D_2$, $D_3$, E, and $K_1$, could be found, this would also represent a useful contribution to the art.

SUMMARY OF THE INVENTION

A composition is described including wax prills comprising one or more nicotinyl riboside compounds selected from the group consisting of nicotinamide riboside (NR, I), nicotinic acid riboside (NAR, II), nicotinamide mononucleotide (NMN, III), nicotinic acid mononucleotide (NaMN, IV), reduced nicotinamide riboside (NRH, V), reduced nicotinic acid riboside (NARH, VI), NR triacetate (NRTA, VII), NAR triacetate (NARTA, VIII), NRH triacetate (NRH-TA, IX), NARH triacetate (NARH-TA, X), and salts or mixtures thereof; wherein the wax prills comprise an edible oil and/or wax suitable for prilling.

The edible oil and/or wax is selected from the group consisting of palm oil, sunflower oil, carnauba wax, cottonseed oil, soybean oil, cocoa butter, paraffin wax, bees wax, high oleic safflower oil, soy oil, fractionated coconut oil, medium chain triglycerides, MCT oil, high oleic sunflower oil, corn oil, canola oil, coconut oil, palm kernel oil, marine oil, walnut oil, wheat germ oil, sesame oil, cod liver oil, candelilla wax, palm stearin, rapeseed oil, glycerol dibehenate, glycerol distearate, peanut oil, mixtures thereof, and the like.

A process is described for making wax prills containing one or more nicotinyl riboside compounds selected from the group consisting of nicotinamide riboside (NR, I), nicotinic acid riboside (NAR, II), nicotinamide mononucleotide (NMN, III), nicotinic acid mononucleotide (NaMN, IV), reduced nicotinamide riboside (NRH, V), reduced nicotinic acid riboside (NARH, VI), NR triacetate (NRTA, VII), NAR triacetate (NARTA, VIII), NRH triacetate (NRH-TA, IX), NARH triacetate (NARH-TA, X), and salts or mixtures thereof; comprising the steps of: (a) preparing a mixture of a nicotinyl riboside and an edible oil and/or wax; (b) spray melting the mixture at a temperature above the melting point of the oil and/or wax; (c) allowing solidification of the sprayed mixture in cold air to provide generally spherical wax prills; and (d) isolating the generally spherical wax prills. Optionally, step (e) applying a wax coating to the wax prills using fluidized bed coating is performed.

In certain embodiments, the present disclosure provides methods for delivering at least one compound selected from the group consisting of nicotinamide riboside (NR), nicotinic acid riboside (NAR), nicotinic acid mononucleotide (NaMN), and nicotinamide mononucleotide (NMN), derivatives thereof, or salts thereof, to a human subject in need of said compound or compounds.

In further embodiments, the present disclosure provides methods for delivering at least one compound selected from the group consisting of nicotinamide riboside (NR), nicotinic acid riboside (NAR), nicotinic acid mononucleotide (NaMN), and nicotinamide mononucleotide (NMN), derivatives thereof, or salts thereof, in combination with at least one of thiamine (vitamin B1), riboflavin (vitamin B2), niacin (vitamin B3), pyridoxine (vitamin B6), biotin (vitamin B7), folic acid (vitamin B9), cobalamin (vitamin B12), retinol (vitamin $A_1$), ascorbic acid (vitamin C), cholecalciferol (vitamin $D_3$), ergocalciferol (vitamin $D_2$), alpha-tocopherol (vitamin E), and phytomenadione (vitamin $K_1$), to a human subject in need of said compound or compounds. Other dietary supplements are contemplated including Co-Q10, tryptophan, alanine, arginine, asparagine, aspartic acid, cysteine, glutamine, glutamic acid, glycine, histidine, iso-leucine, leucine, lysine, methionine, phenylalanine, proline, serine, threonine, tyrosine, valine, selenocysteine, pyrrolysine, EGCG (epigallocatechin gallate), cycloastragenol, beta-analine, 1-carnitine, omega-3 fatty acids, PQQ (pyrroloquinoline quinone), curcumin, methyl nicotinate, nitrate, and the like.

In further embodiments, the present disclosure provides methods for delivering at least one compound selected from the group consisting of nicotinamide riboside (NR), nicotinic acid riboside (NAR), nicotinic acid mononucleotide (NaMN), and nicotinamide mononucleotide (NMN), derivatives thereof, or salts thereof, alone or in combination with at least one of vitamins B1, B2, B3, B6, B7, B9, B12, $A_1$, C, $D_2$, $D_3$, E, and $K_1$, to a human subject in need of said at least one compound, which can include the steps of: (a) providing a composition comprising at least one compound selected from the group consisting of nicotinamide riboside (NR), nicotinic acid riboside (NAR), nicotinic acid mononucleotide (NaMN), and nicotinamide mononucleotide (NMN), derivatives thereof, or salts thereof; and (b) administering the composition to the human subject.

In further embodiments, the present disclosure provides methods for treating and/or preventing symptoms, diseases, disorders, or conditions associated with, or having etiologies involving, vitamin B3 deficiency and/or that would benefit from increased mitochondrial activity in a human subject.

In further embodiments, the present disclosure provides methods for promoting the growth of beneficial species of bacteria in the gut of a human subject by administering to the human subject at least one compound selected from NR, NAR, NaMN, and NMN, derivatives thereof, or salts thereof, alone or in combination with at least one of thiamine (vitamin B1), riboflavin (vitamin B2), niacin (vitamin B3), pyridoxine (vitamin B6), biotin (vitamin B7), folic acid (vitamin B9), cobalamin (vitamin B12), retinol (vitamin $A_1$), ascorbic acid (vitamin C), cholecalciferol (vitamin $D_3$), ergocalciferol (vitamin $D_2$), alpha-tocopherol (vitamin E), and phytomenadione (vitamin $K_1$).

In further embodiments, the present disclosure provides methods for promoting the gut health of a human subject by administering to the human subject at least one compound selected from the group consisting of NR, NAR, NaMN, and NMN, derivatives thereof, or salts thereof, alone or in combination with at least one of thiamine (vitamin B1), riboflavin (vitamin B2), niacin (vitamin B3), pyridoxine (vitamin B6), biotin (vitamin B7), folic acid (vitamin B9), cobalamin (vitamin B12), retinol (vitamin $A_1$), ascorbic acid (vitamin C), cholecalciferol (vitamin $D_3$), ergocalciferol (vitamin $D_2$), alpha-tocopherol (vitamin E), and phytomenadione (vitamin $K_1$).

In further embodiments, the present disclosure provides methods for reducing gastrointestinal inflammation in a human subject by administering to the human subject at least one compound selected from the group consisting of NR, NAR, NaMN, and NMN, derivatives thereof, or salts thereof, alone or in combination with at least one of thiamine (vitamin B1), riboflavin (vitamin B2), niacin (vitamin B3), pyridoxine (vitamin B6), biotin (vitamin B7), folic acid (vitamin B9), cobalamin (vitamin B12), retinol (vitamin $A_1$), ascorbic acid (vitamin C), cholecalciferol (vitamin $D_3$), ergocalciferol (vitamin $D_2$), alpha-tocopherol (vitamin E), and phytomenadione (vitamin $K_1$).

In further embodiments, the present disclosure provides methods for binding proteins directly to and stabilizing at least one compound selected from the group consisting of NR, NAR, NaMN, and NMN, derivatives thereof, or salts thereof, in liquid.

In further embodiments, the present disclosure provides compositions including proteins bound directly to at least one compound selected from the group consisting of NR, NAR, NaMN, and NMN, derivatives thereof, or salts thereof.

In further embodiments, the present disclosure provides compositions including proteins bound directly to at least one compound selected from the group consisting of NR, NAR, NaMN, and NMN, derivatives thereof, or salts thereof, alone or in combination with at least one of thiamine (vitamin B1), riboflavin (vitamin B2), niacin (vitamin B3), pyridoxine (vitamin B6), biotin (vitamin B7), folic acid (vitamin B9), cobalamin (vitamin B12), retinol (vitamin $A_1$), ascorbic acid (vitamin C), cholecalciferol (vitamin $D_3$), ergocalciferol (vitamin $D_2$), alpha-tocopherol (vitamin E), and phytomenadione (vitamin $K_1$).

In further embodiments, the present disclosure provides methods for encapsulating at least one compound selected from the group consisting of NR, NAR, NaMN, and NMN, derivatives thereof, or salts thereof, alone or in combination with at least one of thiamine (vitamin B1), riboflavin (vitamin B2), niacin (vitamin B3), pyridoxine (vitamin B6), biotin (vitamin B7), folic acid (vitamin B9), cobalamin (vitamin B12), retinol (vitamin $A_1$), ascorbic acid (vitamin C), cholecalciferol (vitamin $D_3$), ergocalciferol (vitamin $D_2$), alpha-tocopherol (vitamin E), and phytomenadione (vitamin $K_1$).

In further embodiments, the present disclosure provides methods for encapsulating at least one compound selected from the group consisting of NR, NAR, NaMN, and NMN, derivatives thereof, or salts thereof, alone or in combination with at least one of thiamine (vitamin B1), riboflavin (vitamin B2), niacin (vitamin B3), pyridoxine (vitamin B6), biotin (vitamin B7), folic acid (vitamin B9), cobalamin (vitamin B12), retinol (vitamin $A_1$), ascorbic acid (vitamin C), cholecalciferol (vitamin $D_3$), ergocalciferol (vitamin $D_2$), alpha-tocopherol (vitamin E), and phytomenadione (vitamin $K_1$) in alginate beads.

In further embodiments, the invention relates to compositions including encapsulated beads including at least one compound selected from the group consisting of NR, NAR, NaMN, and NMN, derivatives thereof, or salts thereof, alone or in combination with at least one of thiamine (vitamin B1), riboflavin (vitamin B2), niacin (vitamin B3), pyridoxine (vitamin B6), biotin (vitamin B7), folic acid (vitamin B9), cobalamin (vitamin B12), retinol (vitamin $A_1$), ascorbic acid (vitamin C), cholecalciferol (vitamin $D_3$), ergocalciferol (vitamin $D_2$), alpha-tocopherol (vitamin E), and phytomenadione (vitamin $K_1$), wherein the at least one compound selected from the group consisting of NR, NAR, NaMN, and NMN, derivatives thereof, or salts thereof, hydrolyzes less when the encapsulated beads are added to water compared to the at least one compound selected from the group consisting of NR, NAR, NaMN, and NMN, derivatives thereof, or salts thereof, added to water without encapsulation.

In further embodiments, the invention relates to compositions including encapsulated alginate beads including at least one compound selected from the group consisting of NR, NAR, NaMN, and NMN, derivatives thereof, or salts thereof, alone or in combination with at least one of thiamine (vitamin B1), riboflavin (vitamin B2), niacin (vitamin B3), pyridoxine (vitamin B6), biotin (vitamin B7), folic acid (vitamin B9), cobalamin (vitamin B12), retinol (vitamin $A_1$), ascorbic acid (vitamin C), cholecalciferol (vitamin $D_3$), ergocalciferol (vitamin $D_2$), alpha-tocopherol (vitamin E), and phytomenadione (vitamin $K_1$), wherein the at least one compound selected from the group consisting of NR, NAR, NaMN, and NMN, derivatives thereof, or salts thereof, hydrolyzes less when the encapsulated alginate beads are added to water compared to the at least one compound selected from the group consisting of NR, NAR, NaMN, and NMN, derivatives thereof, or salts thereof, added to water without encapsulation.

In further embodiments, the invention relates to methods for prilling at least one compound selected from the group consisting of NR, NAR, NaMN, and NMN, derivatives thereof, or salts thereof, alone or in combination with at least one of thiamine (vitamin B1), riboflavin (vitamin B2), niacin (vitamin B3), pyridoxine (vitamin B6), biotin (vitamin B7), folic acid (vitamin B9), cobalamin (vitamin B12), retinol (vitamin $A_1$), ascorbic acid (vitamin C), cholecalciferol (vitamin $D_3$), ergocalciferol (vitamin $D_2$), alpha-tocopherol (vitamin E), and phytomenadione (vitamin $K_1$), in combination with a molten solid, slurry, or solution, so as to produce solidified liquid compositions.

In further embodiments, the invention relates to compositions prepared by prilling at least one compound selected from the group consisting of NR, NAR, NaMN, and NMN, derivatives thereof, or salts thereof, alone or in combination with at least one of thiamine (vitamin B1), riboflavin (vitamin B2), niacin (vitamin B3), pyridoxine (vitamin B6), biotin (vitamin B7), folic acid (vitamin B9), cobalamin (vitamin B12), retinol (vitamin $A_1$), ascorbic acid (vitamin C), cholecalciferol (vitamin $D_3$), ergocalciferol (vitamin $D_2$), alpha-tocopherol (vitamin E), and phytomenadione (vitamin $K_1$), in combination with a molten solid, slurry, or solution.

In further embodiments, the invention relates to compositions including: one or more nicotinyl riboside (NR, I), nicotinic acid riboside (NAR, II), nicotinamide mononucleotide (NMN, III), nicotinic acid mononucleotide (NaMN, IV), reduced nicotinamide riboside (NRH, V), reduced nicotinic acid riboside (NARH, VI), NR triacetate (NRTA, VII), NAR triacetate (NARTA, VIII), NRH triacetate (NRH-TA, IX), NARH triacetate (NARH-TA, X), and mixtures thereof; one or more vitamins selected from the group consisting of vitamin B1 (thiamine, XII), vitamin B2 (riboflavin, XIII), vitamin B3 (niacin, XI), vitamin B6 (pyridoxine, XIV), vitamin B7 (biotin, XV), vitamin B9 (folic acid, XVI), vitamin B12 (cobalamin, XVII), vitamin $A_1$ (retinol, XVIII), vitamin C (ascorbic acid, XIX), vitamin $D_3$ (cholecalciferol, XX), vitamin $D_3$ (ergocalciferol, XXI), vitamin E (alpha-tocopherol, XXII), vitamin $K_1$ (phytomenadione, XXX), and mixtures thereof; and hydrolyzed whey protein or non-hydrolyzed whey protein.

In further embodiments, the invention relates to compositions including encapsulated beads, including: one or more nicotinyl riboside (NR, I), nicotinic acid riboside (NAR, II), nicotinamide mononucleotide (NMN, III), nicotinic acid mononucleotide (NaMN, IV), reduced nicotinamide riboside (NRH, V), reduced nicotinic acid riboside (NARH, VI), NR triacetate (NRTA, VII), NAR triacetate (NARTA, VIII), NRH triacetate (NRH-TA, IX), NARH triacetate (NARH-TA, X), and mixtures thereof; one or more vitamins selected from the group consisting of vitamin B1 (thiamine, XII), vitamin B2 (riboflavin, XIII), vitamin B3 (niacin, XI), vitamin B6 (pyridoxine, XIV), vitamin B7 (biotin, XV), vitamin B9 (folic acid, XVI), vitamin B12 (cobalamin, XVII), vitamin $A_1$ (retinol, XVIII), vitamin C (ascorbic acid, XIX), vitamin $D_3$ (cholecalciferol, XX), vitamin $D_2$ (ergocalciferol, XXI), vitamin E (alpha-tocopherol, XXII), vitamin $K_1$ (phytomenadione, XXIII), and mixtures thereof; and hydrolyzed whey protein isolate or non-hydrolyzed whey protein isolate; wherein the beads include liposomes, phospholipids, glycolipids, sodium alginate, calcium alginate, cottonseed oil, coconut oil, bees wax, carnuba wax, chocolate coating, cacao butter, and mixtures thereof.

DETAILED DESCRIPTION

Figure 1:
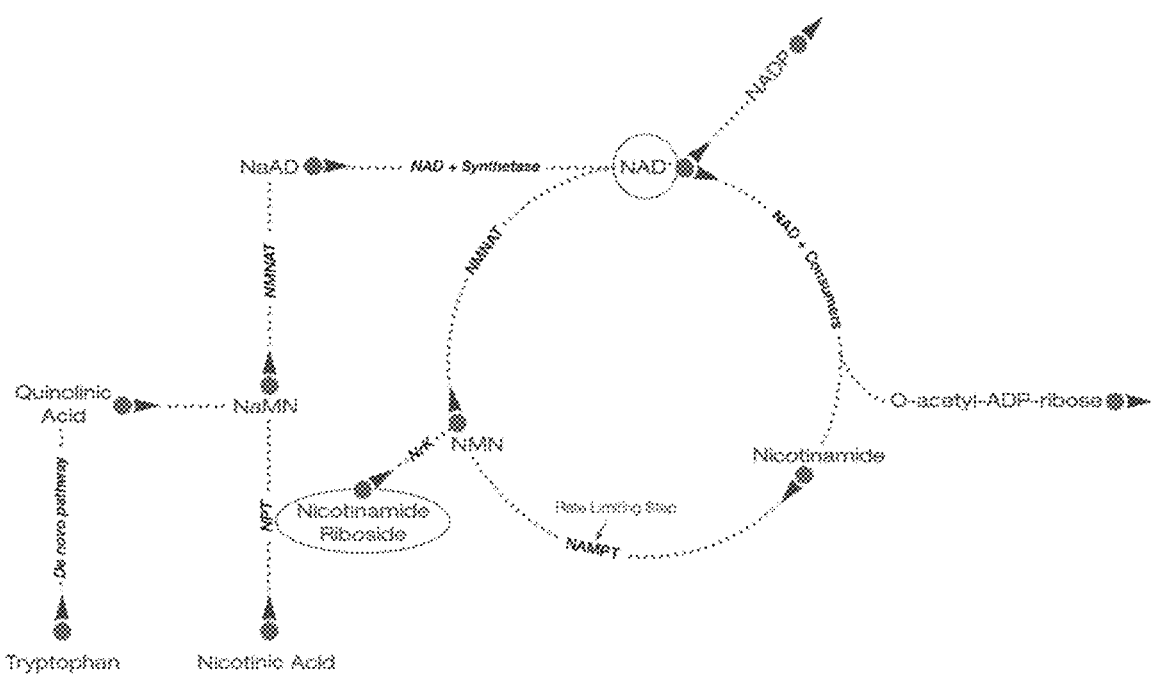
FIG. 1 depicts the $NAD^+$ biosynthetic pathway.

In one aspect, the present disclosure surprisingly demonstrates novel methods for delivering $NAD^+$-precursors to a human infant in need thereof. In a particular embodiment, methods for delivering at least one compound selected from the group consisting of nicotinamide riboside (NR), nicotinic acid riboside (NAR), and nicotinamide mononucleotide (NMN), derivatives thereof, or salts thereof, to an infant human subject in need of said compound or compounds are described. In another embodiment, the present disclosure relates to methods for delivering at least one compound selected from the group consisting of nicotinamide riboside (NR), nicotinic acid riboside (NAR), and nicotinamide mononucleotide (NMN), nicotinic acid mononucleotide (NaMN), derivatives thereof, or salts thereof, in combination with at least one of thiamine (vitamin B1), riboflavin (vitamin B2), niacin (vitamin B3), pyridoxine (vitamin B6), biotin (vitamin B7), folic acid (vitamin B9), cobalamin (vitamin B12), retinol (vitamin $A_1$), ascorbic acid (vitamin C), cholecalciferol (vitamin $D_3$), ergocalciferol (vitamin $D_2$), alpha-tocopherol (vitamin E), phytomenadione (vitamin $K_1$), and mixtures thereof, to an infant human subject in need of said compound or compounds. In yet another embodiment, the invention relates to methods for treating and/or preventing symptoms, diseases, disorders, or conditions associated with, or having etiologies involving, vitamin B3-deficiency and/or that would benefit from increased mitochondrial activity.

Nicotinamide riboside (NR) is a pyridinium nicotinyl compound having the formula (I):

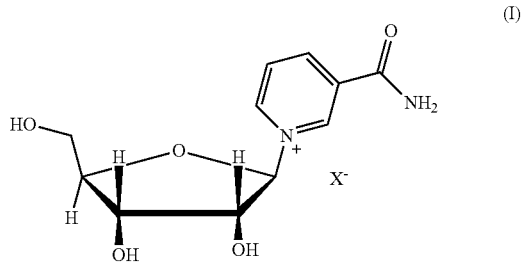

Nicotinic acid riboside (NAR) is a pyridinium nicotinyl compound having the formula (II):

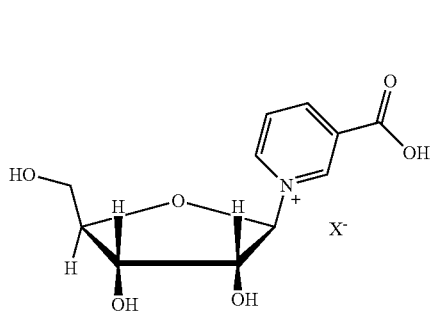

(II)

Nicotinamide mononucleotide (NMN) is a pyridinium nicotinyl compound having the formula (III):

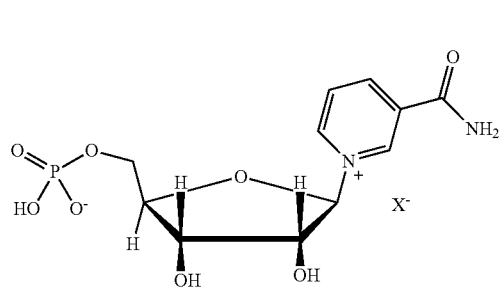

(III)

Nicotinic acid mononucleotide (NaMN) is a pyridinium nicotinyl compound having the formula (IV):

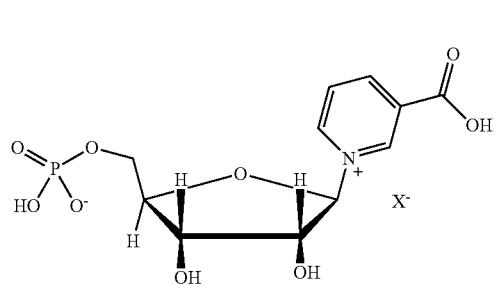

(IV)

Reduced nicotinamide riboside ("NRH") is a 1,4-dihydropyridyl reduced nicotinyl compound having the formula (V):

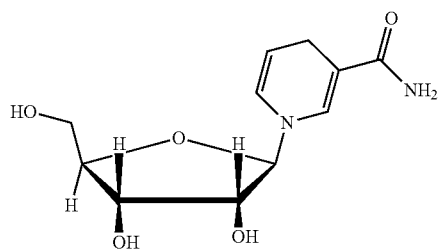

(V)

Reduced nicotinic acid riboside ("NARH") is a 1,4-dihydropyridyl reduced nicotinyl compound having the formula (VI):

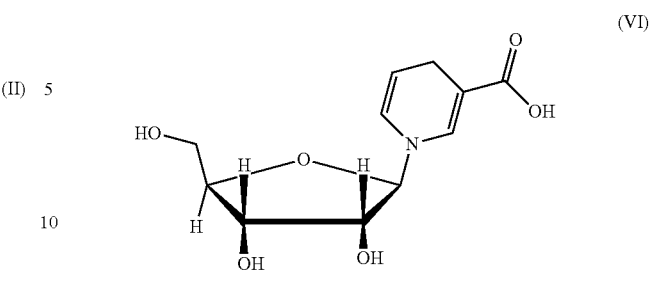

(VI)

The free hydrogens of hydroxyl groups on the ribose moiety of nicotinamide riboside (NR, I) can be substituted with acetyl groups ($CH_3$—$C(\!=\!O)$—) to form 1-(2',3',5'-triacetyl-beta-D-ribofuranosyl)-nicotinamide ("NR triacetate" or "NRTA") having the formula (VII):

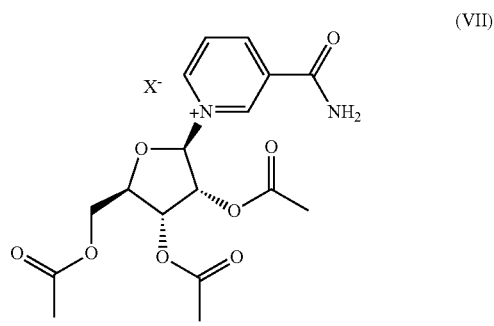

(VII)

The free hydrogens of hydroxyl groups on the ribose moiety of nicotinic acid riboside (NAR, II) can be substituted with acetyl groups ($CH_3$—$C(\!=\!O)$—) to form 1-(2',3',5'-triacetyl-beta-D-ribofuranosyl)-nicotinic acid ("NAR triacetate" or "NARTA") having the formula (VIII):

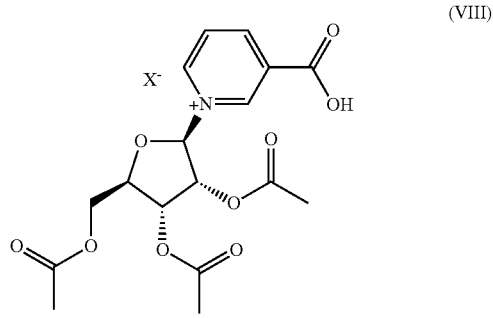

(VIII)

The free hydrogens of hydroxyl groups on the ribose moiety of reduced nicotinamide riboside (NRH, V) can be substituted with acetyl groups ($CH_3$—$C(\!=\!O)$—) to form 1-(2',3',5'-triacetyl-beta-D-ribofuranosyl)-1,4-dihydronicotinamide ("NRH triacetate" or "NRH-TA") having the formula (IX):

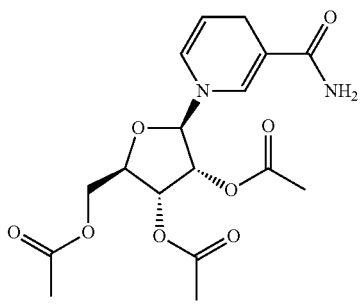

(IX)

The free hydrogens of hydroxyl groups on the ribose moiety of reduced nicotinic acid riboside (NARH, VI) can be substituted with acetyl groups ($CH_3$—C($=$O)—) to form 1-(2',3',5'-triacetyl-beta-D-ribofuranosyl)-1,4-dihydronicotinic acid ("NARH triacetate" or "NARH-TA") having the formula (X):

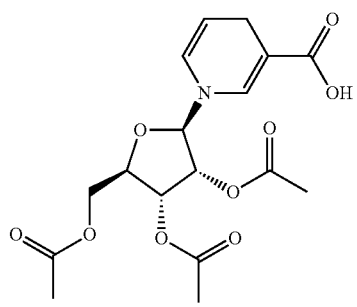

(X)

For each of nicotinamide riboside (NR, I), nicotinic acid riboside (NAR, II), nicotinamide mononucleotide (NMN, III), nicotinic acid mononucleotide (NaMN, IV), reduced nicotinamide riboside (NRH, V), reduced nicotinic acid riboside (NARH, VI), nicotinamide riboside triacetate (NRTA, VII), nicotinic acid riboside triacetate (NARTA, VIII), reduced nicotinamide riboside triacetate (NRH-TA, IX), and reduced nicotinic acid riboside triacetate (NARH-TA, X), optionally $X^-$ as counterion is absent, or when $X^-$ is present, $X^-$ is selected from the group consisting of fluoride, chloride, bromide, iodide, formate, acetate, propionate, butyrate, tartrate, maleate, ascorbate, benzoate, carbonate, citrate, carbamate, gluconate, lactate, methyl bromide, methyl sulfate, nitrate, phosphate, diphosphate, succinate, sulfate, trifluoromethanesulfonate, and trifluoroacetate; and,
  optionally wherein when $X^-$ is absent, optionally the counterion is an internal salt;
  optionally $X^-$ is an anion of a substituted or unsubstituted carboxylic acid selected from monocarboxylic acid, a dicarboxylic acid, or a polycarboxylic acid;
  optionally $X^-$ is an anion of a substituted monocarboxylic acid, further optionally an anion of a substituted propanoic acid (propanoate or propionate), or an anion of a substituted acetic acid (acetate), or an anion of a hydroxyl-propanoic acid, or an anion of 2-hydroxypropanoic acid (being lactic acid; the anion of lactic acid being lactate), or a trihaloacetate selected from trichloroacetate, tribromoacetate, or trifluoroacetate; and,
  optionally $X^-$ is an anion of an unsubstituted monocarboxylic acid selected from formic acid, acetic acid, propionic acid, or butyric acid, stearic acid, oleic acid, linoleic acid, palmitic acid, lauric acid, omega-6 fatty acid, omega-3 fatty acid, myristic acid, the anions being formate, acetate, propionate, and butyrate, and the like, respectively; and,
  optionally $X^-$ is an anion of a substituted or unsubstituted amino acid, i.e., amino-monocarboxylic acid or an amino-dicarboxylic acid, optionally selected from glutamic acid and aspartic acid, the anions being glutamate and aspartate, respectively; and,
  optionally $X^-$ is an anion of ascorbic acid, being ascorbate; and,
  optionally $X^-$ is a halide selected from fluoride, chloride, bromide, or iodide; and,
  optionally $X^-$ is an anion of a substituted or unsubstituted sulfonate, further optionally a trihalomethanesulfonate selected from trifluoromethanesulfonate, tribromomethanesulfonate, or trichloromethanesulfonate; and,
  optionally $X^-$ is an anion of a substituted or unsubstituted carbonate, further optionally hydrogen carbonate.

Without being bound by theory, it is believed that, as can be seen in the $NAD^+$ biosynthetic pathway depicted in FIG. 1, nicotinamide riboside (NR, I) converts to nicotinamide mononucleotide (NMN, III) via phosphorylation by NR kinases (NRKs). Nicotinamide mononucleotide (NMN, III) is then converted to $NAD^+$ by nicotinamide mononucleotide adenylyltransferase (NMNAT). Nicotinamide mononucleotide (NMN, III) is the only metabolite that can be converted to $NAD^+$ in mitochondria, thus nicotinamide and nicotinamide riboside (NR, I) are the two candidate $NAD^+$ precursors that can replenish $NAD^+$ and improve mitochondrial fuel oxidation. However, nicotinamide riboside (NR, I) has a direct two step pathway to $NAD^+$ synthesis that bypasses the rate-limiting step of the salvage pathway, conversion of nicotinamide to nicotinamide mononucleotide (NMN, III) via activity of nicotinamide phosphoribosyltransferase (NAMPT).

A healthy, growing human individual requires a steady intake of essential nutrients, and a key component of that would be an $NAD^+$ precursor. Without being bound by theory, in a particular embodiment, it is believed that administering or delivering at least one compound selected from the group consisting of nicotinamide riboside (NR, I), nicotinic acid riboside (NAR, II), nicotinamide mononucleotide (NMN, III), and nicotinic acid mononucleotide (NaMN, IV), derivatives thereof, or salts thereof, would effectively provide increased levels of $NAD^+$ to a human individual in need thereof compared to levels ordinarily received through nutritional sources or presently commercially available products.

Without being bound by theory, in another particular embodiment, it is believed that administering or delivering at least one compound selected from the group consisting of nicotinamide riboside (NR, I), nicotinic acid riboside (NAR, II), nicotinamide mononucleotide (NMN, III), and nicotinic acid mononucleotide (NaMN, IV), derivatives thereof, or salts thereof, would treat and/or prevent symptoms, diseases, disorders, or conditions associated with, or having etiologies involving, vitamin B3 deficiency and/or that would benefit from increased mitochondrial activity.

Vitamin B3, which is also known as "nicotinic acid," or "niacin," is a pyridine compound. It will be apparent to those skilled in the art that vitamin B3 is functionally and chemically inequivalent to, and not interchangeable with, nicotinamide riboside (NR, I), nicotinic acid riboside (NAR, II), nicotinamide mononucleotide (NMN, III), and nicotinic acid mononucleotide (NaMN, IV), derivatives thereof, or salts thereof. Vitamin B3 has the formula (XI):

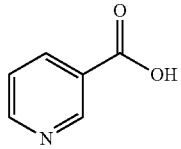
(XI)

Without being bound by theory, it is believed that, as can be seen in the NAD+ biosynthetic pathway depicted in FIG. 1, vitamin B3 (nicotinic acid, or niacin, XI) is converted via several intermediates to NAD+. Niacin is also known to include an admixture with nicotinamide (Nam or NM).

Vitamin B1, which is also known as thiamine, is a compound having the formula (XII):

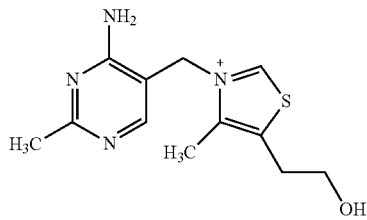
(XII)

Vitamin B2, which is also known as riboflavin, is a compound having the formula (XIII):

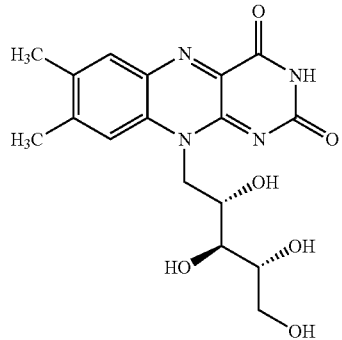
(XIII)

Vitamin B6, which is also known as pyridoxine in the form most commonly given as a supplement, is a compound having the formula (XIV):

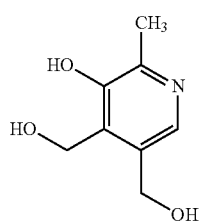
(XIV)

Vitamin B7, which is also known as biotin, is a compound having the formula (XV):

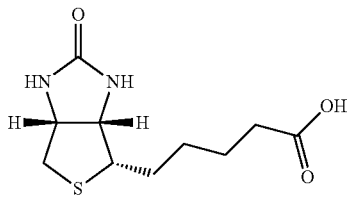
(XV)

Vitamin B9, which is known in one form as folic acid, is a compound having the formula (XVI):

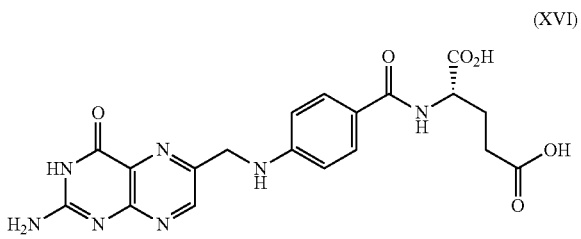 [SMILES: Nc1nc2ncc(CNc3ccc(C(=O)N[C@@H](CCC(=O)O)C(=O)O)cc3)nc2c(=O)[nH]1]
(XVI)

Vitamin B12, which is also known as cobalamin, is a compound having the formula (XVII):

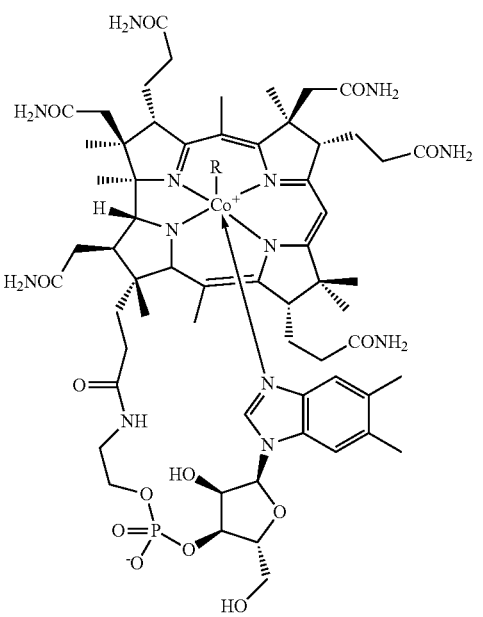
(XVII)

Vitamin $A_1$, which is also known as retinol, is a compound having the formula (XVIII):

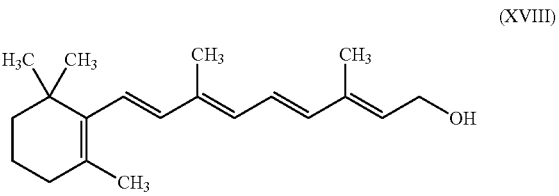 [SMILES: CC1=C(/C=C/C(C)=C/C=C/C(C)=C/CO)C(C)(C)CCC1]
(XVIII)

Vitamin C, which is also known as ascorbic acid, is a compound having the formula (XIX):

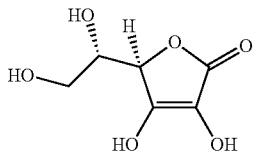

(XIX)

Vitamin D₃, which is also known as cholecalciferol, is a compound having the formula (XX):

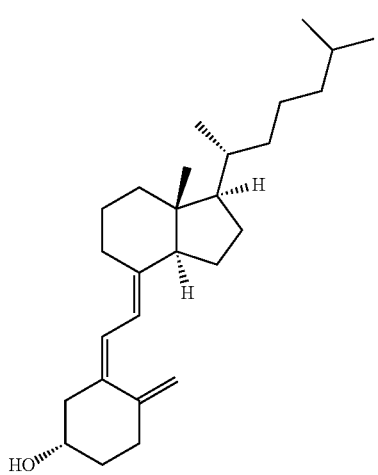

(XX)

Vitamin D₂, which is also known as ergocalciferol, is a compound having the formula (XXI):

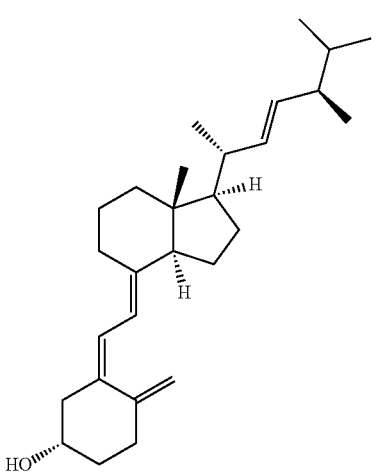

(XXI)

Vitamin E, also known as alpha-tocopherol, is a compound having the formula (XXII):

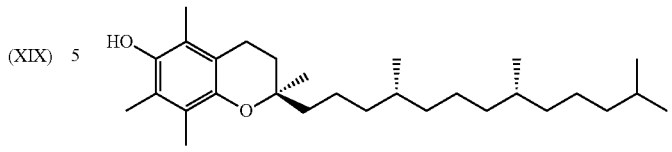

(XXII)

Vitamin K1, also known as phytomenadione or phylloquinone, is a compound having the formula (XXIII):

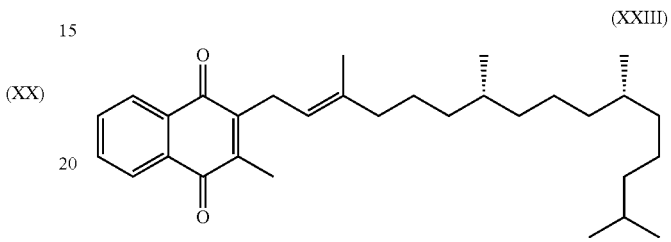

(XXIII)

Without being bound by theory, vitamins B1, B2, B3, and B6 are believed to be closely intertwined in their biosynthetic pathways, with the maintenance and regeneration of the NAD(P)(H) intracellular pool depending on the availability of ThDP (B1), FAD (B2), and PLP (B6). Thiamine (vitamin B1, XII), riboflavin (vitamin B2, XIII), and pyridoxine (vitamin B6, XIV) are salvaged from food and converted back intracellularly to their respective, bioactive forms: Thiamine (ThDP); Flavin Adenine Dinucleotide (FAD); Nicotinamide Adenine Dinucleotide (NAD$^+$); and PyridoxaL Phosphate (PLP). The conversion of vitamins B1, B2, and B6 to ThDP, FAD, and PLP, respectively, is ATP-dependent. Two of the three salvage pathways that convert vitamin B3 to NAD$^+$ are dependent on ThDP (B1), with the de novo production of NAD$^+$ from tryptophan depending on the bioactive forms of vitamins B1, B2, and B6. The vitamin B1 dependency comes from the fact that ThDP (B1) is cofactor for the transketolases involved in the biosynthesis of phosphoriboside pyrophosphate, an essential substrate in these aforementioned NAD$^+$ salvage and de novo pathways.

Without being bound by theory, in yet another embodiment, it is believed that at least one compound selected from the group consisting of nicotinamide riboside (NR, I), nicotinic acid riboside (NAR, II), nicotinamide mononucleotide (NMN, III), nicotinic acid mononucleotide (NaMN, IV), reduced nicotinamide riboside (NRH, V), reduced nicotinic acid riboside (NARH, VI), NR triacetate (NRTA, VII), NAR triacetate (NARTA, VIII), NRH triacetate (NRH-TA, IX), and NARH triacetate (NARH-TA, X), or salts thereof, used alone or in combination with one or more vitamins selected from vitamin B1 (thiamine, XII), vitamin B2 (riboflavin, XIII), vitamin B3 (nicotinic acid, or niacin, XI), vitamin B6 (pyridoxine in supplement form, XIV), vitamin B7 (biotin, XV), vitamin B9 (folic acid, XVI), vitamin B12 (cobalamin, XVII), vitamin A₁ (retinol, XVIII), vitamin C (ascorbic acid, XIX), vitamin D₃ (cholecalciferol, XX), vitamin D₂ (ergocalciferol, XXI), vitamin E (alpha-tocopherol, XXII), and vitamin K₁ (phytomenadione, XXIII) would effectively provide increased levels of NAD$^+$ to a human infant in need thereof compared to levels ordinarily received through human breast milk or presently commercially available infant formula products, in a synergistic manner. It is expected that delivering at least one compound selected from the group consisting of nicotinamide riboside (NR, I), nicotinic acid riboside (NAR, II), nicotinamide mononucleotide (NMN, III), nicotinic acid mononucleotide (NaMN, IV), reduced nicotinamide riboside (NRH, V), reduced nicotinic acid riboside (NARH, VI), NR triacetate (NRTA, VII), NAR triacetate (NARTA, VIII), NRH triacetate (NRH-TA, IX), and NARH triacetate (NARH-TA, X), or salts thereof, optionally in combination with one or more vitamins selected from vitamin B1 (thiamine, XII), vitamin B2 (riboflavin, XIII), vitamin B3 (nicotinic acid, or niacin, XI), vitamin B6 (pyridoxine in supplement form, XIV), vitamin B7 (biotin, XV), vitamin B9 (folic acid, XVI), vitamin B12 (cobalamin, XVII), vitamin $A_1$ (retinol, XVIII), vitamin C (ascorbic acid, XIX), vitamin $D_3$ (cholecalciferol, XX), vitamin $D_2$ (ergocalciferol, XXI), vitamin E (alpha-tocopherol, XXII), and vitamin $K_1$ (phytomenadione, XXIII) would effectively provide increased levels of $NAD^+$ to a human infant in need thereof compared to levels ordinarily received through human breast milk or presently commercially available infant formula products, and higher levels of $NAD^+$ than either a nicotinyl compound (I, II, III, IV, V, VI, VII, VIII, IX and/or IX) or a vitamin (XI, XII, XIII, XIV, XV, XVI, XVII, XVIII, XIX, XX, XXI, XXII, and/or XXIII) alone.

Without being bound by theory, in yet another embodiment, it is believed that at least one compound selected from the group consisting of nicotinamide riboside (NR, I), nicotinic acid riboside (NAR, II), nicotinamide mononucleotide (NMN, III), nicotinic acid mononucleotide (NaMN, IV), reduced nicotinamide riboside (NRH, V), reduced nicotinic acid riboside (NARH, VI), NR triacetate (NRTA, VII), NAR triacetate (NARTA, VIII), NRH triacetate (NRH-TA, IX), and NARH triacetate (NARH-TA, X), or salts thereof, used alone or in combination with one or more vitamins selected from vitamin B1 (thiamine, XII), vitamin B2 (riboflavin, XIII), vitamin B3 (nicotinic acid, or niacin, XI), vitamin B6 (pyridoxine in supplement form, XIV), vitamin B7 (biotin, XV), vitamin B9 (folic acid, XVI), vitamin B12 (cobalamin, XVII), vitamin $A_1$ (retinol, XVIII), vitamin C (ascorbic acid, XIX), vitamin $D_3$ (cholecalciferol, XX), vitamin $D_2$ (ergocalciferol, XXI), vitamin E (alpha-tocopherol, XXII), and vitamin $K_1$ (phytomenadione, XXIII) would effectively provide increased levels of $NAD^+$ to a human individual in need thereof compared to levels ordinarily received through nutritional sources or presently commercially available product, in a synergistic manner. It is expected that delivering at least one compound selected from the group consisting of nicotinamide riboside (NR, I), nicotinic acid riboside (NAR, II), nicotinamide mononucleotide (NMN, III), nicotinic acid mononucleotide (NaMN, IV), reduced nicotinamide riboside (NRH, V), reduced nicotinic acid riboside (NARH, VI), NR triacetate (NRTA, VII), NAR triacetate (NARTA, VIII), NRH triacetate (NRH-TA, IX), and NARH triacetate (NARH-TA, X), or salts thereof, optionally in combination with one or more vitamins selected from vitamin B1 (thiamine, XII), vitamin B2 (riboflavin, XIII), vitamin B3 (nicotinic acid, or niacin, X), vitamin B6 (pyridoxine in supplement form, XIV), vitamin B7 (biotin, XV), vitamin B9 (folic acid, XVI), vitamin B12 (cobalamin, XVII), vitamin $A_1$ (retinol, XVIII), vitamin C (ascorbic acid, XIX), vitamin $D_3$ (cholecalciferol, XX), vitamin $D_2$ (ergocalciferol, XXI), vitamin E (alpha-tocopherol, XXII), and vitamin $K_1$ (phytomenadione, XXIII) would effectively provide increased levels of $NAD^+$ to a human individual in need thereof compared to levels ordinarily received through nutritional sources or presently commercially available products, and higher levels of $NAD^+$ than either a nicotinyl compound (I, II, III, IV, V, VI, VII, VIII, IX, and/or X) or a vitamin (XI, XII, XIII, XIV, XV, XVI, XVII, XVIII, XIX, XX, XXI, XXII, and/or XXIII) alone.

Without being bound by theory, in yet another embodiment, it is believed that at least one compound selected from the group consisting of nicotinamide riboside (NR, I), nicotinic acid riboside (NAR, II), nicotinamide mononucleotide (NMN, III), nicotinic acid mononucleotide (NaMN, IV), reduced nicotinamide riboside (NRH, V), reduced nicotinic acid riboside (NARH, VI), NR triacetate (NRTA, VII), NAR triacetate (NARTA, VIII), NRH triacetate (NRH-TA, IX), and NARH triacetate (NARH-TA, X), or salts thereof, used alone or in combination with one or more vitamins selected from the group consisting of vitamin B1 (thiamine, XII), vitamin B2 (riboflavin, XIII), vitamin B3 (nicotinic acid, or niacin, XI), vitamin B6 (pyridoxine in supplement form, XIV), vitamin B7 (biotin, XV), vitamin B9 (folic acid, XVI), vitamin B12 (cobalamin, XVII), vitamin $A_1$ (retinol, XVIII), vitamin C (ascorbic acid, XIX), vitamin $D_3$ (cholecalciferol, XX), vitamin $D_2$ (ergocalciferol, XXI), vitamin E (alpha-tocopherol, XXII), and vitamin $K_1$ (phytomenadione, XXIII) would be used effectively to treat and/or prevent diseases, symptoms, disorders, or conditions associated with, or having etiologies involving, vitamin B3-deficiency or that would benefit from increased mitochondrial activity, in a human infant in need thereof, in a synergistic manner. It is expected that delivering at least one compound selected from the group consisting of nicotinamide riboside (NR, I), nicotinic acid riboside (NAR, II), nicotinamide mononucleotide (NMN, III), nicotinic acid mononucleotide (NaMN, IV), reduced nicotinamide riboside (NRH, V), reduced nicotinic acid riboside (NARH, VI), NR triacetate (NRTA, VII), NAR triacetate (NARTA, VIII), NRH triacetate (NRH-TA, IX), and NARH triacetate (NARH-TA, X), or salts thereof, in combination with one or more vitamins selected from the group consisting of vitamin B1 (thiamine, XII), vitamin B2 (riboflavin, XIII), vitamin B3 (nicotinic acid, or niacin, XI), vitamin B6 (pyridoxine in supplement form, XIV), vitamin B7 (biotin, XV), vitamin B9 (folic acid, XVI), vitamin B12 (cobalamin, XVII), vitamin $A_1$ (retinol, XVIII), vitamin C (ascorbic acid, XIX), vitamin $D_3$ (cholecalciferol, XX), vitamin $D_2$ (ergocalciferol, XXI), vitamin E (alpha-tocopherol, XXII), and vitamin $K_1$ (phytomenadione, XXIII) would treat and/or prevent symptoms, diseases, disorders, or conditions associated with, or having etiologies involving, vitamin B3-deficiency or that would benefit from increased mitochondrial activity, in a human infant in need thereof more effectively than either a nicotinyl riboside compound (I, II, III, IV, V, VI, VII, VIII, IX, and/or X) or a vitamin (XI, XII, XIII, XIV, XV, XVI, XVII, XVIII, XIX, XX, XXI, XXII, and/or XXIII) alone.

Without being bound by theory, in yet another embodiment, it is believed that at least one compound selected from the group consisting of nicotinamide riboside (NR, I), nicotinic acid riboside (NAR, II), nicotinamide mononucleotide (NMN, III), nicotinic acid mononucleotide (NaMN, IV), reduced nicotinamide riboside (NRH, V), reduced nicotinic acid riboside (NARH, VI), NR triacetate (NRTA, VII), NAR triacetate (NARTA, VIII), NRH triacetate (NRH-TA, IX), and NARH triacetate (NARH-TA, X), or salts thereof, used alone or in combination with one or more vitamins selected from the group of vitamin B1 (thiamine, XII), vitamin B2 (riboflavin, XIII), vitamin B3 (nicotinic acid, or niacin, XI), vitamin B6 (pyridoxine in supplement form, XIV), vitamin B7 (biotin, XV), vitamin B9 (folic acid, XVI), vitamin B12 (cobalamin, XVII), vitamin $A_1$ (retinol, XVIII), vitamin C (ascorbic acid, XIX), vitamin $D_3$ (cholecalciferol, XX), vitamin $D_2$ (ergocalciferol, XXI), vitamin E (alpha-tocopherol, XXII), and vitamin $K_1$ (phytomenadione, XXIII) would be used effectively to treat and/or prevent diseases, symptoms, disorders, or conditions associated with, or having etiologies involving, vitamin B3-deficiency or that would benefit from increased mitochondrial activity, in a human individual in need thereof, in a synergistic manner. It is expected that delivering at least one compound selected from the group consisting of nicotinamide riboside (NR, I), nicotinic acid riboside (NAR, II), nicotinamide mononucleotide (NMN, III), nicotinic acid mononucleotide (NaMN, IV), reduced nicotinamide riboside (NRH, V), reduced nicotinic acid riboside (NARH, VI), NR triacetate (NRTA, VII), NAR triacetate (NARTA, VIII), NRH triacetate (NRH-TA, IX), and NARH triacetate (NARH-TA, X), or salts thereof, in combination with one or more vitamins selected from the group consisting of vitamin B1 (thiamine, XII), vitamin B2 (riboflavin, XIII), vitamin B3 (nicotinic acid, or niacin, XI), vitamin B6 (pyridoxine in supplement form, XIV), vitamin B7 (biotin, XV), vitamin B9 (folic acid, XVI), vitamin B12 (cobalamin, XVII), vitamin $A_1$ (retinol, XVIII), vitamin C (ascorbic acid, XIX), vitamin $D_3$ (cholecalciferol, XX), vitamin $D_2$ (ergocalciferol, XXI), vitamin E (alpha-tocopherol, XXII), and vitamin $K_1$ (phytomenadione, XXIII) would treat and/or prevent symptoms, diseases, disorders, or conditions associated with, or having etiologies involving, vitamin B3-deficiency or that would benefit from increased mitochondrial activity, in a human individual in need thereof more effectively than either a nicotinyl riboside compound (I, II, III, IV, V, VI, VII, VIII, IX, and/or X) or a vitamin (XI, XII, XIII, XIV, XV, XVI, XVII, XVIII, XIX, XX, XXI, XXII, and/or XXIII) alone.

Without being bound by theory, in yet another embodiment, it is believed that at least one compound selected from the group consisting of nicotinamide riboside (NR, I), nicotinic acid riboside (NAR, II), nicotinamide mononucleotide (NMN, III), nicotinic acid mononucleotide (NaMN, IV), reduced nicotinamide riboside (NRH, V), reduced nicotinamide riboside (NARH, VI), NR triacetate (NRTA, VII), NAR triacetate (NARTA, VIII), NRH triacetate (NRH-TA, IX), and NARH triacetate (NARH-TA, X), or salts thereof, used alone or in combination with one or more vitamins selected from the group consisting of vitamin B1 (thiamine, XII), vitamin B2 (riboflavin, XIII), vitamin B3 (nicotinic acid, or niacin, XI), vitamin B6 (pyridoxine in supplement form, XIV), vitamin B7 (biotin, XV), vitamin B9 (folic acid, XVI), vitamin B12 (cobalamin, XVII), vitamin $A_1$ (retinol, XVIII), vitamin C (ascorbic acid, XIX), vitamin $D_3$ (cholecalciferol, XX), vitamin $D_2$ (ergocalciferol, XXI), vitamin E (alpha-tocopherol, XXII), and vitamin $K_1$ (phytomenadione, XXIII) would effectively provide increased levels of beneficial species of bacteria in the gut of an infant human compared to levels ordinarily received through human breast milk or commercially available infant formula products, in a synergistic manner. It is expected that delivering at least one compound selected from the group consisting of nicotinamide riboside (NR, I), nicotinic acid riboside (NAR, II), nicotinamide mononucleotide (NMN, III), nicotinic acid mononucleotide (NaMN, IV), reduced nicotinamide riboside (NRH, V), reduced nicotinic acid riboside (NARH, VI), NR triacetate (NRTA, VII), NAR triacetate (NARTA, VIII), NRH triacetate (NRH-TA, IX), and NARH triacetate (NARH-TA, X), or salts thereof, optionally in combination with one or more vitamins selected from the group consisting of vitamin B1 (thiamine, XII), vitamin B2 (riboflavin, XIII), vitamin B3 (nicotinic acid, or niacin, XI), vitamin B6 (pyridoxine in supplement form, XIV), vitamin B7 (biotin, XV), vitamin B9 (folic acid, XVI), vitamin B12 (cobalamin, XVII), vitamin $A_1$ (retinol, XVIII), vitamin C (ascorbic acid, XIX), vitamin $D_3$ (cholecalciferol, XX), vitamin $D_2$ (ergocalciferol, XXI), vitamin E (alpha-tocopherol, XXII), and vitamin $K_1$ (phytomenadione, XXIII) would effectively provide increased levels of beneficial species of bacteria in the gut of an infant human compared to levels ordinarily received through human breast milk or presently commercially available infant formula products, and higher levels of beneficial species of bacteria in the gut of an infant human than either a nicotinyl riboside compound (I, II, III, IV, V, VI, VII, VIII, IX, and/or X) or a vitamin (XI, XII, XIII, XIV, XV, XVI, XVII, XVIII, XIX, XX, XXI, XXII, and/or XXIII) alone.

Without being bound by theory, in yet another embodiment, it is believed that at least one compound selected from the group consisting of nicotinamide riboside (NR, I), nicotinic acid riboside (NAR, II), nicotinamide mononucleotide (NMN, III), nicotinic acid mononucleotide (NaMN, IV), reduced nicotinamide riboside (NRH, V), reduced nicotinic acid riboside (NARH, VI), NR triacetate (NRTA, VII), NAR triacetate (NARTA, VIII), NRH triacetate (NRH-TA, IX), and NARH triacetate (NARH-TA, X), or salts thereof, used alone or in combination with one or more vitamins selected from the group consisting of vitamin B1 (thiamine, XII), vitamin B2 (riboflavin, XIII), vitamin B3 (nicotinic acid, or niacin, XI), vitamin B6 (pyridoxine in supplement form, XIV), vitamin B7 (biotin, XV), vitamin B9 (folic acid, XVI), vitamin B12 (cobalamin, XVII), vitamin $A_1$ (retinol, XVIII), vitamin C (ascorbic acid, XIX), vitamin $D_3$ (cholecalciferol, XX), vitamin $D_2$ (ergocalciferol, XXI), vitamin E (alpha-tocopherol, XXII), and vitamin $K_1$ (phytomenadione, XXIII) would effectively provide increased levels of beneficial species of bacteria in the gut of a human individual compared to levels ordinarily received through nutritional sources or commercially available products, in a synergistic manner. It is expected that delivering at least one compound selected from the group consisting of nicotinamide riboside (NR, I), nicotinic acid riboside (NAR, II), nicotinamide mononucleotide (NMN, III), nicotinic acid mononucleotide (NaMN, IV), reduced nicotinamide riboside (NRH, V), reduced nicotinic acid riboside (NARH, VI), NR triacetate (NRTA, VII), NAR triacetate (NARTA, VIII), NRH triacetate (NRH-TA, IX), and NARH triacetate (NARH-TA, X), or salts thereof, optionally in combination with one or more vitamins selected from the group consisting of vitamin B1 (thiamine, XII), vitamin B2 (riboflavin, XIII), vitamin B3 (nicotinic acid, or niacin, XI), vitamin B6 (pyridoxine in supplement form, XIV), vitamin B7 (biotin, XV), vitamin B9 (folic acid, XVI), vitamin B12 (cobalamin, XVII), vitamin $A_1$ (retinol, XVIII), vitamin C (ascorbic acid, XIX), vitamin $D_3$ (cholecalciferol, XX), vitamin $D_2$ (ergocalciferol, XXI), vitamin E (alpha-tocopherol, XXII), and vitamin $K_1$ (phytomenadione, XXIII) would effectively provide increased levels of beneficial species of bacteria in the gut of a human individual compared to levels ordinarily received through nutritional sources or presently commercially available products, and higher levels of beneficial species of bacteria in the gut of a human individual than either a nicotinyl riboside compound (I, II, III, IV, V, VI, VII, VIII, IX, and/or X) or a vitamin (XI, XII, XIII, XIV, XV, XVI, XVII, XVIII, XIX, XX, XXI, XXII, and/or XXIII) alone.

Without being bound by theory, in yet another embodiment, it is believed that at least one compound selected from the group consisting of nicotinamide riboside (NR, I), nicotinic acid riboside (NAR, II), nicotinamide mononucleotide (NMN, III), nicotinic acid mononucleotide (NaMN, IV), reduced nicotinamide riboside (NRH, V), reduced nicotinic acid riboside (NARH, VI), NR triacetate (NRTA, VII), NAR triacetate (NARTA, VIII), NRH triacetate (NRH-TA, IX), and NARH triacetate (NARH-TA, X), or salts thereof, used alone or in combination with one or more vitamins selected from the group consisting of vitamin B1 (thiamine, XII), vitamin B2 (riboflavin, XIII), vitamin B3 (nicotinic acid, or niacin, XI), vitamin B6 (pyridoxine in supplement form, XIV), vitamin B7 (biotin, XV), vitamin B9 (folic acid, XVI), vitamin B12 (cobalamin, XVII), vitamin $A_1$ (retinol, XVIII), vitamin C (ascorbic acid, XIX), vitamin $D_3$ (cholecalciferol, XX), vitamin $D_2$ (ergocalciferol, XXI), vitamin E (alpha-tocopherol, XXII), and vitamin $K_1$ (phytomenadione, XXIII) would more effectively promote the gut health of an infant human subject than human breast milk or commercially available infant formula products, in a synergistic manner. It is expected that delivering at least one compound selected from the group consisting of nicotinamide riboside (NR, I), nicotinic acid riboside (NAR, II), nicotinamide mononucleotide (NMN, III), nicotinic acid mononucleotide (NaMN, IV), reduced nicotinamide riboside (NRH, V), reduced nicotinic acid riboside (NARH, VI), NR triacetate (NRTA, VII), NAR triacetate (NARTA, VIII), NRH triacetate (NRH-TA, IX), and NARH triacetate (NARH-TA, X), or salts thereof, optionally in combination with one or more vitamins selected from the group consisting of vitamin B1 (thiamine, XII), vitamin B2 (riboflavin, XIII), vitamin B3 (nicotinic acid, or niacin, XI), vitamin B6 (pyridoxine in supplement form, XIV), vitamin B7 (biotin, XV), vitamin B9 (folic acid, XVI), vitamin B12 (cobalamin, XVII), vitamin $A_1$ (retinol, XVIII), vitamin C (ascorbic acid, XIX), vitamin $D_3$ (cholecalciferol, XX), vitamin $D_2$ (ergocalciferol, XXI), vitamin E (alpha-tocopherol, XXII), and vitamin $K_1$ (phytomenadione, XXIII) would more effectively promote the gut health of an infant human subject than human breast milk or presently commercially available infant formula products, and more effectively promote the gut health of an infant human than either a nicotinyl riboside compound (I, II, III, IV, V, VI, VII, VIII, IX, and/or X) or a vitamin (XI, XII, XIII, XIV, XV, XVI, XVII, XVIII, XIX, XX, XXI, XXII, and/or XXIII) alone.

Without being bound by theory, in yet another embodiment, it is believed that at least one compound selected from the group consisting of nicotinamide riboside (NR, I), nicotinic acid riboside (NAR, II), nicotinamide mononucleotide (NMN, III), nicotinic acid mononucleotide (NaMN, IV), reduced nicotinamide riboside (NRH, V), reduced nicotinic acid riboside (NARH, VI), NR triacetate (NRTA, VII), NAR triacetate (NARTA, VIII), NRH triacetate (NRH-TA, IX), and NARH triacetate (NARH-TA, X), or salts thereof, used alone or in combination with one or more vitamins selected from the group consisting of vitamin B1 (thiamine, XII), vitamin B2 (riboflavin, XIII), vitamin B3 (nicotinic acid, or niacin, XI), vitamin B6 (pyridoxine in supplement form, XIV), vitamin B7 (biotin, XV), vitamin B9 (folic acid, XVI), vitamin B12 (cobalamin, XVII), vitamin $A_1$ (retinol, XVIII), vitamin C (ascorbic acid, XIX), vitamin $D_3$ (cholecalciferol, XX), vitamin $D_2$ (ergocalciferol, XXI), vitamin E (alpha-tocopherol, XXII), and vitamin $K_1$ (phytomenadione, XXIII) would more effectively promote the gut health of a human individual or commercially available products, in a synergistic manner. It is expected that delivering at least one compound selected from the group consisting of nicotinamide riboside (NR, I), nicotinic acid riboside (NAR, II), nicotinamide mononucleotide (NMN, III), nicotinic acid mononucleotide (NaMN, IV), reduced nicotinamide riboside (NRH, V), reduced nicotinic acid riboside (NARH, VI), NR triacetate (NRTA, VII), NAR triacetate (NARTA, VIII), NRH triacetate (NRH-TA, IX), and NARH triacetate (NARH-TA, X), or salts thereof, optionally in combination with one or more vitamins selected from the group consisting of vitamin B1 (thiamine, XII), vitamin B2 (riboflavin, XIII), vitamin B3 (nicotinic acid, or niacin, XI), vitamin B6 (pyridoxine in supplement form, XIV), vitamin B7 (biotin, XV), vitamin B9 (folic acid, XVI), vitamin B12 (cobalamin, XVII), vitamin $A_1$ (retinol, XVIII), vitamin C (ascorbic acid, XIX), vitamin $D_3$ (cholecalciferol, XX), vitamin $D_2$ (ergocalciferol, XXI), vitamin E (alpha-tocopherol, XXII), and vitamin $K_1$ (phytomenadione, XXIII) would more effectively promote the gut health of a human individual than nutritional sources or presently commercially available products, and more effectively promote the gut health of a human individual than either a nicotinyl riboside compound (I, II, III, IV, V, VI, VII, VIII, IX, and/or X) or a vitamin (XI, XII, XIII, XIV, XV, XVI, XVII, XVIII, XIX, XX, XXI, XXII, and/or XXIII) alone.

Without being bound by theory, in yet another embodiment, it is believed that at least one compound selected from the group consisting of nicotinamide riboside (NR, I), nicotinic acid riboside (NAR, II), nicotinamide mononucleotide (NMN, III), nicotinic acid mononucleotide (NaMN, IV), reduced nicotinamide riboside (NRH, V), reduced nicotinic acid riboside (NARH, VI), NR triacetate (NRTA, VII), NAR triacetate (NARTA, VIII), NRH triacetate (NRH-TA, IX), and NARH triacetate (NARH-TA, X), or salts thereof, used alone or in combination with one or more vitamins selected from the group consisting of vitamin B1 (thiamine, XII), vitamin B2 (riboflavin, XIII), vitamin B3 (nicotinic acid, or niacin, XI), vitamin B6 (pyridoxine in supplement form, XIV), vitamin B7 (biotin, XV), vitamin B9 (folic acid, XVI), vitamin B12 (cobalamin, XVII), vitamin $A_1$ (retinol, XVIII), vitamin C (ascorbic acid, XIX), vitamin $D_3$ (cholecalciferol, XX), vitamin $D_2$ (ergocalciferol, XXI), vitamin E (alpha-tocopherol, XXII), and vitamin $K_1$ (phytomenadione, XXIII) would more effectively reduce gastrointestinal inflammation in an infant human subject than human breast milk or commercially available infant formula products, in a synergistic manner. It is expected that delivering at least one compound selected from the group consisting of nicotinamide riboside (NR, I), nicotinic acid riboside (NAR, II), nicotinamide mononucleotide (NMN, III), nicotinic acid mononucleotide (NaMN, IV), reduced nicotinamide riboside (NRH, V), reduced nicotinic acid riboside (NARH, VI), NR triacetate (NRTA, VII), NAR triacetate (NARTA, VIII), NRH triacetate (NRH-TA, IX), and NARH triacetate (NARH-TA, X), or salts thereof, optionally in combination with one or more vitamins selected from the group consisting of vitamin B1 (thiamine, XII), vitamin B2 (riboflavin, XIII), vitamin B3 (nicotinic acid, or niacin, XI), vitamin B6 (pyridoxine in supplement form, XIV), vitamin B7 (biotin, XV), vitamin B9 (folic acid, XVI), vitamin B12 (cobalamin, XVII), vitamin $A_1$ (retinol, XVIII), vitamin C (ascorbic acid, XIX), vitamin $D_3$ (cholecalciferol, XX), vitamin $D_2$ (ergocalciferol, XXI), vitamin E (alpha-tocopherol, XXII), and vitamin $K_1$ (phytomenadione, XXIII) would more effectively reduce gastrointestinal inflammation in an infant human subject than human breast milk or presently commercially available infant formula products, and more effectively reduce gastrointestinal inflammation in an infant human than either a nicotinyl riboside compound (I, II, III, IV, V, VI, VII, VIII, IX, and/or X) or a vitamin (XI, XII, XIII, XIV, XV, XVI, XVII, XVIII, XIX, XX, XXI, XXII, and/or XXIII) alone.

Without being bound by theory, in yet another embodiment, it is believed that at least one compound selected from the group consisting of nicotinamide riboside (NR, I), nicotinic acid riboside (NAR, II), nicotinamide mononucleotide (NMN, III), nicotinic acid mononucleotide (NaMN, IV), reduced nicotinamide riboside (NRH, V), reduced nicotinic acid riboside (NARH, VI), NR triacetate (NRTA, VII), NAR triacetate (NARTA, VIII), NRH triacetate (NRH-TA, IX), and NARH triacetate (NARH-TA, X), or salts thereof, used alone or in combination with one or more vitamins selected from the group consisting of vitamin B1 (thiamine, XII), vitamin B2 (riboflavin, XIII), vitamin B3 (nicotinic acid, or niacin, XI), vitamin B6 (pyridoxine in supplement form, XIV), vitamin B7 (biotin, XV), vitamin B9 (folic acid, XVI), vitamin B12 (cobalamin, XVII), vitamin $A_1$ (retinol, XVIII), vitamin C (ascorbic acid, XIX), vitamin $D_3$ (cholecalciferol, XX), vitamin $D_2$ (ergocalciferol, XXI), vitamin E (alpha-tocopherol, XXII), and vitamin $K_1$ (phytomenadione, XXIII) would more effectively reduce gastrointestinal inflammation in an individual human subject than nutritional sources or commercially available products, in a synergistic manner. It is expected that delivering at least one compound selected from the group consisting of nicotinamide riboside (NR, I), nicotinic acid riboside (NAR, II), nicotinamide mononucleotide (NMN, III), nicotinic acid mononucleotide (NaMN, IV), reduced nicotinamide riboside (NRH, V), reduced nicotinic acid riboside (NARH, VI), NR triacetate (NRTA, VII), NAR triacetate (NARTA, VIII), NRH triacetate (NRH-TA, IX), and NARH triacetate (NARH-TA, X), or salts thereof, optionally in combination with one or more vitamins selected from the group consisting of vitamin B1 (thiamine, XII), vitamin B2 (riboflavin, XIII), vitamin B3 (nicotinic acid, or niacin, XI), vitamin B6 (pyridoxine in supplement form, XIV), vitamin B7 (biotin, XV), vitamin B9 (folic acid, XVI), vitamin B12 (cobalamin, XVII), vitamin $A_1$ (retinol, XVIII), vitamin C (ascorbic acid, XIX), vitamin $D_3$ (cholecalciferol, XX), vitamin $D_2$ (ergocalciferol, XXI), vitamin E (alpha-tocopherol, XXII), and vitamin $K_1$ (phytomenadione, XXIII) would more effectively reduce gastrointestinal inflammation in an individual human subject than nutritional sources or presently commercially available products, and more effectively reduces gastrointestinal inflammation in a human individual than either a nicotinyl riboside compound (I, II, III, IV, V, VI, VII, VIII, IX, and/or X) or a vitamin (XI, XII, XIII, XIV, XV, XVI, XVII, XVIII, XIX, XX, XXI, XXII, and/or XXIII) alone.

The embodiments of the present methods for delivering at least one nicotinyl riboside compound (I, II, III, IV, V, VI, VII, VIII, IX, and/or X), or a salt thereof, alone or in combination with at least one vitamin (XI, XII, XIII, XIV, XV, XVI, XVII, XVIII, XIX, XX, XXI, XXII, and/or XXIII) to a human infant in need thereof described herein have not been demonstrated before.

The embodiments of the present methods for delivering at least one nicotinyl riboside compound (I, II, III, IV, V, VI, VII, VIII, IX, and/or X), or a salt thereof, alone or in combination with at least one vitamin (XI, XII, XIII, XIV, XV, XVI, XVII, XVIII, XIX, XX, XXI, XXII, and/or XXIII) to a human individual in need thereof described herein have not been demonstrated before.

Additionally, the embodiments of the present methods for delivery address limitations of existing technologies to deliver higher levels of $NAD^+$ to a human infant in need thereof than levels ordinarily received through human breast milk or presently commercially available infant formula products.

Additionally, certain embodiments of the present methods for delivery address limitations of existing technologies to deliver increased levels of $NAD^+$ to a human individual in need thereof compared to levels ordinarily received through nutritional sources or presently commercially available products.

The embodiments of the present methods for treating and/or preventing symptoms, diseases, disorders, or conditions associated with, or having etiologies involving, vitamin B3 deficiency and/or that would benefit from increased mitochondrial activity in a human infant comprising administering or providing at least one nicotinyl riboside compound (I, II, III, IV, V, VI, VII, VIII, IX, and/or X), or a salt thereof, alone or in combination with at least one vitamin (XI, XII, XIII, XIV, XV, XVI, XVII, XVIII, XIX, XX, XXI, XXII, and/or XXIII) described herein have not been demonstrated before.

The embodiments of the present methods for treating and/or preventing symptoms, diseases, disorders, or conditions associated with, or having etiologies involving, vitamin B3 deficiency and/or that would benefit from increased mitochondrial activity in a human individual comprising administering or providing at least one nicotinyl riboside compound (I, II, III, IV, V, VI, VII, VIII, IX, and/or X), or a salt thereof, alone or in combination with at least one vitamin (XI, XII, XIII, XIV, XV, XVI, XVII, XVIII, XIX, XX, XXI, XXII, and/or XXIII) described herein have not been demonstrated before.

Additionally, the embodiments of the present methods for treating and/or preventing symptoms, diseases, disorders, or conditions associated with, or having etiologies involving, vitamin B3 deficiency and/or that would benefit from increased mitochondrial activity in a human infant address limitations of existing technologies to treat or prevent symptoms, diseases, disorders, or conditions associated with, or having etiologies involving, vitamin B3 deficiency and/or that would benefit from increased mitochondrial activity.

Additionally, the embodiments of the present methods for treating and/or preventing symptoms, diseases, disorders, or conditions associated with, or having etiologies involving, vitamin B3 deficiency and/or that would benefit from increased mitochondrial activity in a human individual address limitations of existing technologies to treat or prevent symptoms, diseases, disorders, or conditions associated with, or having etiologies involving, vitamin B3 deficiency and/or that would benefit from increased mitochondrial activity.

In certain embodiments, the present disclosure provides methods for treating and/or preventing symptoms, diseases, disorders, or conditions associated with, or having etiologies involving, vitamin B3 deficiency. Exemplary symptoms, diseases, disorders, or conditions associated with, or having etiologies involving, vitamin B3 deficiency that may be treated and/or prevented in accordance with the methods described include indigestion, fatigue, canker sores, vomiting, poor circulation, burning in the mouth, swollen red tongue, and depression. Severe vitamin B3 deficiency can cause a condition known as pellagra, a premature aging condition that is characterized by cracked, scaly skin, dementia, and diarrhea. Other conditions characterized by premature or accelerated aging include Cockayne Syndrome, Neill-Dingwall Syndrome, progeria, and the like.

In certain embodiments, the present disclosure provides methods for treating and/or preventing symptoms, diseases, disorders, or conditions that would benefit from increased mitochondrial activity. Increased mitochondrial activity refers to increasing activity of the mitochondria while maintaining the overall numbers of mitochondria (e.g., mitochondrial mass), increasing the numbers of mitochondria thereby increasing mitochondrial activity (e.g., by stimulating mitochondrial biogenesis), or combinations thereof. In certain embodiments, symptoms, diseases, disorders, or conditions that would benefit from increased mitochondrial activity include symptoms, diseases, disorders, or conditions associated with mitochondrial dysfunction.

In certain embodiments, methods for treating and/or preventing symptoms, diseases, disorders, or conditions that would benefit from increased mitochondrial activity may comprise identifying a subject suffering from a mitochondrial dysfunction. Methods for diagnosing a mitochondrial dysfunction that may involve molecular genetic, pathologic, and/or biochemical analysis are summarized in Bruce H. Cohen & Deborah R. Gold, Mitochondrial cytopathy in adults: what we know so far, 68 CLEVELAND CLINIC J. MED. 625 (2001), incorporated by reference herein in its entirety. One method for diagnosing a mitochondrial dysfunction is the Thor-Byrneier scale. See, e.g., Cohen & Gold, 2001. See also S. Collins et al., *Respiratory Chain Encephalomyopathies: A Diagnostic Classification*, 36 EUROPEAN NEUROLOGY 260 (1996), incorporated by reference herein in its entirety.

Mitochondria are critical for the survival and proper function of almost all types of eukaryotic cells. Mitochondria in virtually any cell type can have congenital or acquired defects that affect their function. Thus, the clinically significant signs and symptoms of mitochondrial defects affecting respiratory chain function are heterogeneous and variable depending on the distribution of defective mitochondria among cells and the severity of their deficits, and upon physiological demands upon the affected cells. Nondividing tissues with high energy requirements, e.g., nervous tissue, skeletal muscle, and cardiac muscle are particularly susceptible to mitochondrial respiratory chain dysfunction, but any organ system can be affected.

Symptoms, diseases, disorders, and conditions associated with mitochondrial dysfunction include symptoms, diseases, disorders, and conditions in which deficits in mitochondrial respiratory chain activity contribute to the development of pathophysiology of such symptoms, diseases, disorders, or conditions in a mammal. This includes congenital genetic deficiencies in activity of one or more components of the mitochondrial respiratory chain, wherein such deficiencies are caused by a) elevated intracellular calcium; b) exposure of affected cells to nitric oxide; c) hypoxia or ischemia; d) microtubule-associated deficits in axonal transport of mitochondria; or e) expression of mitochondrial uncoupling proteins.

Symptoms, diseases, disorders, or conditions that would benefit from increased mitochondrial activity generally include for example, diseases in which free radical mediated oxidative injury leads to tissue degeneration, diseases in which cells inappropriately undergo apoptosis, and diseases in which cells fail to undergo apoptosis. Exemplary symptoms, diseases, disorders, or conditions that would benefit from increased mitochondrial activity include, for example, AMDF (Ataxia, Myoclonus and Deafness), auto-immune disease, cancer, CIPO (Chronic Intestinal Pseudoobstruction with myopathy and Ophthalmoplegia), congenital muscular dystrophy, CPEO (Chronic Progressive External Ophthalmoplegia), DEAF (Maternally inherited DEAFness or aminoglycoside-induced DEAFness), DEMCHO (Dementia and Choria), diabetes mellitus (Type I or Type II), DIDMOAD (Diabetes Insipidus, Diabetes Mellitus, Optic Atrophy, Deafness), DMDF (Diabetes Mellitus and Deafness), dystonia, Exercise Intolerance, ESOC (Epilepsy, Strokes, Optic atrophy, and Cognitive decline), FBSN (Familial Bilateral Striatal Necrosis), FICP (Fatal Infantile Cardiomyopathy Plus, a MELAS-associated cardiomyopathy), GER (Gastrointestinal Reflux), HD (Huntington's Disease), KSS (Kearns Sayre Syndrome), "later-onset" myopathy, LDYT (Leber's hereditary optic neuropathy and DYsTonia), Leigh's Syndrome, LHON (Leber Hereditary Optic Neuropathy), LIMM (Lethal Infantile Mitochondrial Myopathy), MDM (Myopathy and Diabetes Mellitus), MELAS (Mitchondrial Encephalomyopathy, Lactic Acidosis, and Stroke-like episodes), MEPR (Myoclonic Epilepsy and Psychomotor Regression), MERME (MERRF/MELAS overlap disease), MERRF (Myoclonic Epilepsy and Ragged Red Muscle Fibers), MHCM (Maternally Inherited Hypertrophic CardioMyopathy), MICM (Maternally Inherited CardioMyopathy), MILS (Maternally Inherited Leigh Syndrome), Mitochondrial Encephalocardiomyopathy, Mitochondrial Encephalomyopathy, MM (Mitochondrial Myopathy), MMC (Maternal Myopathy and Cardiomyopathy), MNGIE (Myopathy and external ophthalmoplegia, Neuropathy, Gastro-Intestinal, Encephalopathy), Multisystem Mitochondria Disorder (myopathy, encephalopathy, blindness, hearing loss, peripheral neuropathy), NARP (Neurogenic muscle weakness, Ataxia, and Retinitis Pigmentosa; alternate phenotype at this locus is reported as Leigh Disease), Pearson's Syndrome, PEM (Progressive Encephalopathy), PEO (Progressive External Ophthalmoplegia), PME (Progressive Myoclonus Epilepsy), PMPS (Pearson Marrow-Pancreas Syndrome), psoriasis, RTT (Rett Syndrome), schizophrenia, SIDS (Sudden Infant Death Syndrome), SNHL (SensoriNeural Hearing Loss), Varied Familial Presentation (clinical manifestations range from spastic paraparesis to multisystem progressive disorder & fatal cardiomyopathy to truncal ataxia, dysarthria, severe hearing loss, mental regression, ptosis, ophthalmoparesis, distal cyclones, and diabetes mellitus), or Wolfram syndrome.

Other symptoms, diseases, disorders, and conditions that would benefit from increased mitochondrial activity include, for example, Friedreich's ataxia and other ataxias, amyotrophic lateral sclerosis (ALS) and other motor neuron diseases, macular degeneration, epilepsy, Alpers syndrome, Multiple mitochondrial DNA deletion syndrome, MtDNA depletion syndrome, Complex I deficiency, Complex II (SDH) deficiency, Complex III deficiency, Cytochrome c oxidase (COX, Complex IV) deficiency, Complex V deficiency, Adenine Nucleotide Translocator (ANT) deficiency, Pyruvate dehydrogenase (PDH) deficiency, Ethylmalonic aciduria with lactic academia, Refractory epilepsy with declines during infection, Autism with declines during infection, Cerebral palsy with declines during infection, maternally inherited thrombocytopenia and leukemia syndrome, MARIAHS syndrome (Mitochondrial Ataxia, Recurrent Infections, Aphasia, Hypouricemia/hypomyelination, Seizures, and dicarboxylic aciduria), ND6 dystonia, Cyclic vomiting syndrome with declines during infection, 3-Hydroxy isobutyric aciduria with lactic academia, Diabetes mellitus with lactic academia, Uridine Responsive Neurologic Syndrome (URNS), Dilated cardiomyopathy, Splenic Lymphoma, or Renal Tubular Acidosis/Diabetes/Ataxis syndrome.

In other embodiments, the present disclosure provides methods for treating a human infant suffering from mitochondrial disorders arising from, but not limited to, Post-traumatic head injury and cerebral edema, Stroke (invention methods useful for treating or preventing reperfusion injury), Lewy body dementia, Hepatorenal syndrome, Acute liver failure, NASH (Non-Alcoholic SteatoHepatitis), Anti-metastasis/prodifferentiation therapy of cancer, Idiopathic congestive heart failure, Atrial fibrillation (non-valvular), Wolff-Parkinson-White Syndrome, Idiopathic heart block, Prevention of reperfusion injury in acute myocardial infarctions, Familial migraines, Irritable bowel syndrome, Secondary prevention of non-Q wave myocardial infarctions, Premenstrual syndrome, Prevention of renal failure in hepatorenal syndrome, Anti-phospholipid antibody syndrome, Eclampsia/pre-eclampsia, Ischemic heart disease/Angina, and Shy-Drager and unclassified dysautonomia syndromes.

In other embodiments, the present disclosure provides methods for treating a human individual suffering from mitochondrial disorders arising from, but not limited to, Post-traumatic head injury and cerebral edema, Stroke (invention methods useful for treating or preventing reperfusion injury), Lewy body dementia, Hepatorenal syndrome, Acute liver failure, NASH (Non-Alcoholic SteatoHepatitis), Anti-metastasis/prodifferentiation therapy of cancer, Idiopathic congestive heart failure, Atrial fibrillation (non-valvular), Wolff-Parkinson-White Syndrome, Idiopathic heart block, Prevention of reperfusion injury in acute myocardial infarctions, Familial migraines, Irritable bowel syndrome, Secondary prevention of non-Q wave myocardial infarctions, Premenstrual syndrome, Prevention of renal failure in hepatorenal syndrome, Anti-phospholipid antibody syndrome, Eclampsia/pre-eclampsia, Ischemic heart disease/Angina, and Shy-Drager and unclassified dysautonomia syndromes.

Common symptoms of mitochondrial diseases include cardiomyopathy, muscle weakness and atrophy, developmental delays (involving motor, language, cognitive, or executive function), ataxia, epilepsy, renal tubular acidosis, peripheral neuropathy, optic neuropathy, autonomic neuropathy, neurogenic bowel dysfunction, sensorineural deafness, neurogenic bladder dysfunction, dilating cardiomyopathy, hepatic failure, lactic academia, and diabetes mellitus.

In exemplary embodiments, the present disclosure provides methods for treating diseases or disorders that would benefit from increased mitochondrial activity by administering to a human infant a therapeutically effective amount of at least one nicotinyl riboside compound (I, II, III, IV, V, VI, VII, VIII, IX, and/or X), or a salt thereof, alone or in combination with at least one vitamin (XI, XII, XIII, XIV, XV, XVI, XVII, XVIII, XIX, XX, XXI, XXII, and/or XXIII). In exemplary embodiments, the present disclosure provides methods for treating diseases or disorders that would benefit from increased mitochondrial activity by administering to a human individual a therapeutically effective amount of at least one nicotinyl riboside compound (I, II, III, IV, V, VI, VII, VIII, IX, and/or X), or a salt thereof, alone or in combination with at least one vitamin (XI, XII, XIII, XIV, XV, XVI, XVII, XVIII, XIX, XX, XXI, XXII, and/or XXIII). Exemplary diseases or disorders include, but are not limited to, for example, neuromuscular disorders (e.g., Friedreich's Ataxia, muscular dystrophy, multiple sclerosis, etc.), disorders of neuronal instability (e.g., seizure disorders, migraine, etc.), developmental delay, ischemia, renal tubular acidosis, chemotherapy fatigue, mitochondrial myopathies, mitochondrial damage (e.g., calcium accumulation, excitotoxicity, nitric oxide exposure, hypoxia, etc.), and mitochondrial deregulation.

A gene defect underlying Friedreich's Ataxia (FA), the most common hereditary ataxia, was recently identified and is designated "frataxin." In FA, after a period of normal development, deficits in coordination develop that progress to paralysis and death, typically between the ages of 30 and 40. The tissues affected most severely are the spinal cord, peripheral nerves, myocardium, and pancreas. Patients typically lose motor control and are confined to wheel chairs, and are commonly afflicted with heart failure and diabetes. The genetic basis for FA involves GAA trinucleotide repeats in an intron region of the gene encoding frataxin. The presence of these repeats results in reduced transcription and expression of the gene. Frataxin is involved in regulation of mitochondrial iron content. When cellular frataxin content is subnormal, excess iron accumulates in mitochondria, promoting oxidative damage and consequent mitochondrial degeneration and dysfunction. When intermediate numbers of GAA repeats are present in the frataxin gene intron, the severe clinical phenotype of ataxia may not develop. However, these intermediate-length trinucleotide extensions are found in 25 to 30% of patients with non-insulin dependent diabetes mellitus, compared to about 5% of the nondiabetic population. In certain embodiments, a therapeutically effective amount of at least one nicotinyl riboside compound (I, II, III, IV, V, VI, VII, VIII, IX, and/or X), or salt thereof, alone or in combination with at least one vitamin (XI, XII, XIII, XIV, XV, XVI, XVII, XVIII, XIX, XX, XXI, XXII, and/or XXIII) may be used for treating human infants with disorders related to deficiencies or defects in frataxin, including Friedreich's Ataxia, myocardial dysfunction, diabetes mellitus, and complication of diabetes-like neuropathy. In certain embodiments, a therapeutically effective amount of at least one nicotinyl riboside compound (I, II, III, IV, V, VI, VII, VIII, IX, and/or X), or salt thereof, alone or in combination with at least one vitamin (XI, XII, XIII, XIV, XV, XVI, XVII, XVIII, XIX, XX, XXI, XXII, and/or XXIII) may be used for treating human individuals with disorders related to deficiencies or defects in frataxin, including Friedreich's Ataxia, myocardial dysfunction, diabetes mellitus, and complication of diabetes-like neuropathy.

Muscular dystrophy refers to a family of diseases involving deterioration of neuromuscular structure and function, often resulting in atrophy of skeletal muscle and myocardial dysfunction. In the case of Duchenne muscular dystrophy, mutations, or deficits in a specific protein, dystrophin, are implicated in its etiology. Mice with their dystrophin genes inactivated display some characteristics of muscular dystrophy, and have an approximately 50% deficit in mitochondrial respiratory chain activity. A final common pathway for neuromuscular degeneration, in most cases, is calcium-mediated impairment of mitochondrial function. In certain embodiments, a therapeutically effective amount of at least one nicotinyl riboside compound (I, II, III, IV, V, VI, VII, VIII, IX, and/or X), or salt thereof, alone or in combination with at least one vitamin (XI, XII, XIII, XIV, XV, XVI, XVII, XVIII, XIX, XX, XXI, XXII, and/or XXIII) may be used for reducing the rate of decline in muscular capacities and for improving muscular functional status in human infants with muscular dystrophy. In certain embodiments, a therapeutically effective amount of at least one nicotinyl riboside compound (I, II, III, IV, V, VI, VII, VIII, IX, and/or X), or salt thereof, alone or in combination with at least one vitamin (XI, XII, XIII, XIV, XV, XVI, XVII, XVIII, XIX, XX, XXI, XXII, and/or XXIII) may be used for reducing the rate of decline in muscular capacities and for improving muscular functional status in human individuals with muscular dystrophy.

Epilepsy is often present in patients with mitochondrial cytopathies, involving a range of seizure severity and frequency, e.g., absence, tonic, atonic, myoclonic, and status epilepticus, occurring in isolated episodes or many times daily. In certain embodiments, a therapeutically effective amount of at least one nicotinyl riboside compound (I, II, III, IV, V, VI, VII, VIII, IX, and/or X), or salt thereof, alone or in combination with at least one vitamin (XI, XII, XIII, XIV, XV, XVI, XVII, XVIII, XIX, XX, XXI, XXII, and/or XXIII) may be used for treating human infants with seizures secondary to mitochondrial dysfunction, including reducing frequency and severity of seizure activity. In certain embodiments, a therapeutically effective amount of at least one nicotinyl riboside compound (I, II, III, IV, V, VI, VII, VIII, IX, and/or X), or salt thereof, alone or in combination with at least one vitamin (XI, XII, XIII, XIV, XV, XVI, XVII, XVIII, XIX, XX, XXI, XXII, and/or XXIII) may be used for treating human individuals with seizures secondary to mitochondrial dysfunction, including reducing frequency and severity of seizure activity.

Delays in neurological or neuropsychological development are often found in children with mitochondrial diseases. Development and remodeling of neural connections requires intensive biosynthetic activity, particularly involving synthesis of neuronal membranes and myelin, both of which require pyrimidine nucleotides as cofactors. Uridine nucleotides are involved in activation and transfer of sugars to glycolipids and glycoproteins. Cytidine nucleotides are derived from uridine nucleotides, and are crucial for synthesis of major membrane phospholipid constituents like phosphatidylcholine, which receives its choline moiety from cytidine diphosphocholine. In the case of mitochondrial dysfunction (due to either mitochondrial DNA defects or any of the acquired or conditional deficits like excitotoxic or nitric oxide-mediated mitochondrial dysfunction) or other conditions resulting in impaired pyrimidine synthesis, cell proliferation and axonal extension are impaired at crucial stages in development of neuronal interconnections and circuits, resulting in delayed or arrested development of neuronal interconnections and circuits, resulting in delayed or arrested development of neuropsychological functions like language, motor, social, executive function, and cognitive skills. In autism, for example, magnetic resonance spectroscopy measurements of cerebral phosphate compounds indicate that there is global under synthesis of membranes and membrane precursors indicated by reduced levels of uridine diphosphosugars, and cytidine nucleotide derivatives involved in membrane synthesis. Disorders characterized by developmental delay include Rett's Syndrome, pervasive developmental delay (or PDD-NOS ("pervasive developmental delay not otherwise specified") to distinguish it from specific subcategories like autism), autism, Asperger's Syndrome, and Attention Deficit/Hyperactivity Disorder (ADHD), which is becoming recognized as a delay or lag in development of neural circuitry underlying executive functions. In certain embodiments, a therapeutically effective amount of at least one nicotinyl riboside compound (I, II, III, IV, V, VI, VII, VIII, IX, and/or X), or salt thereof, alone or in combination with at least one vitamin (XI, XII, XIII, XIV, XV, XVI, XVII, XVIII, XIX, XX, XXI, XXII, and/or XXIII), may be useful for treating human infants with neurodevelopmental delays (e.g., involving motor, language, executive function, and cognitive skills), or other delays or arrests of neurological and neuropsychological development in the nervous system and somatic development in non-neural tissues like muscle and endocrine glands. In certain embodiments, a therapeutically effective amount of at least one nicotinyl riboside compound (I, II, III, IV, V, VI, VII, VIII, IX, and/or X), or salt thereof, alone or in combination with at least one vitamin (XI, XII, XIII, XIV, XV, XVI, XVII, XVIII, XIX, XX, XXI, XXII, and/or XXIII), may be useful for treating human individuals with neurodevelopmental delays (e.g., involving motor, language, executive function, and cognitive skills), or other delays or arrests of neurological and neuropsychological development in the nervous system and somatic development in non-neural tissues like muscle and endocrine glands.

Oxygen deficiency results in both direct inhibition of mitochondrial respiratory chain activity by depriving cells of a terminal electron acceptor for Cytochrome c reoxidation at Complex IV, and indirectly, especially in the nervous system, via secondary post-anoxic excitotoxicity and nitric oxide formation. In conditions like cerebral anoxia, angina, or sickle cell anemia crises, tissues are relatively hypoxic. In such cases, compounds that increase mitochondrial activity provide protection of affected tissues from deleterious effects of hypoxia attenuate secondary delayed cell death, and accelerate recovery from hypoxic tissue stress and injury. In certain embodiments, a therapeutically effective amount of at least one nicotinyl riboside compound (I, II, III, IV, V, VI, VII, VIII, IX, and/or X), or salt thereof, alone or in combination with at least one vitamin (XI, XII, XIII, XIV, XV, XVI, XVII, XVIII, XIX, XX, XXI, XXII, and/or XXIII) may be useful for treating and/or preventing delayed cell death (apoptosis in regions like the hippocampus or cortex occurring about 2 to 5 days after an episode of cerebral ischemia) after ischemic or hypoxic insult to the brain.

Acidosis due to renal dysfunction is often observed in patients with mitochondrial disease, whether the underlying respiratory chain dysfunction is congenital or induced by ischemia or cytotoxic agents like cisplatin. Renal tubular acidosis often requires administration of exogenous sodium bicarbonate to maintain blood and tissue pH. In certain embodiments, a therapeutically effective amount of at least one nicotinyl riboside compound (I, II, III, IV, V, VI, VII, VIII, IX, and/or X), or salts thereof, alone or in combination with at least one vitamin (XI, XII, XIII, XIV, XV, XVI, XVII, XVIII, XIX, XX, XXI, XXII, and/or XXIII) may be useful for treating and/or preventing renal tubular acidosis and other forms of renal dysfunction caused by mitochondrial respiratory chain deficits.

Mitochondrial DNA damage is more extensive and persists longer than nuclear DNA damage in cells subjected to oxidative stress or cancer chemotherapy agents like cisplatin due to both greater vulnerability and less efficient repair of mitochondrial DNA. Although mitochondrial DNA may be more sensitive to damage than nuclear DNA, it is relatively resistant, in some situations, to mutagenesis by chemical carcinogens. This is because mitochondria respond to some types of mitochondrial DNA damage by destroying their defective genomes rather than attempting to repair them. This results in global mitochondrial dysfunction for a period after cytotoxic chemotherapy. Clinical use of chemotherapy agents like cisplatin, mitomycin, and cytoxan is often accomplished by debilitating "chemotherapy fatigue," prolonged periods of weakness and exercise intolerance that may persist even after recovery from hematologic and gastrointestinal toxicities of such agents. In certain embodiments, a therapeutically effective amount of at least one nicotinyl riboside compound (I, II, III, IV, V, VI, VII, VIII, IX, and/or X), or salt thereof, alone or in combination with at least one vitamin (XI, XII, XIII, XIV, XV, XVI, XVII, XVIII, XIX, XX, XXI, XXII, and/or XXIII) may be useful for treatment and/or prevention of side effects of cancer chemotherapy related to mitochondrial dysfunction.

In certain embodiments, a therapeutically effective amount of at least one nicotinyl riboside compound (I, II, III, IV, V, VI, VII, VIII, IX, and/or X), or salt thereof, alone or in combination with at least one vitamin (XI, XII, XIII, XIV, XV, XVI, XVII, XVIII, XIX, XX, XXI, XXII, and/or XXIII) may be useful for treatment and/or prevention of mitochondrial myopathies. Mitochondrial myopathies range from mild, slowly progressive weakness of the extraocular muscles to severe, fatal infantile myopathies and multisystem encephalomyopathies. Some syndromes have been defined, with some overlap between them. Established syndromes affecting muscle include progressive external ophthalmoplegia, the Kearns-Sayre syndrome (with ophthalmoplegia, pigmentary retinopathy, cardiac conduction defects, cerebellar ataxia, and sensorineural deafness), the MELAS syndrome (mitochondrial encephalomyopathy, lactic acidosis, and stroke-like episodes), the MERFF syndrome (myoclonic epilepsy and ragged red fibers), limb-girdle distribution weakness, and infantile myopathy (benign or severe and fatal). Muscle biopsy specimens stained with modified Gomori's trichrome stain show ragged red fibers due to excessive accumulation of mitochondria. Biochemical defects in substrate transport and utilization, the Krebs cycle, oxidative phosphorylation, or the respiratory chain are detectable. Numerous mitochondrial DNA point mutations and deletions have been described, transmitted in a maternal, non-mendelian inheritance pattern. Mutations in nuclear-encoded mitochondrial enzymes occur.

In certain embodiments, a therapeutically effective amount of at least one nicotinyl riboside compound (I, II, III, IV, V, VI, VII, VIII, IX, and/or X), or salt thereof, alone or in combination with at least one vitamin (XI, XII, XIII, XIV, XV, XVI, XVII, XVIII, XIX, XX, XXI, XXII, and/or XXIII) may be useful for treating patients suffering from toxic damage to mitochondria, such as toxic damage due to calcium accumulation, excitotoxicity, nitric oxide exposure, drug induced toxic damage, or hypoxia.

A fundamental mechanism of cell injury, especially in excitable tissues, involves excessive calcium entry into cells, as a result of either leakage through the plasma membrane or defects in intracellular calcium handling mechanisms. Mitochondria are major sites of calcium sequestration, and preferentially utilize energy from the respiratory chain for taking up calcium rather than for ATP synthesis, which results in a downward spiral of mitochondrial failure, because calcium uptake into mitochondria results in diminished capabilities for energy transduction.

Excessive stimulation of neurons with excitatory amino acids is a common mechanism of cell death or injury in the central nervous system. Activation of glutamate receptors, especially of the subtype designated NMDA receptors, results in mitochondrial dysfunction, in part through elevation of intracellular calcium during excitotoxic stimulation. Conversely, deficits in mitochondrial respiration and oxidative phosphorylation sensitizes cells to excitotoxic stimuli, resulting in cell death or injury during exposure to levels of excitotoxic neurotransmitters or toxins that would be innocuous to normal cells.

Nitric oxide (about 1 micromolar) inhibits cytochrome oxidase (Complex IV) and thereby inhibits mitochondrial respiration; moreover, prolonged exposure to nitric oxide (NO) irreversibly reduces Complex I activity. Physiological or pathophysiological concentrations of NO thereby inhibit pyrimidine biosynthesis. Nitric oxide is implicated in a variety of neurodegenerative disorders including inflammatory and autoimmune diseases of the central nervous system, and is involved in mediation of excitotoxic and post-hypoxic damage to neurons.

Oxygen is the terminal electron acceptor in the respiratory chain. Oxygen deficiency impairs electron transport chain activity, resulting in diminished pyrimidine synthesis as well as diminished ATP synthesis via oxidative phosphorylation. Human cells proliferate and retain viability under virtually anaerobic conditions if provided with uridine and pyruvate (or a similarly effective agent for oxidizing NADH to optimize glycolytic ATP production).

In certain embodiments, a therapeutically effective amount of at least one nicotinyl riboside compound (I, II, III, IV, V, VI, VII, VIII, IX, and/or X), or salt thereof, alone or in combination with at least one vitamin (XI, XII, XIII, XIV, XV, XVI, XVII, XVIII, XIX, XX, XXI, XXII, and/or XXIII) may be useful for treating and/or preventing diseases or disorders associated with mitochondrial deregulation.

Transcription of mitochondrial DNA encoding respiratory chain components requires nuclear factors. In neuronal axons, mitochondria must shuttle back and forth to the nucleus in order to maintain respiratory chain activity. If axonal transport is impaired by hypoxia or by drugs like taxol that affect microtubule stability, mitochondria distant from the nucleus undergo loss of cytochrome oxidase activity. Accordingly, in certain embodiments, treatment with a therapeutically effective amount of at least one nicotinyl riboside compound (I, II, III, IV, V, VI, VII, VIII, IX, and/or X), or salt thereof, alone or in combination with at least one vitamin (XI, XII, XIII, XIV, XV, XVI, XVII, XVIII, XIX, XX, XXI, XXII, and/or XXIII) may be useful for promoting nuclear-mitochondrial interactions.

Mitochondria are the primary source of free radicals and reactive oxygen species, due to spillover from the mitochondrial respiratory chain, especially when defects in one or more respiratory chain components impairs orderly transfer of electrons from metabolic intermediates to molecular oxygen. To reduce oxidative damage, cells can compensate by expressing mitochondrial uncoupling proteins ("UCPs"), of which several have been identified. UCP-2 is transcribed in response to oxidative damage, inflammatory cytokines, or excess lipid loads, e.g., fatty liver and steatohepatitis. UCPs reducer spillover of reactive oxygen species from mitochondria by discharging proton gradients across the mitochondrial inner membrane, in effect wasting energy produced by metabolism and rendering cells vulnerable to energy stress as a trade-off for reduced oxidative injury.

In certain embodiments, the present disclosure provides a method of protecting a human infant from chronic inflammation that can cause abnormal neurogenesis. Formula-fed infants can be dysbiotic, meaning that their gut microflora are not the same as they would be if such infants were breast-fed. For example, Bifidobacteria is more prevalent in the gut of breast-fed infants as compared to formula-fed infants. See, e.g., Gordon Cooke et al., *Comparing the gut flora of Irish breastfed and formula-fed neonates aged between birth and 6 weeks old,* 17 MICROBIAL ECOLOGY IN HEALTH & DISEASE 163 (2005), incorporated by reference herein in its entirety. Further, *E. coli* and Enterococci, were more prevalent in the gut of infants fed formula. This observed dysbiosis can produce endotoxins that promote inflammation, and that in turn can inhibit neurogenesis. Raz Yirmiya & Inbal Goshen, *Immune modulation of learning, memory, neural plasticity, and neurogenesis,* 25 BRAIN, BEHAVIOR, & IMMUNITY 181 (2011), incorporated by reference herein in its entirety. Further, nicotinamide (Nam or NM) has been shown to lower inflammation and cognitive impairment in rats. See, e.g., Ying Wang & Min Zuo, *Nicotinamide improves sevoflurane-induced cognitive impairment through suppression of inflammation and anti-apoptosis in rat,* 8 INT'L J. CLIN. EXP. MED. 20079 (2015), incorporated by reference herein in its entirety. It is believed that certain embodiments of the present invention will suppress inflammation and promote healthy neurogenesis. It is further believed that certain embodiments of the present disclosure will promote a health gut-brain axis that is instrumental to healthy brain development and function.

In another embodiment, the present disclosure provides a method for meeting the optimal protein energy needs of a preterm infant to promote healthy neurological development. These preterm infants are at high risk of malnutrition. There is a well-established link between energy metabolism and neurodevelopment. See, e.g., Kristin Keunen et al., *Impact of nutrition on brain development and its neuroprotective implications following preterm birth*, 77 PEDIATRIC RESEARCH 148 (2015), incorporated by reference herein in its entirety. Normally, in late-term gestation, important brain growth and brain maturation takes place. Certain embodiments of the present disclosure provide a method for healthy neurogenesis in premature infants as well as in full term infants. First week protein and energy intake has been shown to be especially beneficial for premature, very low-weight babies. See, e.g., Bonnie E. Stephens et al., *First Week Protein and Energy Intakes Are Associated With 18-Month Developmental Outcomes in Extremely Low Birth Weight Infants*, 123 PEDIATRICS 1337 (2009), incorporated by reference herein in its entirety. It has been shown that nicotinamide riboside (NR, I) is an efficient $NAD^+$ precursor, and thus should be administered to any infant whose energy demand is critical.

In another embodiment, the present disclosure provides a method of treating a human infant in need of preventing and/or reversing early obesogenic programming. Studies have shown that an obesogenic maternal diet can affect fetal growth, which can lead to health implications later in life. See, e.g., Amanda N. Sferruzzi-Perri et al., *An obesogenic diet during mouse pregnancy modifies maternal nutrient partitioning and the fetal growth trajectory*, FASEB J. 3928 (2013), incorporated by reference herein in its entirety. Nicotinamide riboside (NR, I) has been shown to more efficiently metabolize a high-fat diet, and thus it is believed that nicotinamide riboside (NR, I) will have anti-obesogenic effects. Specifically, mice on a high-fat diet have been shown to gain 40% less weight when supplemented with nicotinamide riboside (NR, I). See, e.g., Carles Cantó et al., *The $NAD^+$ Precursor Nicotinamide Riboside Enhances Oxidative Metabolism and Protects Against High-Fat Diet-Induced Obesity*, 15 CELL METABOLISM 838 (2012), incorporated by reference herein in its entirety.

In another embodiment, the present disclosure provides a method for supplementing infant formula with an important vitamin required in early infant development. One study documenting the vitamin B content of human breast milk over time demonstrated, surprisingly, that B vitamins are lower in the colostrums than in mature milk. See, e.g., Xiangnan Ren et al., *B-Vitamin Levels in Human Milk among Different Lactation Stages and Areas in China*, 10 PLoS ONE e0133285 (2015), incorporated by reference herein in its entirety. Ren et al. only looked at niacin (X) and nicotinamide (Nam or NM) for vitamin B3 content. It is believed that nicotinamide riboside (NR, I) is the important vitamin B3 source in early milk production, essential for the energy demand of a rapidly developing infant.

Salts of Nicotinyl Riboside Compounds (I, II, III, IV, V, VI, VII, VIII, IX, and X) According to the Present Invention The methods of using nicotinyl riboside compounds (I, II, III, IV, V, VI, VII, VIII, IX, and X) of the present invention may take the form of salts. The term "salts" embraces addition salts of free acids or free bases that are nicotinyl riboside compounds (I, II, III, IV, V, VI, VII, VIII, IX, and X) of the methods of the present invention. The term "pharmaceutically acceptable salt" refers to salts that possess toxicity profiles within a range that affords utility in pharmaceutical applications.

Suitable pharmaceutically acceptable acid addition salts may be prepared from an inorganic acid or from an organic acid. Examples of organic acids include hydrochloric, hydrobromic, hydroiodic, nitric, carbonic, sulfuric, and phosphoric acids. Appropriate organic acids may be selected from aliphatic, cycloaliphatic, aromatic, araliphatic, heterocyclic, carboxylic, and sulfonic classes of organic acids, examples of which include formic, acetic, propionic, succinic, glycolic, gluconic, lactic, malic, tartaric, citric, ascorbic, glucuronic, maleic, fumaric, pyruvic, aspartic, glutamic, benzoic, anthranilic, 4-hydroxybenzoic, phenylacetic, mandelic, embonic (pamoic), methanesulfonic, ethanesulfonic, benzenesulfonic, pantothenic, trifluoroacetic, trifluoromethanesulfonic, 2-hydroxyethanesulfonic, p-toluenesulfonic, sulfanilic, cyclohexylaminosulfonic, stearic, alginic, β-hydroxybutyric, salicylic, galactaric, and galacturonic acid. In the present examples of uses of nicotinyl riboside compounds (I, II, III, IV, V, VI, VII, VIII, IX, and X), i.e., compounds containing amino groups and pyridinium groups, said compounds can be isolated as salts of inorganic acids or strong organic acids, e.g., hydrochloric acid or trifluoroacetic acid.

Suitable pharmaceutically acceptable base addition salts of nicotinyl compounds of the methods of the invention include, but are not limited to, for example, metallic salts including alkali metal, alkaline earth metal, and transition metal salts such as, for example, calcium, magnesium, potassium, sodium, and zinc salts. Pharmaceutically acceptable base addition salts also include organic salts made from basic amines such as, for example, N,N-dibenzylethylenediamine, chloroprocaine, choline, diethanolamine, ethylenediamine, meglumine (N-methylglucamine), tromethamine (tris(hydroxymethyl)aminomethane), and procaine.

Optionally wherein a basic counterion, or anion, is present, said basic counterion or anion is selected from the group consisting of fluoride, chloride, bromide, iodide, formate, acetate, propionate, butyrate, ascorbate, benzoate, carbonate, citrate, carbamate, gluconate, lactate, methyl bromide, methyl sulfate, nitrate, phosphate, diphosphate, succinate, sulfate, trifluoromethanesulfonate, and trifluoroacetate; and,
  optionally the basic counterion, or anion, is an internal salt;
  optionally the basic counterion, or anion, is an anion of a substituted or unsubstituted carboxylic acid selected from a monocarboxylic acid, a dicarboxylic acid, or a polycarboxylic acid;
  optionally the basic counterion, or anion, is an anion of a substituted monocarboxylic acid, further optionally an anion of a substituted propanoic acid (propanoate or propionate), or an anion of a substituted acetic acid (acetate), or an anion of a hydroxyl-propanoic acid, or an anion of 2-hydroxypropanoic acid (being lactic acid; the anion of lactic acid being lactate), or a trihaloacetate selected from trichloroacetate, tribromoacetate, or trifluoroacetate; and,
  optionally the basic counterion, or anion, is an anion of an unsubstituted monocarboxylic acid selected from formic acid, acetic acid, propionic acid, or butyric acid, the anions being formate, acetate, propionate, and butyrate, respectively; and,
  optionally the basic counterion, or anion, is an anion of a substituted or unsubstituted amino acid, i.e., amino-monocarboxylic acid or an amino-dicarboxylic acid, optionally selected from glutamic acid and aspartic acid, the anions being glutamate and aspartate, respectively; and, optionally the basic counterion, or anion, is an anion of ascorbic acid, being ascorbate; and, optionally the basic counterion, or anion, is a halide selected from fluoride, chloride, bromide, or iodide; and, optionally the basic counterion, or anion, is an anion of a substituted or unsubstituted sulfonate, further optionally a trihalomethanesulfonate selected from trifluoromethanesulfonate, tribromomethanesulfonate, or trichloromethanesulfonate; and, optionally the basic counterion, or anion, is an anion of a substituted or unsubstituted carbonate, further optionally hydrogen carbonate.

All of these salts may be prepared by conventional means from the corresponding nicotinyl riboside compounds (I, II, III, IV, V, VI, VII, VIII, IX, and X) by reacting, for example, the appropriate acid or base with the nicotinyl compounds (I, II, III, IV, V, VI, VII, VIII, IX, and X). Preferably, the salts are in crystalline form, or alternatively in dried or freeze-dried form. The person skilled in the art will know how to prepare and select suitable forms, for example, as described in P. H. STAHL & C. G. WERMUTH, HANDBOOK OF PHARMACEUTICAL SALTS: PROPERTIES, SELECTION, AND USE (Wiley-VCH 2012), incorporated by reference herein in its entirety.

Delivery and Administration Systems of the Present Invention

The methods described herein may comprise administering daily, or every other day, or once a week, a high dose of one or more nicotinyl riboside compounds (I, II, III, IV, V, VI, VII, VIII, IX, and/or X), or salts thereof, alone or in combination with one or more vitamins (XI, XII, XIII, XIV, XV, XVI, XVII, XVIII, XIX, XX, XXI, XXII, and/or XXIII), e.g., in the form of a pill, to a subject. In embodiments where the high dose of one or more nicotinyl riboside compounds (I, II, III, IV, V, VI, VII, VIII, IX, and/or X), or salts thereof, alone or in combination with one or more vitamins (XI, XII, XIII, XIV, XV, XVI, XVII, XVIII, XIX, XX, XXI, XXII, and/or XXIII), is administered daily to the subject, the one or more nicotinyl riboside compounds (I, II, III, IV, V, VI, VII, VIII, IX, and/or X), or salts thereof, alone or in combination with one or more vitamins (XI, XII, XIII, XIV, XV, XVI, XVII, XVIII, XIX, XX, XXI, XXII, and/or XXIII), may be administered once a day. In other embodiments, it is administered twice or three times a day.

In some embodiments, the high dose of one or more nicotinyl riboside compounds (I, II, III, IV, V, VI, VII, VIII, IX, and/or X), or salts thereof, alone or in combination with one or more vitamins (XI, XII, XIII, XIV, XV, XVI, XVII, XVIII, XIX, XX, XXI, XXII, and/or XXIII), is administered in a sustained release formulation, e.g., by embedding or encapsulating the one or more nicotinyl riboside compounds (I, II, III, IV, V, VI, VII, VIII, IX, and/or X), or salts thereof, alone or in combination with one or more vitamins (XI, XII, XIII, XIV, XV, XVI, XVII, XVIII, XIX, XX, XXI, XXII, and/or XXIII) into nanoparticles for delivery over a period of at least 12 hours, to a subject. In embodiments where the one or more nicotinyl riboside compounds (I, II, III, IV, V, VI, VII, VIII, IX, and/or X), or salts thereof, alone or in combination with one or more vitamins (XI, XII, XIII, XIV, XV, XVI, XVII, XVIII, XIX, XX, XXI, XXII, and/or XXIII), is administered to a subject in a sustained release formulation, a high dose of the one or more nicotinyl riboside compounds (I, II, III, IV, V, VI, VII, VIII, IX, and/or X), or salts thereof, alone or in combination with one or more vitamins (XI, XII, XIII, XIV, XV, XVI, XVII, XVIII, XIX, XX, XXI, XXII, and/or XXIII), may be administered for sustained delivery over a period of, for example, at least about 12, 15, 18, 24, or 36 hours, or longer. In other embodiments, it is administered for a sustained delivery over a period of one or more days. In yet other embodiments, it is administered for a sustained delivery over a period of one or more weeks.

In certain embodiments, the one or more nicotinyl riboside compounds (I, II, III, IV, V, VI, VII, VIII, IX, and/or X), or salts thereof, alone or in combination with one or more vitamins (XI, XII, XIII, XIV, XV, XVI, XVII, XVIII, XIX, XX, XXI, XXII, and/or XXIII), are administered in a nutraceutical formulation. A "nutraceutical" is any functional food (including beverages) that provides an additional benefit other than its nutritional benefit. In a preferred embodiment, a nutraceutical is provided and contains from about 0.1% to about 99%, or from about 0.1% to about 10%, of one or more nicotinyl riboside compounds (I, II, III, IV, V, VI, VII, VIII, IX, and/or X), or salts thereof, alone or in combination with one or more vitamins (XI, XII, XIII, XIV, XV, XVI, XVII, XVIII, XIX, XX, XXI, XXII, and/or XXIII), by weight. In preferred embodiments, a high dose as described herein of one or more nicotinyl riboside compounds (I, II, III, IV, V, VI, VII, VIII, IX, and/or X), or salts thereof, alone or in combination with one or more vitamins (XI, XII, XIII, XIV, XV, XVI, XVII, XVIII, XIX, XX, XXI, XXII, and/or XXIII), is administered in a single serving of a food or beverage. In a preferred formulation, a single dosage form is provided (e.g., an 8 fluid ounce serving of a beverage such as water, flavored water, or fruit juice) that contains a quantity of one or more nicotinyl riboside compounds (I, II, III, IV, V, VI, VII, VIII, IX and/or X), or salts thereof, alone or in combination with one or more vitamins (XI, XII, XIII, XIV, XV, XVI, XVII, XVIII, XIX, XX, XXI, XXII, and/or XXIII), that has a physiological effect equal to or greater than the physiological effect of 25 mg total of one or more nicotinyl riboside compounds (I, II, III, IV, V, VI, VII, VIII, IX, and/or X), or salts thereof, alone or in combination with one or more vitamins (XI, XII, XIII, XIV, XV, XVI, XVII, XVIII, XIX, XX, XXI, XXII, and/or XXIII). In another preferred formulation, a single dosage form is provided (e.g., an 8 fluid ounce serving of a beverage such as water, flavored water, or fruit juice) that contains a quantity of one or more nicotinyl riboside compounds (I, II, III, IV, V, VI, VII, VIII, IX, and/or X), or salts thereof, bound to protein including, but not limited to, hydrolyzed whey or non-hydrolyzed whey, alone or in combination with one or more vitamins (XI, XII, XIII, XIV, XV, XVI, XVII, XVIII, XIX, XX, XXI, XXII, and/or XIII), that has a physiological effect equal to or greater than the physiological effect of 25 mg total of one or more nicotinyl riboside compounds (I, II, III, IV, V, VI, VII, VIII, IX, and/or X), or salts thereof, alone or in combination with one or more vitamins (XI, XII, XIII, XIV, XV, XVI, XVII, XVIII, XIX, XX, XXI, XXII, and/or XXIII). In other embodiments, a single dosage form is provided that contains a total quantity of one or more nicotinyl riboside compounds (I, II, III, IV, V, VI, VII, VIII, IX, and/or X), or salts thereof, alone or in combination with one or more vitamins (XI, XII, XIII, XIV, XV, XVI, XVII, XVIII, XIX, XX, XXI, XXII, and/or XXIII) that has a physiological effect equal to or greater than the physiological effect of about 10, 15, 20, 25, 50, 60, 75, 80, 100, 150, 200, or more mg one or more nicotinyl riboside compounds (I, II, III, IV, V, VI, VII, VIII, IX, and/or X), or salts thereof, alone or in combination with one or more vitamins (XI, XII, XIII, XIV, XV, XVI, XVII, XVIII, XIX, XX, XXI, XXII, and/or XXIII), per 8 fluid ounces. In other preferred embodiments, a single dosage form is provided (e.g., a serving of food such as a nutrition bar) that contains a total quantity of one or more nicotinyl riboside compounds (I, II, III, IV, V, VI, VII, VIII, IX, and/or X), or salts thereof, alone or in combination with one or more vitamins (XI, XII, XIII, XIV, XV, XVI, XVII, XVIII, XIX, XX, XXI, XXII, and/or XXIII), that has a physiological effect equal to or greater than the physiological effect of 100 mg one or more nicotinyl riboside compounds (I, II, III, IV, V, VI, VII, VIII, IX, and/or X), or salts thereof, alone or in combination with one or more vitamins (XI, XII, XIII, XIV, XV, XVI, XVII, XVIII, XIX, XX, XXI, XXII, and/or XXIII). In some embodiments, the food supplies 100 to 500 kcal per serving. In other embodiments, a single dosage form is provided that contains a total quantity of one or more nicotinyl riboside compounds (I, II, III, IV, V, VI, VII, VIII, IX, and/or X), or salts thereof, alone or in combination with one or more vitamins (XI, XII, XIII, XIV, XV, XVI, XVII, XVIII, XIX, XX, XXI, XXII, and/or XXIII), that has a physiological effect equal to or greater than the physiological effect of 20, 50, 60, 75, 80, 100, 150, 200, 250, or more, mg one or more nicotinyl riboside compounds (I, II, III, IV, V, VI, VII, VIII, IX, and/or X), or salts thereof, alone or in combination with one or more vitamins (XI, XII, XIII, XIV, XV, XVI, XVII, XVIII, XIX, XX, XXI, XXII, and/or XXIII), per 100 to 500 kcal. The phrase "total quantity of one or more nicotinyl riboside compounds (I, II, III, IV, V, VI, VII, VIII, IX, and/or X), or salts thereof, alone or in combination with one or more vitamins (XI, XII, XIII, XIV, XV, XVI, XVII, XVIII, XIX, XX, XXI, XXII, and/or XXIII)" refers to the total amount of one or more nicotinyl riboside compounds (I, II, III, IV, V, VI, VII, VIII, IX, and/or X), or salts thereof, alone or in combination with one or more vitamins (XI, XII, XIII, XIV, XV, XVI, XVII, XVIII, XIX, XX, XXI, XXII, and/or XXIII), present in the single dosage form.

In various embodiments, a nutraceutical comprising one or more nicotinyl riboside compounds (I, II, III, IV, V, VI, VII, VIII, IX, and/or X), or salts thereof, alone or in combination with one or more vitamins (XI, XII, XIII, XIV, XV, XVI, XVII, XVIII, XIX, XX, XXI, XXII, and/or XXIII), may be any variety of food or drink. For example, nutraceuticals may include drinks such as nutritional drinks, diet drinks (e.g., Slimfast™, Boost™, and the like) as well as sports (e.g., Gatorade™, Powerade™, EAS™, and the like), herbal, medical (e.g., Ensure®, Optifast™), and other fortified beverages (e.g., MuscleMilk™, Pedialyte™). Additionally, nutraceuticals may include food intended for human or animal consumption such as baked goods, for example, bread, wafers, cookies, crackers, pretzels, pizza, and rolls; ready-to-eat ("RTE") breakfast cereals, hot cereals; pasta products; snacks such as fruit snacks, salty snacks, grain snacks, nutrition bars, and microwave popcorn; dairy products such as yogurt, cheese, and ice cream; sweet goods such as hard candy, soft candy, and chocolate; beverages; animal feed; pet foods such as dog food and cat food; aqua-culture foods such as fish food and shrimp feed; and special purpose foods such as baby food (e.g., Gerber™), infant formulas (e.g., Good Start™, Similac™, Enfamil™), hospital food, medical food, sports food, performance food, or nutritional bars; fortified foods; food preblends; or mixes for home or food service use, such as preblends for soups or gravy, dessert mixes, dinner mixes, baking mixes such as bread mixes and cake mixes, and baking flour. In certain embodiments, the food or beverage does not include one or more of grapes, mulberries, blueberries, raspberries, peanuts, yeast, or extracts thereof.

In certain embodiments, a composition including one or more nicotinyl riboside compounds (I, II, III, IV, V, VI, VII, VIII, IX, and/or X), or salts thereof, alone or in combination with one or more vitamins (XI, XII, XIII, XIV, XV, XVI, XVII, XVIII, XIX, XX, XXI, XXII, and/or XXIII), may be a solution for intravenous or parenteral administration. In a preferred embodiment, the one or more nicotinyl riboside compounds (I, II, III, IV, V, VI, VII, VIII, IX, and/or X) included in the solution for intravenous or parenteral administration may be stabilized.

In certain embodiments, methods for delivering the one or more nicotinyl riboside compounds (I, II, III, IV, V, VI, VII, VIII, IX, and/or X), or salts thereof, alone or in combination with one or more vitamins (XI, XII, XIII, XIV, XV, XVI, XVII, XVIII, XIX, XX, XXI, XXII, and/or XXIII), of the present invention to a human infant in need thereof, and methods of treating and/or preventing symptoms, diseases, disorders, or conditions associated with, or having etiologies involving, vitamin B3 deficiency and/or that would benefit from increased mitochondrial activity in a human infant comprise delivering or administering an infant formula.

In certain embodiments, methods for delivering the one or more nicotinyl riboside compounds (I, II, III, IV, V, VI, VII, VIII, IX, and/or X), or salts thereof, alone or in combination with one or more vitamins (XI, XII, XIII, XIV, XV, XVI, XVII, XVIII, XIX, XX, XXI, XXII, and/or XXIII), of the present invention to a human individual in need thereof, and methods of treating and/or preventing symptoms, diseases, disorders, or conditions associated with, or having etiologies involving, vitamin B3 deficiency and/or that would benefit from increased mitochondrial activity in a human individual comprise delivering or administering a composition or formulation.

In certain embodiments, the one or more nicotinyl riboside compounds (I, II, III, IV, V, VI, VII, VIII, IX, and/or X), or salts thereof, alone or in combination with one or more vitamins (XI, XII, XIII, XIV, XV, XVI, XVII, XVIII, XIX, XX, XXI, XXII, and/or XXIII) are delivered by being "encased," "encapsulated," and/or "microencapsulated" in liposomes, phospholipids, glycolipids, sodium alginate, calcium alginate, cottonseed oil, coconut oil, bees wax, carnuba wax, chocolate coating, cacao butter, and mixtures thereof This method of delivery is currently used in infant formulas for babies with severe and/or undesirable reflux. This microencapsulation method of delivery allows for a slow release mechanism for nicotinyl riboside compound delivery by mouth, and could be used for individuals with severe and/or undesirable reflux and/or as a method of stabilizing nicotinyl riboside compound(s) in any liquid including, for example, infant formula, beverages, or retort mixtures. Microencapsulation techniques are well known in the art. Nutritional components of compositions and formulations are known in the art and one with knowledge in the art would be able to adjust formulation compositions to include one or more nicotinyl compounds (I, II, III, IV, V, VI, VII, VIII, IX, and/or X), or salts thereof, alone or in combination with one or more vitamins (XI, XII, XIII, XIV, XV, XVI, XVII, XVIII, XIX, XX, XXI, XXII, and/or XXIII). For example, an infant formula typically contains a protein comprising from about 6% to about 25% of the total caloric content of the infant formula; a carbohydrate component comprising from about 3% to about 50% of the total caloric content of the infant formula; and a lipid content comprising from about 30% to about 50% of the total caloric content of the infant formula. These ranges are provided as examples only, and are not intended to be limiting.

In infant formula, tryptophan becomes the first limiting amino acid when the protein content is reduced and no free amino acids are added. See, e.g., Manja Fledderman et al., *Energetic Efficiency of Infant Formulae: A Review*, 64 ANNALS OF NUTRITION & METABOLISM 276 (2014), incorporated by reference herein in its entirety. One essential function of tryptophan is as an $NAD^+$ precursor. It is expected that addition of nicotinamide riboside (NR, I), nicotinic acid riboside (NAR, II), nicotinamide mononucleotide (NMN, III), nicotinic acid mononucleotide (NaMN, IV), reduced nicotinamide riboside (NRH, V), reduced nicotinic acid riboside (NARH, VI), nicotinamide riboside triacetate (NRTA, VII), nicotinic acid riboside triacetate (NARTA, VIII), reduced nicotinamide riboside triacetate (NRH-TA, IX), and/or reduced nicotinic acid riboside triacetate (NARH-TA, X), or salts thereof, alone or in combination with one or more vitamins (XI, XII, XIII, XIV, XV, XVI, XVII, XVIII, XIX, XX, XXI, XXII, and/or XXIII), to infant formula will release tryptophan from being consumed for $NAD^+$ synthesis, as all ten of these nicotinyl compounds are more efficient $NAD^+$ precursors. Thus, it is expected that it will take a longer period of time before tryptophan becomes limiting.

Examples of suitable fat sources suitable for human individuals that may be added to formulations according to embodiments of the present invention typically include high oleic safflower oil, soy oil, fractionated coconut oil (medium chain triglycerides, MCT oil), high oleic sunflower oil, corn oil, canola oil, coconut, palm, and palm kernel oils, marine oil, cottonseed oil, walnut oil, wheat germ oil, sesame oil, cod liver oil, and peanut oil. Any single fat listed above, or any combination thereof, as appropriate, may be utilized. Other suitable fats will be readily apparent to those skilled in the art. Without being bound by theory, any one fat may have a stabilizing effect on a formulation according to embodiments of the present invention. Further, formulations according embodiments of the present invention including any combination of fats may synergistically provide a stabilizing effect in combination that is greater than the stabilizing effect provided individually by any of the fats of the combination.

Additional components of formulations typically include, for example, protein, carbohydrates, and minerals. Examples of suitable protein sources for human individuals that may be added to formulations according to embodiments of the present invention typically include casein, whey, condensed skim milk, nonfat milk, soy, pea, rice, wheat, corn, hydrolyzed protein, free amino acids, and protein sources that contain calcium in a colloidal suspension with the protein. Any single protein listed above, or any combination thereof, as appropriate, may be utilized. Other suitable proteins will be readily apparent to those skilled in the art. Without being bound by theory, any one protein may have a stabilizing effect on a formulation according to embodiments of the present invention. Further, formulations according to embodiments of the present invention including any combination of proteins may synergistically provide a stabilizing effect in combination that is greater than the stabilizing effect provided individually by any of the proteins of the combination.

A third component of many formulations is a source of carbohydrates. Carbohydrates are a major source of readily available energy that an individual requires that protects the individual from tissue catabolism. Examples of carbohydrates suitable for human individuals that may be added to formulations according to embodiments of the present invention typically include cereal grains, hydrolyzed corn-starch, maltodextrin, glucose polymers, sucrose, lactose, corn syrup, corn syrup solids, rice syrup, glucose, fructose, high fructose corn syrup, and indigestible oligosaccharides such as fructooligosaccharides ("FOS"). Any single carbohydrate listed above, or any combination thereof, as appropriate, may be utilized. Other suitable carbohydrates will be readily apparent to those skilled in the art. Without being bound by theory, any one carbohydrate may have a stabilizing effect on a formulation according to embodiments of the present invention. Further, formulations according to embodiments of the present invention including any combination of carbohydrates may synergistically provide a stabilizing effect in combination that is greater than the stabilizing effect provided individually by any of the carbohydrates of the combination.

A formulation typically includes supplemented vitamins and minerals. Examples of minerals that may be added to formulations according to embodiments of the present invention typically include calcium, phosphorus, magnesium, zinc, manganese, copper, sodium, potassium, chloride, iron, and selenium. The additional nutrients chromium, molybdenum, iodine, taurine, carnitine, and choline may also be included. Without being bound by theory, any one vitamin or mineral may have a stabilizing effect on a formulation according to embodiments of the present invention. Further, formulations according to embodiments of the present invention including any combination of vitamins and/or minerals may synergistically provide a stabilizing effect in combination that is greater than the stabilizing effect provided individually by any of the vitamins or minerals of the combination.

Without being bound by theory, any one fat, protein, carbohydrate, vitamin, or mineral may have a stabilizing effect on formulations according to embodiments of the present invention. Further, formulations according to embodiments of the present invention including any combination of fat, protein, carbohydrate, vitamin, and/or mineral may synergistically provide a stabilizing effect in combination that is greater than the stabilizing effect provided individually by any of the vitamins or minerals of the combination.

In a certain embodiment, an exemplary composition for an infant formula for this invention, which adheres to the Food & Drug Administration's regulation codified at 21 C.F.R. § 107.100, pertaining to infant formula, is as follows for each 100 kilocalories (kcal): protein in a range of about 1.8 g-4.5 g, which can be selected from whey protein and/or casein; fat in the range of about 30%-54% of the total calories can be selected from palm oil and/or soy oil; linoleic acid, at a minimum of about 2.7% of total calories, which can be supplement with docosahexaenoic acid ("DHA") and arachidonic acid ("ARA"); and other vitamins and/or minerals, which will be added according to 21 C.F.R. § 107.100 guidelines, the only deviation to the formula. Niacin (XI) levels will be added at minimum recommended levels, while the amounts of Vitamin B1 (XII), Vitamin B2 (XIII), Vitamin B6 (XIV), Vitamin B7 (XV), Vitamin B9 (XVI), Vitamin B12 (XVII), Vitamin $A_1$ (XVIII), Vitamin C (XIX), Vitamin $D_3$ (XX), Vitamin $D_2$ (XXI), Vitamin E (XXII), and/or Vitamin $K_1$ (XXIII) will all be increased proportionally with the amount of nicotinamide riboside (NR, I) added, because these vitamins support the metabolism of nicotinamide riboside (NR, I). Thus, for example, for every 300 μg nicotinamide riboside (NR, I) added per 100 kilocalories, about 40 μg Vitamin B1 (XII), about 60 μg Vitamin B2 (XIII), and about 35 μg Vitamin B6 (XIV) may be added, respectively. Ranges of about 100 µg to about 600 µg nicotinamide riboside (NR, I) are preferred per 100 kilocalories (kcal).

In other embodiments, ranges of nicotinamide riboside (NR, I) can range from about 1 µg to about 10,000 µg per 100 kilocalories (kcal) of infant formula.

In a certain embodiment, an exemplary composition for a beverage or food for this invention, includes Niacin (XI) levels added at minimum recommended levels, while the amounts of Vitamin B1 (XII), Vitamin B2 (XIII), Vitamin B6 (XIV), Vitamin B7 (XV), Vitamin B9 (XVI), Vitamin B12 (XVII), Vitamin $A_1$ (XVIII), Vitamin C (XIX), Vitamin $D_3$ (XX), Vitamin $D_2$ (XXI), Vitamin E (XXII), and/or Vitamin $K_1$ (XXIII) will all be increased proportionally with the amount of nicotinamide riboside (NR, I) added, because these vitamins support the metabolism of nicotinamide riboside (NR, I). Exemplary amounts of nicotinamide riboside (NR, I) can be from about 1 mg to about 4000 mg nicotinamide riboside (NR, I) per 100 kilocalories. Preferably, ranges of from about 25 mg to about 300 mg nicotinamide riboside (NR, I) are preferred per 100 kilocalories (kcal).

In alternative embodiments, at least one of nicotinyl compounds II, III, IV, V, VI, VII, VIII, IX, and/or X may be used in similar ranges optionally in combination with nicotinamide riboside (NR, I).

Formulations may be prepared as any product form suitable for use in human individuals, including reconstitutable powders, ready-to-feed liquids, parenteral (intravenous) formulations, and dilutable liquid concentrates, product forms which are all well known in the nutritional formula art. As used in the present application, the amounts of components present in formulations or compositions refer to the amounts when the formulation or composition is ready for consumption by the human individual. It is to be understood that in the case of a reconstitutable powder or dilutable liquid concentrate, the component amounts will be adjusted such that when the formulation or composition is reconstituted or diluted the amounts are as described herein. Thus, for example, reference to an infant formula composition that is to be diluted by, for example, addition of one part water for one part formulation or composition, wherein the formulation or composition has a given component concentration, when ready for consumption, is intended to cover a formulation or composition having a concentration of the component of twice the given amount, before it is made ready for consumption by the addition of water. Methods to prepare formulations are known to those skilled in the art. For example, the one or more nicotinyl compounds (I, II, III, IV, V, VI, VII, VIII, IX, and/or X), or salts thereof, alone or in combination with one or more vitamins (XI, XII, XIII, XIV, XV, XVI, XVII, XVIII, XIX, XX, XXI, XXII, and/or XXIII) can be added directly to a liquid formulation or composition at a suitable point in the manufacturing process.

Formulations or compositions can optionally be sterilized and subsequently used on a ready-to-feed basis, or can be stored as concentrates. Concentrates can be prepared by spray drying a liquid formulation prepared as above, and a formulation can be reconstituted by rehydrating the concentrate. The formulation concentrate is a stable liquid and has a suitable shelf life.

The one or more nicotinyl compounds (I, II, III, IV, V, VI, VII, VIII, IX, and/or X), or salts thereof, alone or in combination with one or more vitamins (XI, XII, XIII, XIV, XV, XVI, XVII, XVIII, XIX, XX, XXI, XXII, and/or XXIII), used in the methods of the present invention can be microencapsulated prior to the addition into a formulation or composition. The choice of coating for the microencapsulation is determined by its lack of toxicity, desired particle size, and stability under the processing conditions for infant formulas, particularly sterilization. Any conventionally acceptable substantially oxygen- and/or moisture-impermeable coating can be used. Such conventional microencapsulating methods and coating materials are well within the purview of one skilled in the art, and the specific microencapsulating method and coating are not peculiar to the present invention.

In certain embodiments, nicotinamide riboside (NR, I), nicotinic acid riboside (NAR, II), nicotinamide mononucleotide (NMN, III), nicotinic acid mononucleotide (NaMN, IV), reduced nicotinamide riboside (NRH, V), reduced nicotinic acid riboside (NARH, VI), NR triacetate (NRTA, VII), NAR triacetate (NARTA, VIII), NRH triacetate (NRH-TA, IX), and/or NARH triacetate (NARH-TA, X), binding of whey and/or protein, including, but not limited to, general milk protein (e.g., organic, non-organic), whey protein isolate (e.g., hydrolyzed, non-hydrolyzed), casein (e.g., micellar casein, caseinates), individual milk proteins (e.g., albumin, alpha-lactalbumin, beta-lactoglobulin), can also be used to stabilize nicotinamide riboside (NR, I), nicotinic acid riboside (NAR, II), nicotinamide mononucleotide (NMN, III), nicotinic acid mononucleotide (NaMN, IV), reduced nicotinamide riboside (NRH, V), reduced nicotinic acid riboside (NARH, VI), NR triacetate (NRTA, VII), NAR triacetate (NARTA, VIII), NRH triacetate (NRH-TA, IX), and/or NARH triacetate (NARH-TA, X), in a liquid formulation.

For powder embodiments of formulations or compositions comprising one or more nicotinyl compounds (I, II, III, IV, V, VI, VII, VIII, IX, and/or X), or salts thereof, alone or in combination with one or more vitamins (X, XI, XII, XIII, XIV, XV, XVI, XVII, XVIII, XIX, XX, XXI, XXII, and/or XXIII), used in the methods of the present invention, reconstitution of the powder can be done with a suitable aqueous liquid, preferably water. Reconstitutable powders are typically in the form of flowable or substantially flowable particulate compositions, or at least particular compositions that can be easily scooped and measured with a spoon or similar other device, wherein the compositions can be easily reconstituted by the intended user with a suitable aqueous fluid, typically water, to form a liquid formulation or composition. In this context, "immediate" use generally means within about 48 hours, most typically within about 24 hours, preferably right after reconstitution. These powder embodiments include spray dried, agglomerated, dry mixed or other known or otherwise effective particulate form. The quantity of a nutritional powder required to produce a volume suitable for one serving can vary.

The nutritional formulas used in the methods of the present invention may be packaged and sealed in single or multi-use containers, and then stored under ambient conditions for up to about 36 months or longer, more typically from about 12 to about 24 months. For multi-use containers, these packages can be opened and then covered for repeated use by the ultimate user, provided that the covered package is then stored under ambient conditions (e.g., avoid extreme temperatures) and the contents used within about one month or so.

Premature infants require additional nutrients to support their growth and are at risk for the diseases related to prematurity. Preterm infants are commonly fed either a commercial infant formula designed specifically for these infants or their own mother's milk. Another means of feeding a preterm infant is to supplement preterm milk, banked term milk, other suitable milk, or infant formula with a milk or formula fortifier. Such supplemented milk or formula can more adequately provide levels of one or more nicotinyl compounds (I, II, III, IV, V, VI, VII, VIII, IX, and/or X), or salts thereof, alone or in combination with one or more vitamins (X, XI, XII, XIII, XIV, XV, XVI, XVII, XVIII, XIX, XX, XXI, XXII, and/or XXIII), to meet the needs of these infants.

Compositions for oral formulations useful for delivering a dietary supplement composition comprising one or more nicotinyl compounds (I, II, III, IV, V, VI, VII, VIII, IX, and/or X), or salts thereof, alone or in combination with one or more vitamins (XI, XII, XIII, XIV, XV, XVI, XVII, XVIII, XIX, XX, XXI, XXII, and/or XXIII), that are palatable to human individuals are known in the art. Dietary supplement compositions useful for delivering comprising one or more nicotinyl compounds (I, II, III, IV, V, VI, VII, VIII, IX, and/or X), or salts thereof, alone or in combination with one or more vitamins (XI, XII, XIII, XIV, XV, XVI, XVII, XVIII, XIX, XX, XXI, XXII, and/or XXIII), can be orally administered, for example, with an inert diluent or with an assimilable edible carrier, or it can be enclosed in hard or soft shell gelatin or hydroxypropyl methylcellulose (i.e., hypromellose) capsules, or it can be compressed into tablets, or it can be incorporated directly with the food of the diet. For oral administration, a dietary composition comprising one or more nicotinyl compounds (I, II, III, IV, V, VI, VII, VIII, IX, and/or X), or salts thereof, alone or in combination with one or more vitamins (X, XI, XII, XIII, XIV, XV, XVI, XVII, XVIII, XIX, XX, XXI, XXII, and/or XXIII) may be incorporated with an excipient and used in the form of ingestible tablets, buccal tablets, troches, capsules, elixirs, suspensions, syrups, wafers, and the like. The tablets, troches, pills, capsules, and the like can also contain the following: a binder such as gum tragacanth, acacia, corn starch, or gelatin; excipients such as dicalcium phosphate, microcrystalline cellulose, and the like; a disintegrating agent such as potato starch, alginic acid, and the like; a lubricant such as magnesium stearate; and a sweetening agent such as sucrose, lactose, or saccharin can be added or a flavoring agent such as peppermint, oil of wintergreen, or cherry flavoring. When the dosage unit form is a capsule, it can contain, in addition to materials of the above type, a liquid carrier. Various other materials can be present as coatings or to otherwise modify the physical form of the dosage unit. For instance, tablets, pills, or capsules can be coated with shellac, sugar, or both. A syrup or elixir can contain the active compound, sucrose as a sweetening agent, methyl and propylparabens as preservatives, a dye, and flavoring such as cherry or orange flavor. Oil-in-water emulsions may be better for oral use in infants because these are water-miscible, and thus their oiliness is masked. Such emulsions are well known in the pharmaceutical sciences.

The compositions and methods described in the embodiments above may be further understood in connection with the following Examples. In addition, the following non-limiting examples are provided to illustrate the invention. However, the person skilled in the art will appreciate that it may be necessary to vary the procedures for any given embodiment of the invention, e.g., vary the order or steps of the methods and/or the compounds and/or vitamins used.

Example 1

Figure 2A:
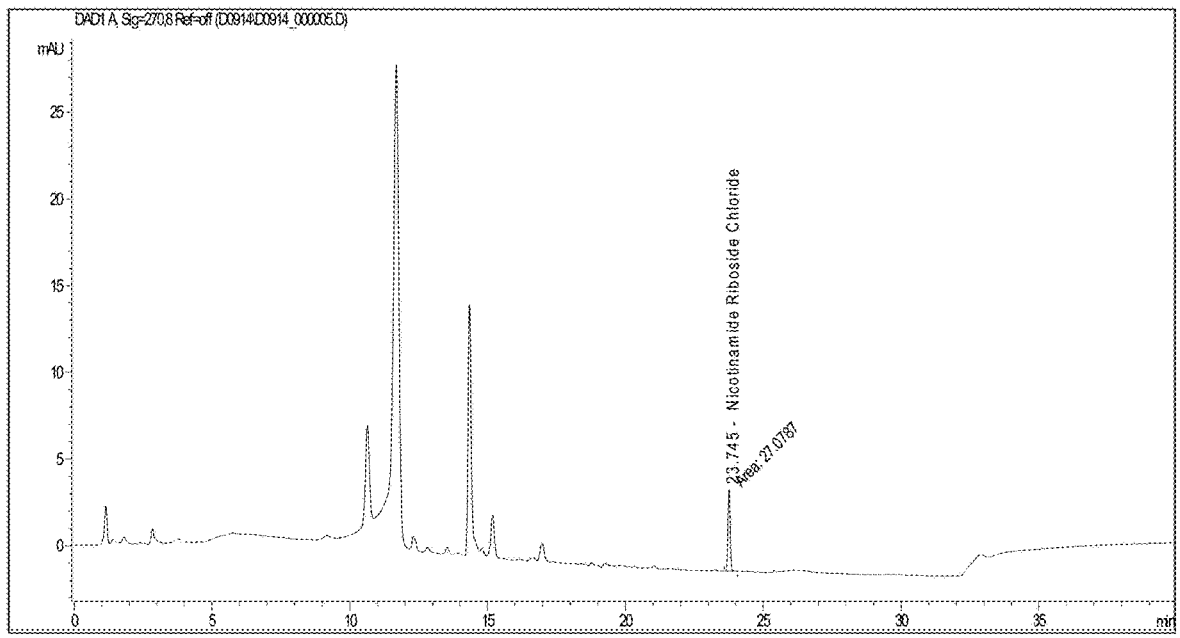
FIG. 2 depicts, in an embodiment, chromatograms demonstrating, comparatively, detection of nicotinamide riboside (NR) present in store bought (cow) milk (FIG. 2A) and detection of nicotinamide riboside (NR) after adding nicotinamide riboside (NR) to the milk sample at a known amount (FIGS. 2B and 2C).
Figure 2B:
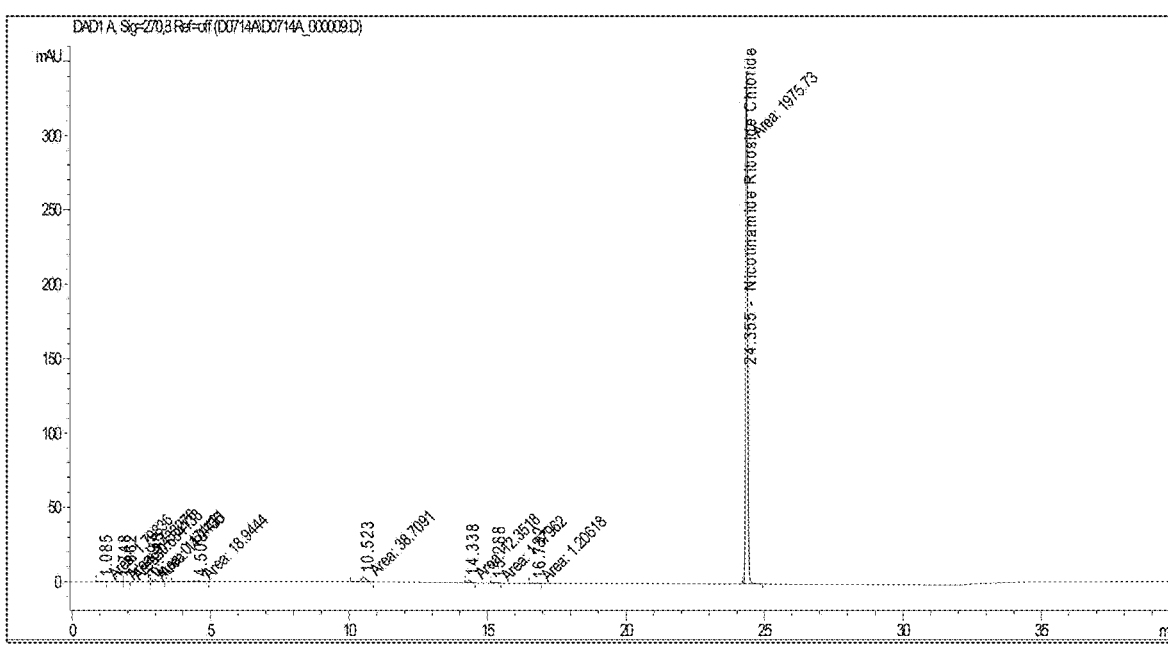
Figure 2C:
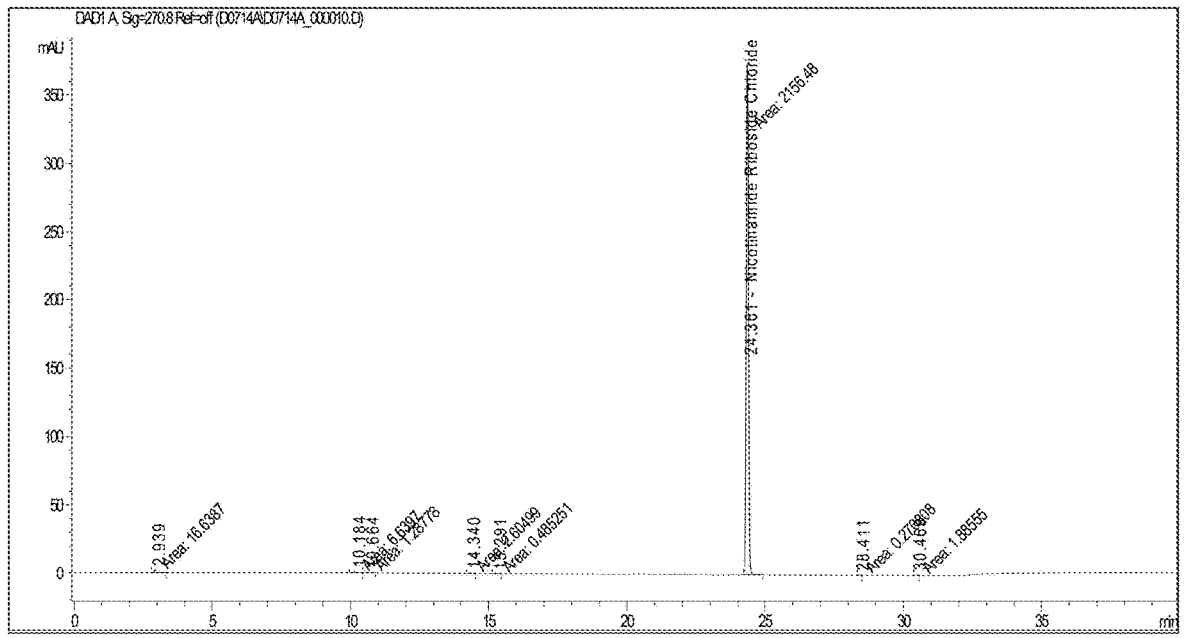

Nicotinamide riboside (NR, I) is also naturally found in milk. FIG. 2 demonstrates that nicotinamide riboside (NR, I) is present in store bought (cow) milk. FIGS. 2B and 2C are control chromatograms showing detection of nicotinamide riboside (NR, I) after adding nicotinamide riboside (NR, I) to the milk sample at a known amount. These control chromatograms demonstrate that nicotinamide riboside (NR, I) could be added to milk and subsequently quantitatively recovered without significant degradation or evidence of incompatibility of nicotinamide riboside (NR, I) with commercial milk. The calculated recovery of the 1% nicotinamide riboside (NR, I) was close to 100%. The experimental method used to obtain these results was as follows: milk was diluted 1:1 with acetonitrile. Centrifugation was then performed to remove any precipitate, and the supernatant was analyzed using an HILIC/HPLC/UV using standard methods.

Figure 3:
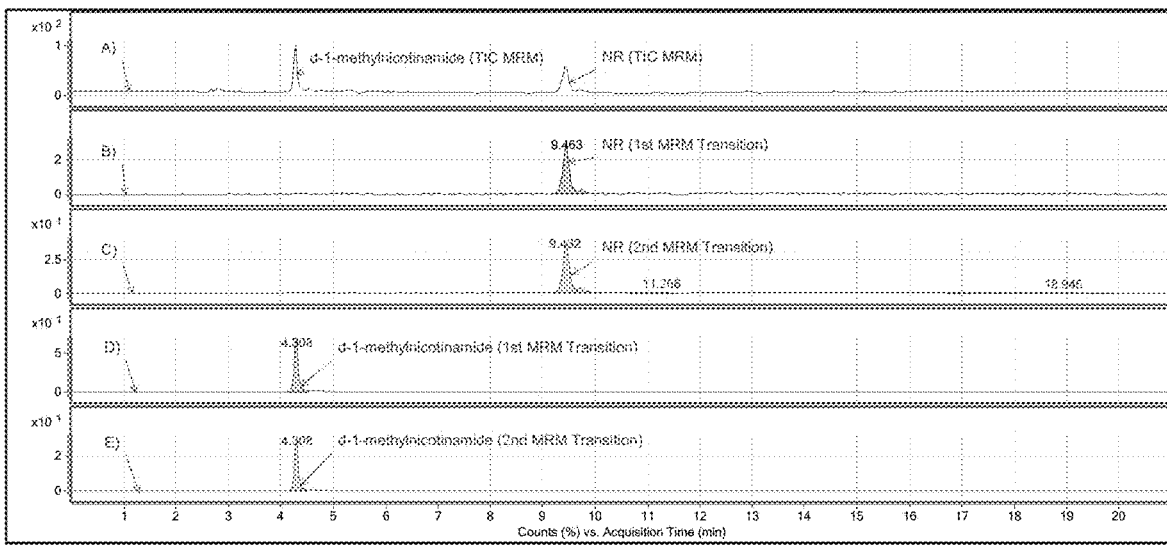
FIG. 3 depicts, in another embodiment, detection of native nicotinamide riboside (NR) in human breast milk.

Nicotinamide riboside (NR, I) is also naturally found in human breast milk. Although previously unpublished, FIG. 3 demonstrates that nicotinamide riboside (NR, I) is present in human breast milk. Fresh frozen human breast milk from a single donor was obtained and analyzed for the presence of nicotinamide riboside (NR, I). Milk was precipitated using acetonitrile with a ratio of 3:1, and acetic acid was also added to help precipitation. Separation was done on a Sepax Polar-Diol (250×4.6 mm) 5 μm column, and the Agilent 6420 Triple Quad system. The mass spectrometer was operated in highly selective and sensitive Multiple Reaction Monitoring ("MRM"). Compound identification was achieved by monitoring two MRM transitions for each of nicotinamide riboside (NR, I) and ISTD (deuterated 1-methylnicotinamide). Specifically, milk sample was mixed very well, after which 2 mL of milk was pipetted into a 15-mL centrifuge tube, and 6 mL of acetonitrile and 1.75 mL of 0.1% acetic acid was added. Finally, 250 μL of ISTD was added. The mixture was vortexed for 1 minute, placed on a shaker for 15 minutes, and centrifuged for 10 minutes at 15000 rpm. The top layer was decanted into a 10-mL volumetric flask and brought to volume with acetonitrile. Sample was then run on HPLC/MS/MS. Spiked samples were prepared and analyzed the same way, except that only 0.75 mL of 0.1% acetic acid was added along with 1 mL of the nicotinamide riboside (NR, I) standard. FIG. 3 shows detection of native nicotinamide riboside (NR, I) in human breast milk by mass in panel A, and by two transitions; B) 255.1 to 123.1, and C) 255.1 to 105.8. Two transitions are also shown for the internal standard (panels D and E).

Figure 4:
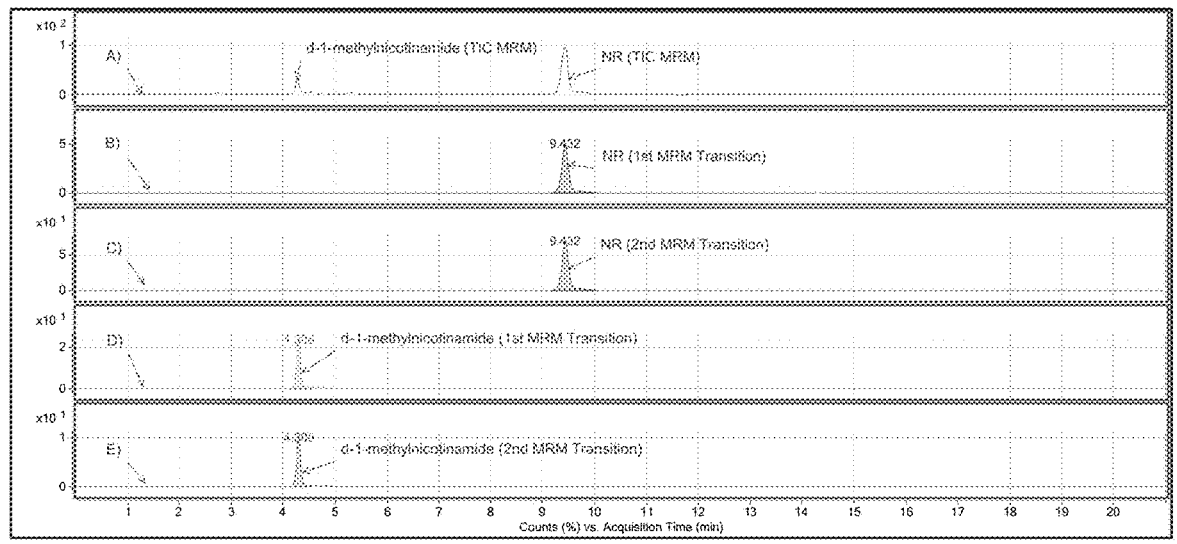
FIG. 4 depicts, in another embodiment, confirmation of detection of nicotinamide riboside (NR) in human breast milk by spiking nicotinamide riboside (NR) in 100 mL human breast milk.
Figure 5:
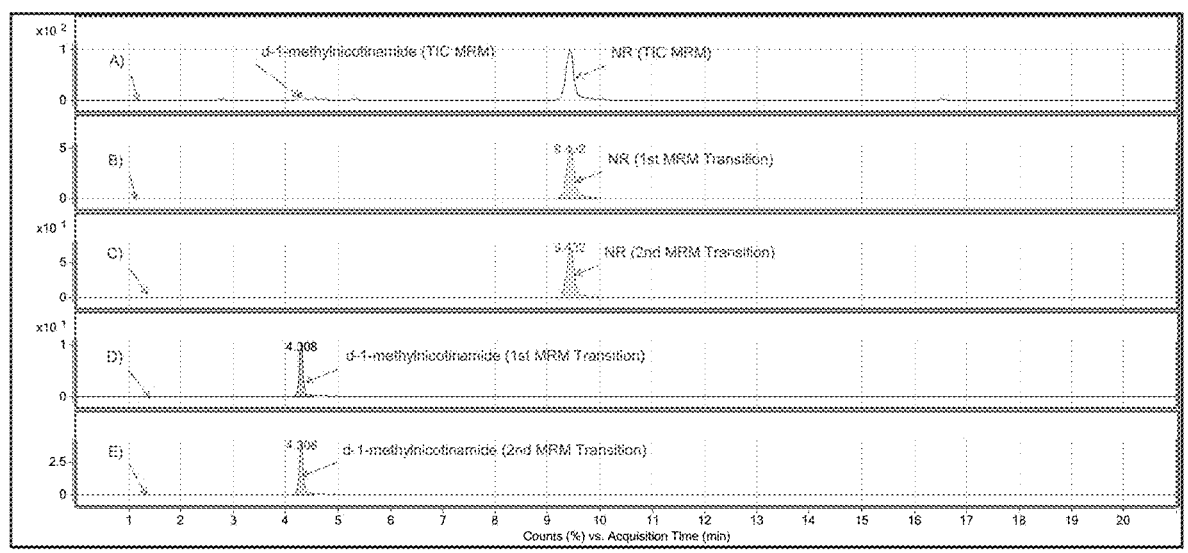
FIG. 5 depicts, in another embodiment, confirmation of detection of nicotinamide riboside (NR) in human breast milk by spiking nicotinamide riboside (NR) in 1000 mL human breast milk.

FIGS. 4 and 5 are controls that show that spiking of nicotinamide riboside (NR, I) at 100 mL (FIG. 4) and 1000 mL (FIG. 5) confirm that the peaks being analyzed are nicotinamide riboside (NR, I) in panels A, B, and C of both figures. Panels D and E in both figures are the internal standard peaks.

Figure 6:
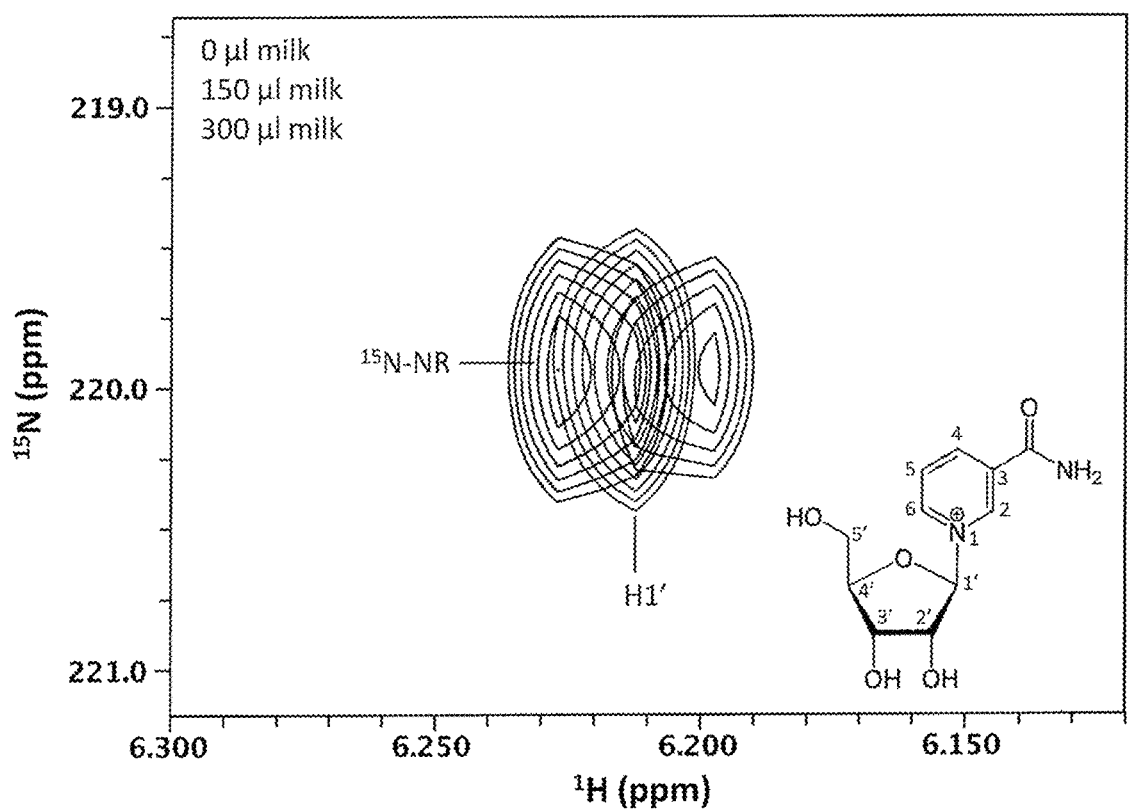
FIG. 6 depicts, in another embodiment, detection of direct binding of stable, isotope-labeled ($^{15}N$) nicotinamide riboside (NR) to milk proteins. This is visualized as a concentration-dependent shift in the nicotinamide riboside (NR) spectra with increasing additions of milk. The concentric shapes shifts from left to right are the results of addition of no milk, 150 μL of milk, and 300 μL of milk, respectively.

Although nicotinamide riboside (NR, I) in water is unstable over time (it will be nicotinamide and ribose given enough time), nicotinamide riboside (NR, I) is stable in milk, as shown above that nicotinamide riboside (NR, I) is present in cow's milk and human breast milk. Nicotinamide riboside (NR, I) is also demonstrated to bind proteins in milk that stabilize nicotinamide riboside (NR, I) in liquid. Whey protein fraction and casein protein have been identified as leading candidates to bind directly to and stabilize nicotinamide riboside (NR, I) in milk. The addition of these proteins in particular (either alone or in combination with other proteins and/or vitamins) in order to stabilize nicotinamide riboside (NR, I) in liquid constitutes another embodiment of a method of delivery of the present invention. FIG. 6 shows that nicotinamide riboside (NR, I) binds to proteins in milk. In this experiment, Water-Ligand Observed via Gradient Spectroscopy (WaterLOGSY NMR)

was used to detect direct binding of stable, isotope-labeled ($^{15}$N) nicotinamide riboside (NR, I) to milk proteins. This is visualized as a concentration-dependent shift in the nicotinamide riboside (NR, I) spectra with increasing additions of milk. The concentric shapes shifts from left to right are the results of addition of no milk, 150 μL of milk, and 300 μL of milk, respectively.

Example 2

A. Solutions of hydrolyzed whey protein isolate (>90% protein, 2-7% degree of hydrolysis) were prepared at varying concentrations and filtered through 0.2 μm sterile filters. An aliquot of sterile nicotinamide riboside chloride ("NR-Cl," a salt of NR, I) in water solution was spiked into the sterile whey solutions, targeting a final NR-Cl concentration of 1 mmol per liter (0.3 mg/mL). The solutions containing the mixture of hydrolyzed whey and NR-Cl were filtered through 10 kDa molecular weight cutoff centrifuge filters to remove the whey proteins (14-80 kDa) and any NR-Cl that was bound to the proteins. Any NR-Cl that was not bound to the whey proteins was recovered in the filtrate and quantitated by HPLC. It was demonstrated that the percent of NR-Cl bound to the whey protein increased as the amount of whey in solution increased (See Table 1).

TABLE 1

NR-Cl Binding to Hydrolyzed Whey Protein Isolate as a Function of Whey to NR-Cl Ratio

| Ratio of Hydrolyzed Whey Protein Isolate to NR-Cl (wt:wt) | % NR-Cl Bound to Protein |
| --- | --- |
| 18.3:1 | 41% |
| 37:1 | 47% |
| 73:1 | 60% |
| 147:1 | 65% |
| 293:1 | 67% |

Figure 7:
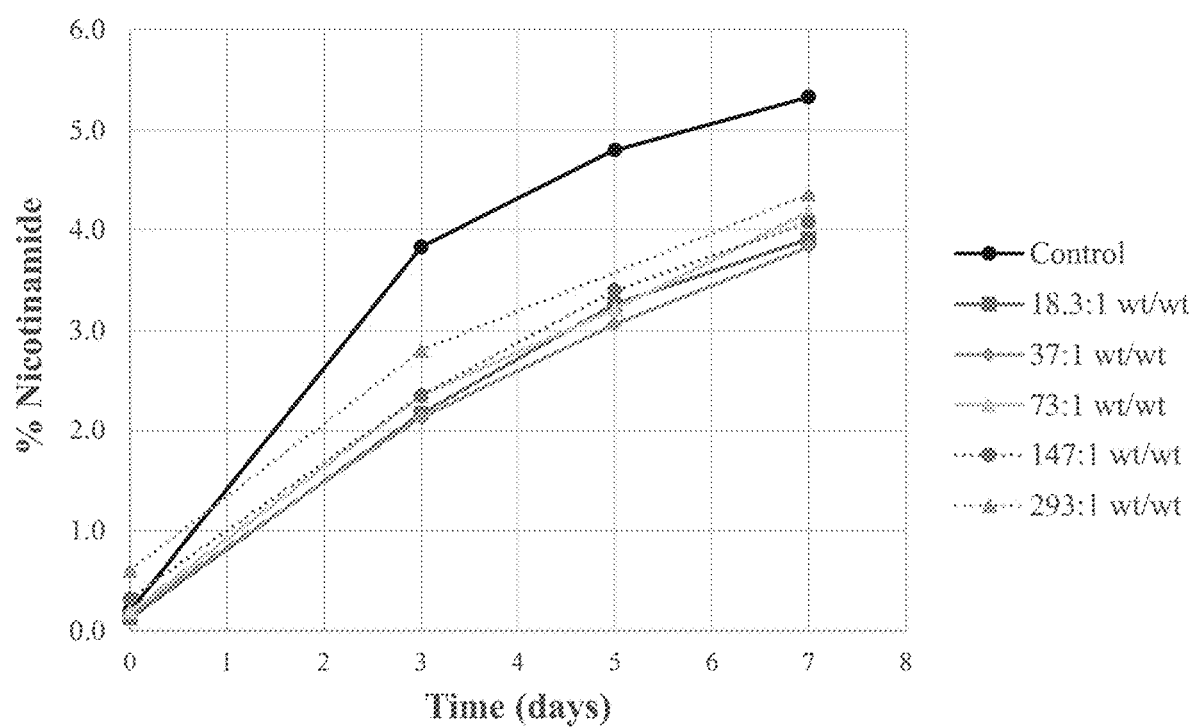
FIG. 7 depicts, in another embodiment, the % of nicotinamide in sterilized solutions of hydrolyzed whey protein isolate and NR-Cl at ambient conditions.
Figure 8:
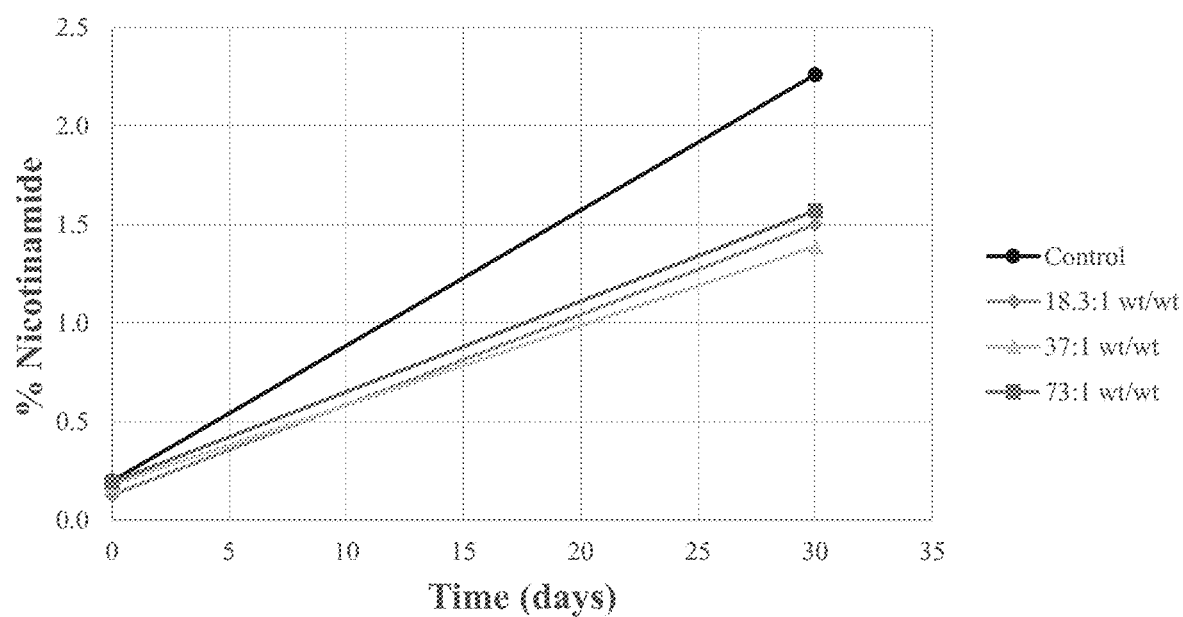
FIG. 8 depicts, in another embodiment, the % of nicotinamide in sterilized solutions of hydrolyzed whey protein isolate and NR-Cl at refrigerated conditions.

The solutions of hydrolyzed whey protein isolate and NR-Cl were stored at ambient and refrigerated conditions and analyzed at various timepoints for NR-Cl protein binding and stability. Stability was monitored by comparing the increase in nicotinamide (Nam or NM), a degradant of NR-Cl that was not observed to bind to whey under such conditions, relative to a control of NR-Cl in water only. The whey solutions were observed to be more stable than the control solution after 7 days at ambient conditions (See Table 2 and FIG. 7) and 30 days under refrigeration (See Table 3 and FIG. 8). The fraction of NR-Cl bound to whey protein was observed to remain stable over the course of the experiments (See Tables 2 and 3).

TABLE 2

Binding and Stability of NR-Cl in Sterilized Hydrolyzed Whey Protein Isolate Solutions at Ambient Conditions

| Ratio of Hydrolyzed Whey Protein Isolate to NR-Cl (wt:wt) | Days at Ambient Conditions | % NR-Cl Bound to Protein | % Nicotinamide |
| --- | --- | --- | --- |
| Control | 0 | NA | 0.2 |
|  | 3 |  | 3.8 |
|  | 5 |  | 4.8 |
|  | 7 |  | 5.3 |
| 18.3:1 | 0 | 41 | 0.1 |
|  | 3 | 44 | 2.2 |
|  | 5 | 45 | 3.3 |

TABLE 2-continued

Binding and Stability of NR-Cl in Sterilized Hydrolyzed Whey Protein Isolate Solutions at Ambient Conditions

| Ratio of Hydrolyzed Whey Protein Isolate to NR-Cl (wt:wt) | Days at Ambient Conditions | % NR-Cl Bound to Protein | % Nicotinamide |
| --- | --- | --- | --- |
|  | 7 | 43 | 3.9 |
| 37:1 | 0 | 47 | 0.2 |
|  | 3 | 55 | 2.1 |
|  | 5 | 54 | 3.1 |
|  | 7 | 54 | 3.8 |
| 73:1 | 0 | 60 | 0.2 |
|  | 3 | 66 | 2.4 |
|  | 5 | 65 | 3.2 |
|  | 7 | 65 | 4.2 |
| 147:1 | 0 | 65 | 0.3 |
|  | 3 | 71 | 2.4 |
|  | 5 | 72 | 3.4 |
|  | 7 | 69 | 4.1 |
| 293:1 | 0 | 67 | 0.6 |
|  | 3 | 62 | 2.8 |
|  | 7 | 72 | 4.4 |

TABLE 3

Binding and Stability of NR-Cl in Sterilized Hydrolyzed Whey Protein Isolate Solutions at Refrigerated Conditions

| Ratio of Whey Protein Isolate to NR-Cl (wt:wt) | Days at Refrigerated Conditions | % NR-Cl Bound to Protein | % Nicotinamide |
| --- | --- | --- | --- |
| Control | 0 | NA | 0.2 |
|  | 30 |  | 2.3 |
| 18.3:1 | 0 | 41 | 0.1 |
|  | 30 | 24 | 1.5 |
| 37:1 | 0 | 47 | 0.2 |
|  | 30 | 45 | 1.4 |
| 73:1 | 0 | 60 | 0.2 |
|  | 30 | 57 | 1.6 |

Using the molecular weight cutoff filter method described above, the binding of NR-Cl to various individual proteins found in whey was demonstrated (See Table 4). The solutions were prepared with 1 mmol/L each of protein and NR-Cl. NR-Cl binding to one or more of these individual proteins could be responsible for the enhanced stability of NR-Cl seen in hydrolyzed whey protein isolate.

TABLE 4

NR-Cl Binding to Individual Whey Proteins

| Whey Protein | % NR-Cl Bound to Protein |
| --- | --- |
| Albumin | 47 |
| Beta-lactoglobulin | 66 |
| Alpha-lactalbumin | 62 |
| Lactoferrin | 28 |
| Transferrin | 15 |

A study measuring the stability of NR-Cl in hydrolyzed and non-hydrolyzed whey protein was conducted with 2 mmol/L NR-Cl (0.6 mg/mL) and 20 mg/mL protein (33.3:1 wt:wt protein:NR-Cl). The hydrolyzed and non-hydrolyzed whey proteins exhibited similar NR-Cl binding; however, the non-hydrolyzed solution was much less stable than the hydrolyzed solution. (See Table 5). The non-hydrolyzed solution had a 5% increase in nicotinamide after 1 day at refrigerated conditions, while the hydrolyzed solution did not show any increase in nicotinamide.

TABLE 5

| Whey Solution | Days at Refrigerated Conditions | % NR-Cl Bound to Protein | % Nicotinamide |
|---|---|---|---|
| Non-Hydrolyzed Whey Protein Isolate | 0 | 49 | 0.3 |
|  | 1 | 54 | 5.4 |
| Hydrolyzed Whey Protein Isolate | 0 | 55 | 0.1 |
|  | 1 | 56 | 0.1 |

B. Mass Spectrometry

A photoactivatable experiment will be designed to irreversibly conjugate a version of nicotinamide riboside (NR, I) to a binding protein, such as whey protein isolate or beta-lactoglobulin. This ultraviolet-based experiment will help substantiate binding claims and help demonstrate the application of this technology to NR-aqueous-based stabilization.

Photoreactive groups are chemically inert compounds that become reactive when exposed to ultraviolet or visible light. Practically all varieties of photoreactive groups used in reagents for crosslinking applications require exposure to ultraviolet light ("UV light") for molecular activation. Without being bound to theory, when an aryl azide is exposed to UV light (250-350 nm), the azide group is expected to form a nitrene group that can initiate addition reactions with double bonds, insertion into C—H and N—H sites, or subsequent ring expansion to react with a nucleophile (e.g., primary amines). Many nitrene groups may conjugate to any one of several common functional groups in proteins encountered during activation. This feature makes nitrene groups particularly useful in capturing protein interactions (i.e., binding). The most important aspect for the substrate binding study is firstly that the substrate behaves like NR-Cl in that it will bind to any compatible protein in the same peptide regions. Secondly, the substrate should have similar stability to NR-Cl. Lastly, the substrate should break down and irreversibly react with any compatible protein once the substrate has been subjected to UV light. The substrate azido-NR chloride (XXIV, structure below) was chosen for the substrate binding study. Azido-NR chloride, XXIV, was successfully synthesized in accordance with the synthetic procedure below.

Structure of Azido-NR Chloride

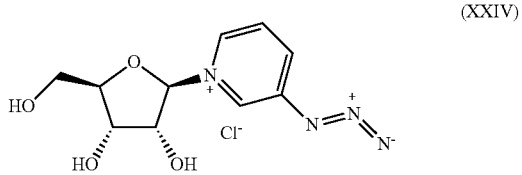

Ratios of protein:ligand were similar to those described for the spike recovery HPLC work described above.

1. Preparation of Azido-NR Chloride (XXVIV).

Azido-NR chloride (XXVIV) was prepared according to the following synthetic procedure as shown in Scheme 1.

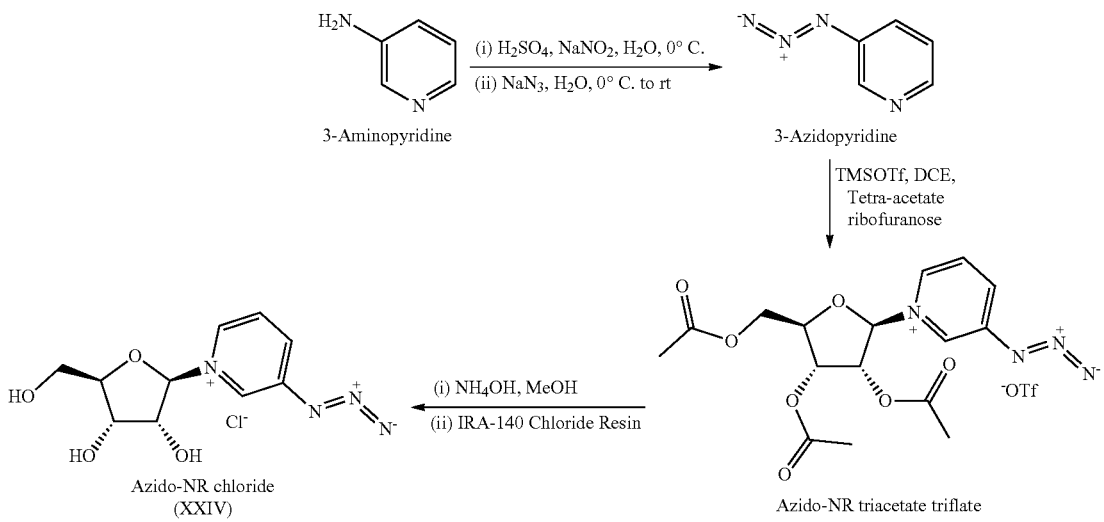

a. Preparation of 3-Azidopyridine.

3-Aminopyridine (4.0 g, 42.5 mmol, 1 equiv.) was dissolved in a solution of concentrated $H_2SO_4$ (4.8 mL) in $H_2O$ (30.0 mL). The $H_2SO_4$ solution was cooled to 0° C. and a solution of sodium nitrite (3.52 mg, 51 mmol, 1.2 equiv.) in $H_2O$ (20.0 mL) was added dropwise. The mixture of solutions was stirred at 0° C. for approximately 30 minutes, and a solution of sodium azide ($NaN_3$, 4.7 g, 72.25 mmol, 1.7 equiv.) in $H_2O$ (10.0 mL) was slowly added to the reaction mixture with vigorous stirring. The mixture was allowed to warm to room temperature and stirred for 18 hours at room temperature. The mixture was then treated with saturated $Na_2CO_3$ solution, and extracted with dichloromethane (3×100 mL). The combined extracts were washed with water (100 mL), dried over $MgSO_4$, filtered, and concentrated. The residue was purified by chromatography on a 120-gram normal-phase silica column, using a gradient of 5% EtOAc in hexanes, increasing to 50% EtOAc in hexanes, over the course of 40 minutes on the Reveleris Prep purification instrument. 2.5 g of an off-red oil (3-Azidopyridine) was obtained.

b. Preparation of Azido-NR Triacetate Triflate.

Figure 9:
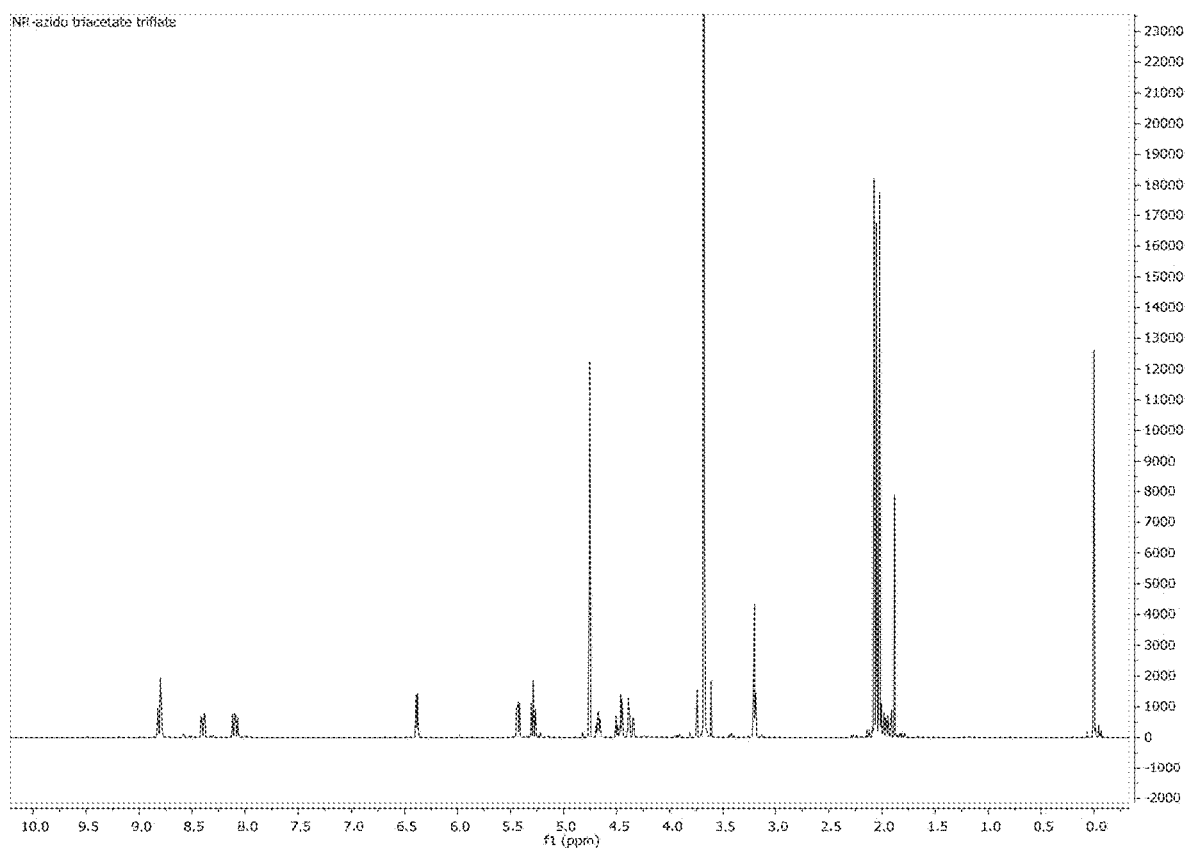
FIG. 9 depicts, in another embodiment, a $^1H$ NMR spectrum of azido-NR triacetate triflate.

3-Azidopyridine (2.0 g, 16.67 mmol, 1 equiv.) was dissolved in dry dichloroethane (DCE, 40.0 mL) under nitrogen. Tetraacetate ribofuranose (5.3 g, 16.67 mmol, 1 equiv.) was added followed by TMSOTf (3.03 mL, 16.67 mmol, 1 equiv.) and heated to 45° C. for approximately 5 hours. The solution was then concentrated under reduced pressure to provide crude azido-NR triacetate triflate. The yield for this material was assumed to be quantitative. A $^1$H NMR spectrum for azido-NR triacetate triflate is provided in FIG. 9.

c. Preparation of Azido-NR Chloride (XXIV).

Figure 10:
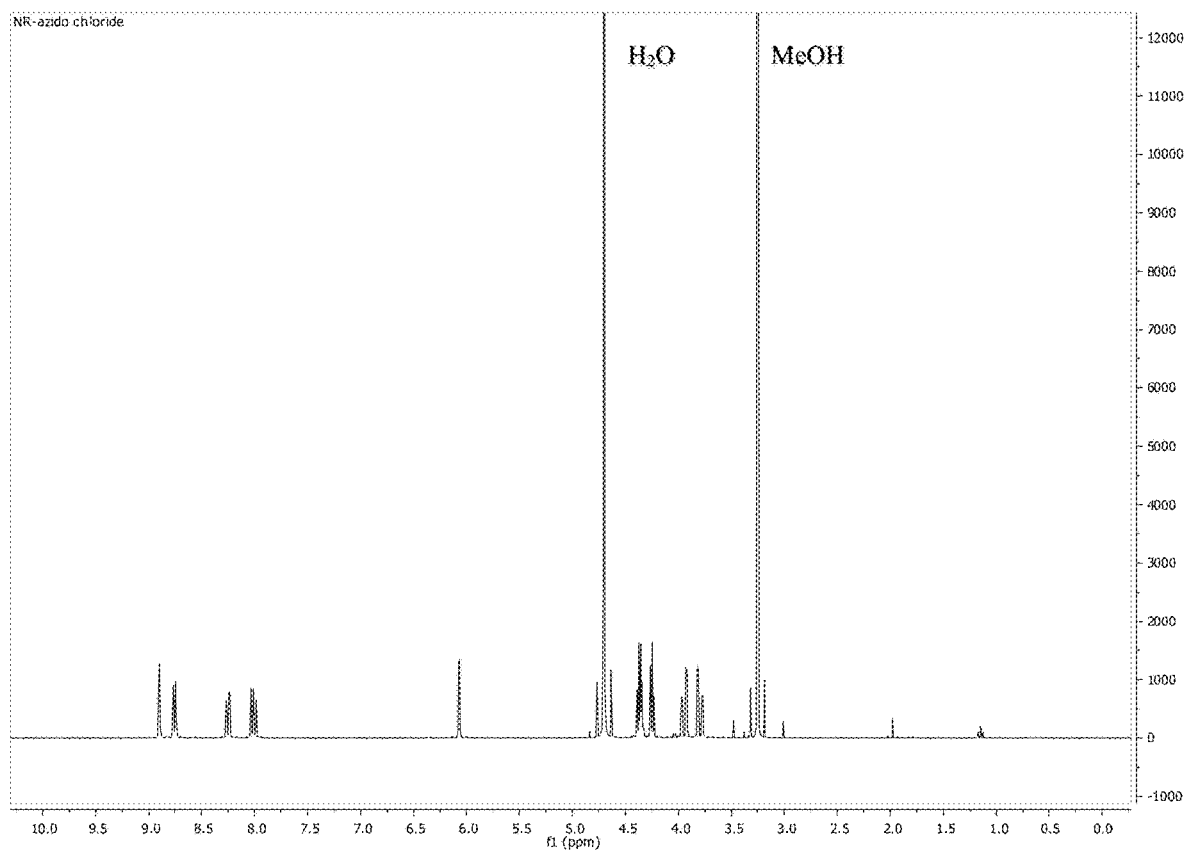
FIG. 10 depicts, in another embodiment, a $^1H$ NMR spectrum of azido-NR chloride (XXIV).

Azido-NR triacetate triflate (8.8 g, 16.67 mmol, 1 equiv.) was dissolved in methanol (MeOH, 30.0 mL) and chilled to −5° C. Ammonium hydroxide (NH$_4$OH, 1.0 mL, 16.67 mmol, 1 equiv.) was added dropwise to the solution and stirred for 4 days, or until the reaction was complete by $^1$H NMR analysis. The reaction mixture was concentrated and co-evaporated with methanol (2×50 mL). The crude residue was submitted directly to the salt exchange resin. Approximately 5 g of crude azido-NR triflate was dissolved in MeOH (300 mL) and chilled to 0° C. IRA-140 Chloride Resin (150 g) was added to the stirred solution until no more triflate was present by $^{19}$F NMR analysis. The resin was then filtered and the MeOH removed under reduced pressure to obtain crude azido-NR chloride as an orange oil. The crude oil was then purified by column chromatography on a 120-gram normal phase silica column using a gradient of 100% EtOAc increasing to 100% MeOH over 40 minutes on the Reveleris Prep purification instrument. 3.0 g of azido-NR chloride (XXIV) was obtained as an off-white powder (63% yield). A $^1$H NMR spectrum for azido-NR chloride (XXIV) is provided in FIG. 10.

2. Procedure for UV-Mediated Protein-Ligand Binding Studies.

A stock solution of azido-NR chloride in water at a concentration of 0.06 mg/mL was prepared by dissolving 3 milligrams of azido-NR chloride in 50 mL of deionized water without vortex mixing. A stock solution of whey protein isolate in water at a concentration of 4.4 mg/mL was prepared by dissolving 22 milligrams of whey protein isolate in 5 mL of deionized water without vortex mixing. A stock solution of beta-lactoglobulin in water at a concentration of 3.6 mg/mL was prepared by dissolving 18 milligrams of beta-lactoglobulin in 5 mL of deionized water without vortexing.

3. Solutions Prepared.

The solutions were prepared as follows:

Azido-NR chloride only (with and without UV light): 3 aliquots of 500 μL of the azido-NR chloride stock solution were each transferred to a scintillation vial and diluted to 1 mL with deionized water (final concentration of 0.03 mg/mL): azido-NR chloride control (Preparation #15); azido-NR chloride UV light (5 minutes) (Preparation #9); azido-NR chloride UV light (30 minutes) (Preparation #10).

Whey protein isolate only (with and without UV light): 3 aliquots of 500 μL of the whey protein isolate stock solution were each transferred to a scintillation vial and diluted to 1 mL with deionized water (final concentration of 2.2 mg/mL): whey protein isolate control (Preparation #4); whey protein isolate UV light (5 minutes) (Preparation #6); whey protein isolate UV light (30 minutes) (Preparation #8).

Beta-lactoglobulin protein only (with and without UV light): 3 aliquots of 500 μL of the beta-lactoglobulin stock solution were each transferred to a scintillation vial and diluted to 1 mL with deionized water (final concentration of 1.8 mg/mL): beta-lactoglobulin control (Preparation #3); beta-lactoglobulin UV light (5 minutes) (Preparation #5); beta-lactoglobulin UV light (30 minutes) (Preparation #7).

Azido-NR chloride and whey protein isolate (with and without UV light): 3 aliquots of 500 μL of the azido-NR chloride stock solution were each transferred to a scintillation vial. 500 μL aliquots of the whey protein isolate stock solution were added to each of the 3 scintillation vials, and each of the three combined azido-NR chloride and whey protein isolate aliquots was diluted to 1 mL with deionized water (final concentrations of 0.03 mg/mL azido-NR chloride, 2.2 mg/mL whey protein isolate): azido-NR chloride and whey protein isolate control (Preparation #2); azido-NR chloride and whey protein isolate UV light (5 minutes) (Preparation #12); azido-NR chloride and whey protein isolate UV light (30 minutes) (Preparation #14).

Azido-NR chloride and beta-lactoglobulin (with and without UV light): 3 aliquots of 500 μL of the azido-NR chloride stock solution were each transferred to a scintillation vial. 500 μL aliquots of the beta-lactoglobulin stock solution were added to each of the 3 scintillation vials, and each of the three combined azido-NR chloride and beta-lactoglobulin aliquots was diluted to 1 mL with deionized water (final concentrations of 0.03 mg/mL azido-NR chloride, 1.8 mg/mL beta-lactoglobulin): azido-NR chloride and beta-lactoglobulin control (Preparation #1); azido-NR chloride and beta-lactoglobulin UV light (5 minutes) (Preparation #11); azido-NR chloride and beta-lactoglobulin UV light (30 minutes) (Preparation #13).

TABLE 6

Table of Preparations for UV Conjugation Experiments

| Preparation # | Additive | Azido-NR Chloride Present (0.03 mg/mL) | UV Light Exposure (minutes) | Additive Concentration (mg/mL) |
|---|---|---|---|---|
| 1 | Beta-lactoglobulin | X | 0 | 1.8 |
| 2 | Whey protein isolate | X | 0 | 2.2 |
| 3 | Beta-lactoglobulin | — | 0 | 1.8 |
| 4 | Whey protein isolate | — | 0 | 2.2 |
| 5 | Beta-lactoglobulin | — | 5 | 1.8 |
| 6 | Whey protein isolate | — | 5 | 2.2 |
| 7 | Beta-lactoglobulin | — | 30 | 1.8 |
| 8 | Whey protein isolate | — | 30 | 2.2 |
| 9 | — | X | 5 | 0 |
| 10 | — | X | 30 | 0 |
| 11 | Beta-lactoglobulin | X | 5 | 1.8 |
| 12 | Whey protein isolate | X | 5 | 2.2 |
| 13 | Beta-lactoglobulin | X | 30 | 1.8 |
| 14 | Whey protein isolate | X | 30 | 2.2 |
| 15 | — | X | 0 | 0 |

Each preparation is incubated at room temperature for 30 minutes. Each preparation is then irradiated for 0, 5, or 30 minutes using a portable UV lamp (UVP, 254 nm, from 5 cm, room temperature) and photo-activation is accomplished with the UV source positioned so that the light is shining directly on the preparation (i.e., not through glass). It is expected that azido-NR chloride will bind irreversibly to the whey protein isolate or beta-lactoglobulin following UV treatment and that the binding can be detected using either or both of two approaches: top-down approach could yield the intact protein plus the conjugated NR substrate (labile glycosidic bond would need to be stable); bottom-up approach requires proteolysis (trypsin), and LC purification of the NR peptide residues, followed by identification of the residues using a protein mass spectral library.

C. NMR Spectroscopy.

A range of NMR experimentation including Water LOGSY and $^{15}$N-$^1$H HSQC will be used to determine the binding of various proteins including alpha-lactalbumin, beta-lactoglobulin, bovine serum albumin, whey protein, and casein to NR-Cl under aqueous conditions. It is expected that the NMR experimentation will provide evidence of binding, to be combined with information regarding the bound and unbound NR-Cl for each protein. Further, it is expected that the stability of NR-Cl over time will be monitored by the NMR experimentation.

It is expected that the NMR experimentation will be achieved with isotopically labeled NR-Cl (XXV, below).

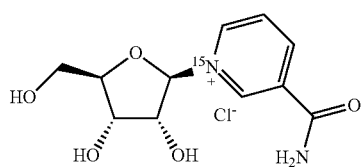

(XXV)

1. Preparation of $^{15}$N-Labeled Nicotinamide Riboside Chloride (NR-Cl, XXV).

$^{15}$N-labeled nicotinamide riboside chloride (XXV) was prepared according to the following synthetic procedure as shown in Scheme 2.

a. Preparation of Nicotinamide Zincke Salt.

Nicotinamide (8.0 g, 65.5 mmol, 1 equiv.) and 1-chloro-2,4-dinitrobenzene (20.0 g, 98.7 mmol, 1.5 equiv.) were melted together at 110° C. and stirred for approximately 1 hour, until the orange solution hardened. The solution was dissolved in minimal MeOH and loaded onto a 340-gram Biotage column and run at a gradient of 100% EtOAc increasing up to 15% MeOH in EtOAc over the course of 1 hour on an automated purification system. The excess 1-chloro-2,4-dinitrobenzene was isolated first, then the unreacted nicotinamide, and finally the Zincke salt. 15 grams of a yellow-orange solid was obtained (70% yield).

b. Preparation of $^{15}$N-Labeled Nicotinamide.

$^{15}$NH$_4$Cl (3.62 g, 65.3 mmol, 1 equiv.) and triethylamine (Et$_3$N, 17.75 mL, 127.4, 1.95 equiv.) were added into a 1 liter round-bottom flask, and solubilized in dry methanol (200 mL) and chilled to 0° C. A solution of 1-(2,4-dinitrophenyl)pyridine-3-carboxamide (18.21 g, 62.7 mmol, 1.04 equiv.) dissolved in dry methanol (100 mL) was added dropwise to the mixture over approximately 60 minutes at 0° C. The solution was warmed to room temperature and stirred until the starting material had been consumed according to thin-layer chromatography ("TLC") analysis. The solution was concentrated and suspended in water. Thorough mixing (to dissolve the $^{15}$N-labeled nicotinamide) and filtration provided the aqueous layer with solubilized $^{15}$N-labeled nicotinamide and traces of the dinitro by-product. The aqueous layer was concentrated, and the residue was purified by column chromatography on a 340-gram silica column using a gradient of 100% EtOAc increasing to 20% MeOH in EtOAc over the course of 1 hour on an automated purification system. 5 grams of an off-white solid was Scheme 2

Figure 11:
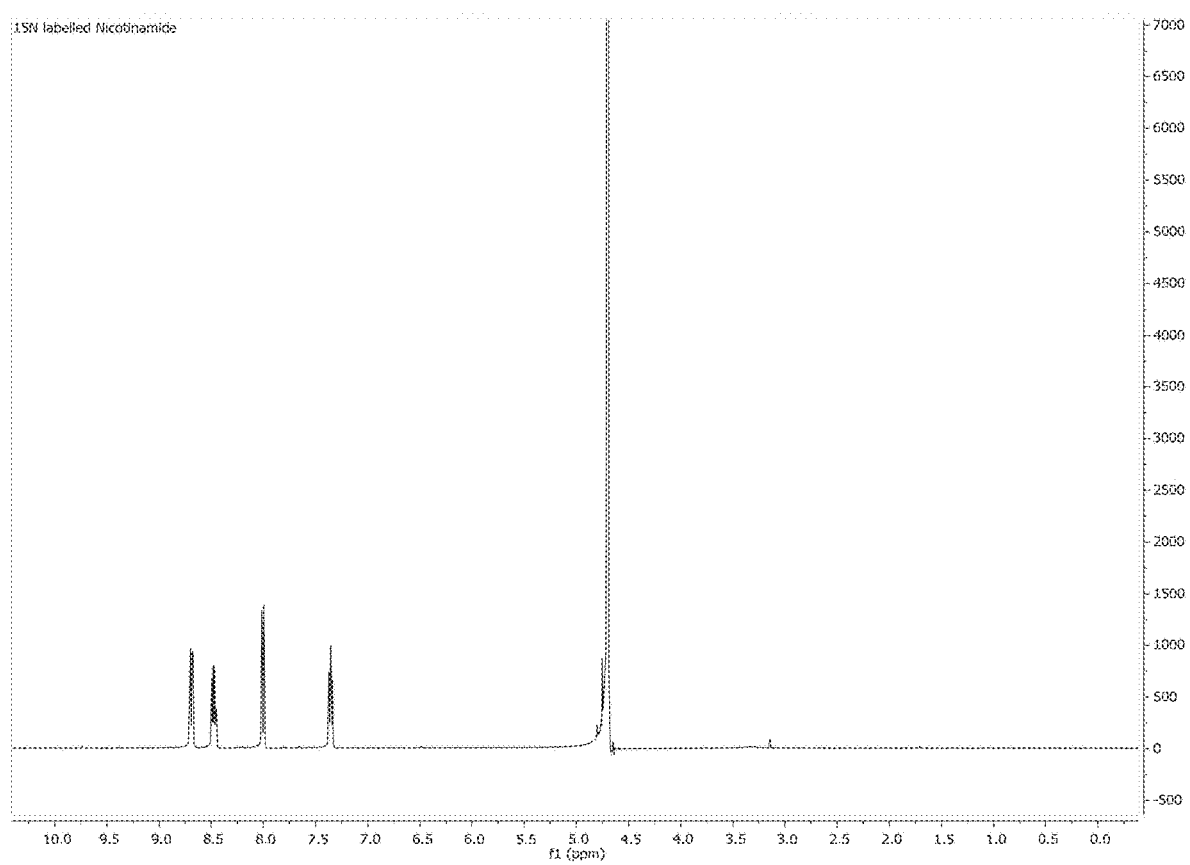
FIG. 11 depicts, in another embodiment, a $^1H$ NMR spectrum of $^{15}N$-labeled nicotinamide.

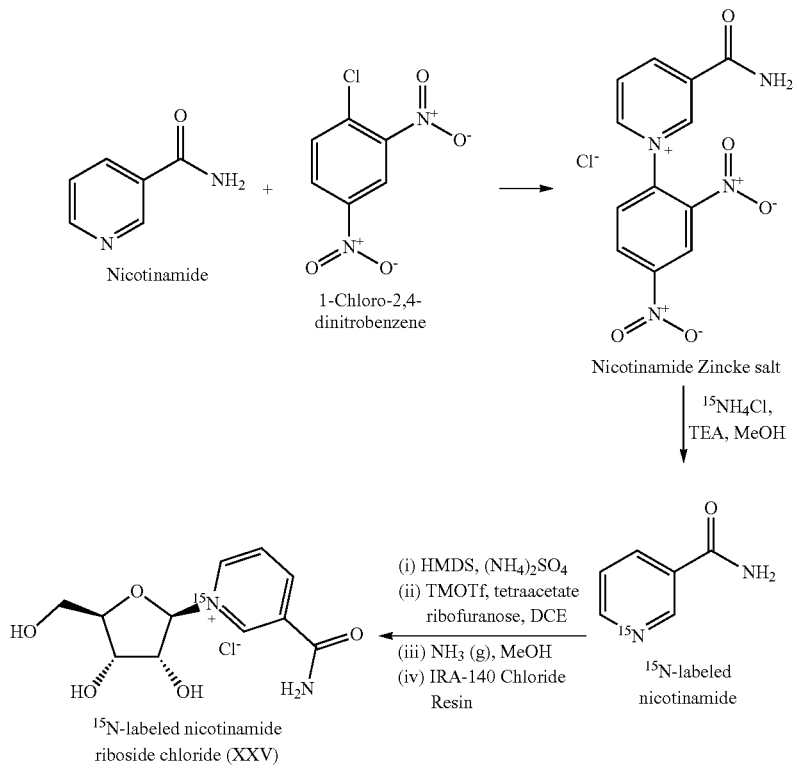

obtained (65% yield). A $^1$H NMR spectrum for $^{15}$N-labeled nicotinamide is provided in FIG. 11.

c. Preparation of $^{15}$N-Labeled Nicotinamide Riboside Triacetate Triflate.

$^{15}$N-labeled nicotinamide (2.00 g, 16.3 mmol, 1 equiv.) was dissolved in HMDS (40 mL), and a catalytic amount of $(NH_4)_2SO_4$ was added, and the mixture heated to 140° C. for approximately 4-5 hours. The clear reaction mixture was cooled to room temperature and the HMDS was removed under reduced pressure to afford an off-white solid, which was used for the next step without further purification. The solid was dissolved in dry dichloroethane (30 mL) under nitrogen. Tetraacetate ribofuranose (5.17 g, 16.3 mmol, 1 equiv.) was added, followed by TMSOTf (2.94 mL, 16.3 mmol, 1 equiv.), and the mixture was heated to 45° C. for approximately 5 hours. The solution was then concentrated under reduced pressure to provide crude $^{15}$N-labeled nicotinamide riboside triacetate triflate. The yield for this material was assumed to be quantitative.

d. Preparation of $^{15}$N-Labeled Nicotinamide Riboside Chloride (XXV).

Figure 12:
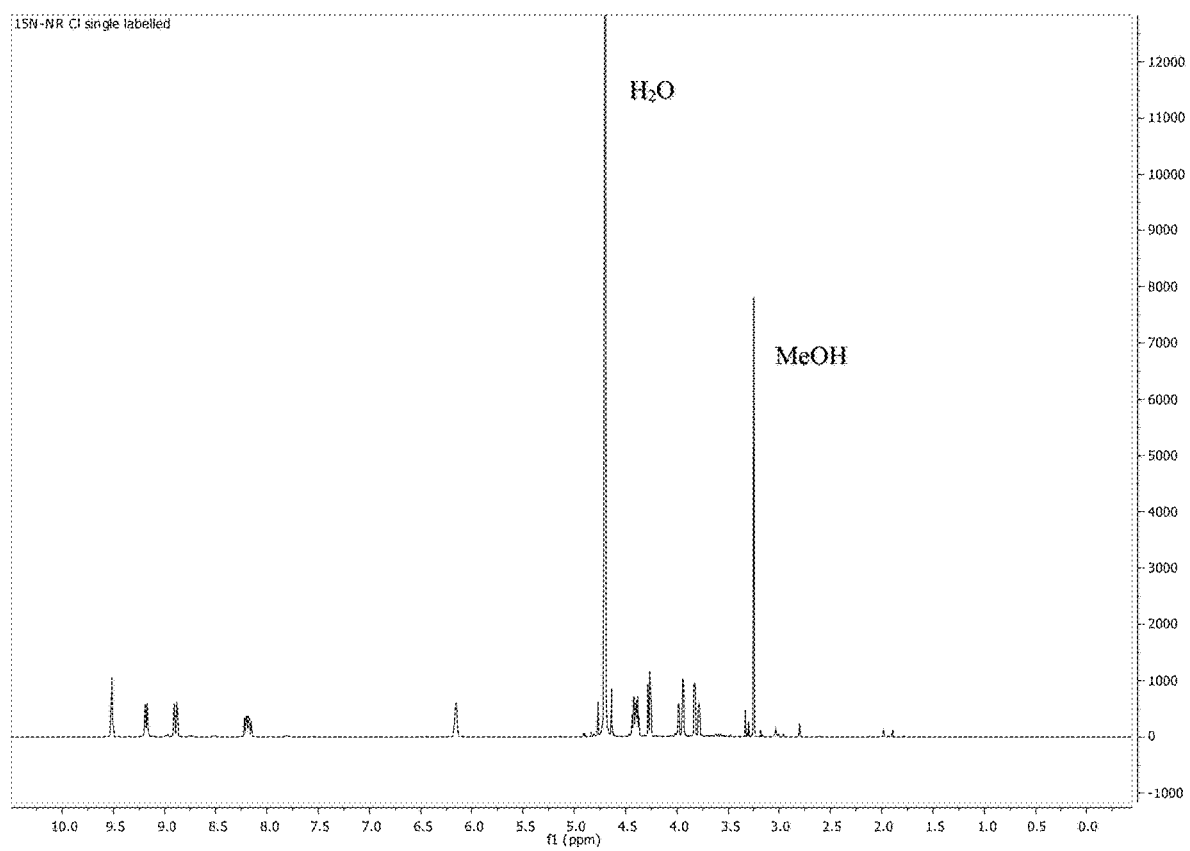
FIG. 12 depicts, in another embodiment, a $^1H$ NMR spectrum of $^{15}N$-labeled nicotinamide riboside chloride (XXV).

$^{15}$N-labeled nicotinamide riboside triacetate triflate (8.65 g, 16.3 mmol, 1 equiv.) was dissolved in MeOH (30 mL) in a heavy walled pressure vessel and chilled to −78° C. using a dry ice/acetone bath. Gaseous ammonia was bubbled into the solution for 2-3 minutes to saturate the solution, the solution was then sealed and stored at −20° C. for 4 days or until the reaction was determined to be completed by $^1$H NMR analysis. The reaction mixture was concentrated under reduced pressure and co-evaporated with methanol (2×50 mL). The crude residue was submitted directly to the salt exchange reaction. Approximately 5 grams of crude $^{15}$N-labeled nicotinamide riboside triflate was dissolved in MeOH (300 mL) and chilled to 0° C. IRA-140 Chloride Resin (approximately 150 g) was added to the stirred solution until no more triflate was present according to $^{19}$F NMR analysis. The resin was then filtered and the MeOH removed under reduced pressure to obtain crude $^{15}$N-labeled nicotinamide riboside chloride (XXV) as an orange oil. The crude oil was then purified by column chromatography on a 340-gram normal phase silica column using a gradient of 100% EtOAc increasing to 100% MeOH over the course of 40 minutes on the automated purification instrument. 3 grams of $^{15}$N-labeled nicotinamide riboside chloride (XXV) was obtained as an off-white powder (63% yield). A $^1$H NMR spectrum for $^{15}$N-labeled nicotinamide riboside chloride (XXV) is provided in FIG. 12.

Binding of target protein(s) was visualized by NMR spectroscopy, and such NMR spectroscopic visualization can be used for ligand binding assays.

It is expected that NMR spectroscopy will provide support for which proteins in the experimental panel will show binding to NR-Cl.

It is expected that data will provide support for identification of the peptide region of the protein(s) in which the binding site(s) for NR-Cl is located.

It is expected that data will provide support for determination of the disassociation constant for NR-Cl to target protein(s).

It is expected that data will provide support for determination of the number of molecules of NR-Cl binding to target protein(s), and for whether such binding occurs at one or multiple sites.

It is expected that data will provide support for whether the protein/ligand ratio can be further optimized.

It is expected that data will provide support for whether the folding of target protein(s) can be confirmed so as to verify that such target protein(s) are in native state(s) (respectively)

It is expected that data will provide support for whether target protein(s) binding and stabilization will occur when NR-Cl is formulated in the desired beverage.

Example 3

Nicotinamide riboside (NR, I) is not stable long-term in water, and the bond connecting the ribose to the nicotinamide ring hydrolyzes very easily in an aqueous liquid environment. Thus, it is believed that by utilizing a tight chemical interaction between nicotinamide riboside (NR, I) and a protein or hydrocolloid in powder preparation steps, stability improvements of nicotinamide riboside (NR, I) in aqueous environments can be demonstrated. It is further believed that nicotinamide riboside (NR, I) can be incorporated or encapsulated, leading to scale-up and manufacturing of a suitable nicotinamide riboside (NR, I) particle complex that, when added to water, shows significant resistance to hydrolysis.

A. Nicotinamide Riboside (NR, I) and Protein Binding Through Spray Drying

Two protein sources, dry hydrolyzed whey protein isolate and dry non-hydrolyzed whey protein isolate, will be selected. Starting solutions will be prepared for solid loading and viscosity suitable for spray drying (10-30 wt %). Two different ratios (high and low) of nicotinamide riboside (NR, I) to protein will be produced. Spray drying typically produces dry powders with a particle size between 10 and 60 microns and only minimal remaining moisture.

B. Use of Nicotinamide Riboside (NR, I) with Sodium or Calcium Alginate Hydrocolloids to Enhance Stability A low gel strength and a high gel strength sodium alginate will be evaluated for cross-link encapsulation of nicotinamide riboside (NR, I) in beads. Subsequent to bead formation, the beads will be dried in an oven. Alginate beads dried in an oven do not typically meet the optimal beverage-preparation particle size distribution; however, milling or other means of reducing particle size can be studied.

It is expected that nicotinamide riboside (NR, I) encapsulated in beads will exhibit increased resistance to hydrolysis when added to water compared to nicotinamide riboside (NR, I) absent such encapsulation.

Example 3A

Alginate Beads

Six formulations of NR-Cl (nicotinamide riboside chloride) encapsulated in alginate beads were prepared using two types of sodium alginate (FMC Biopolymer Manucol DMF, low gel strength; FMC Biopolymer Manucol GMB, high gel strength, Philadelphia, Pennsylvania) and three levels of NR-Cl loading (low, medium, high). Aqueous alginate solutions were made with 2% (wt/wt) alginate then mixed with a Polytron disperser and allowed to sit for 1 hour. NR-Cl was added to each alginate solution for a final concentration of 5, 25, and 50% (wt/wt) NR-Cl (low, medium, and high, respectively). Solutions were dripped through a syringe with 12-gauge needle into a 5% calcium chloride reaction bath while stirring. The ratio of volume of drip solution to reaction bath was 1:5. The resulting beads were collected and dried in a 25° C. oven for 24-72 hours. The higher NR-Cl loading beads had a darker color.

Figure 13:
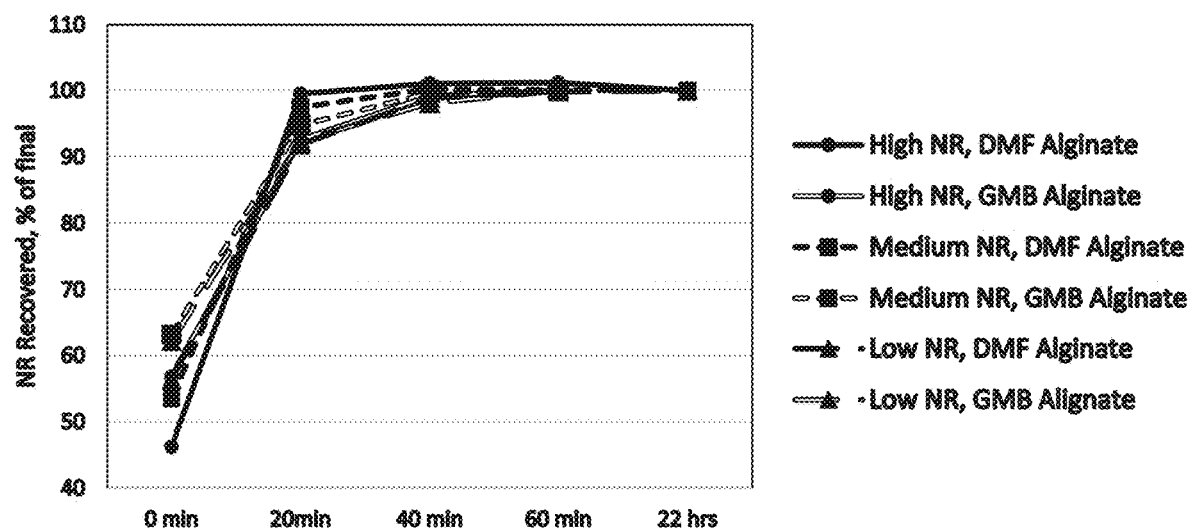
FIG. 13 depicts, in another embodiment, a graph of nicotinamide riboside chloride (NR-Cl) released over time in water from NR-Cl containing alginate beads after encapsulation.

To test the release of NR-Cl from the alginate cross-linked beads, the beads were added to water and analyzed for NR-Cl concentration in the water during a time course study (Table 7 and FIG. 13). The NR-Cl progressively released from the beads throughout the first 60 minutes in water before reaching equilibrium. After 20 minutes, the low loaded DMF and GMB alginate beads and the high loaded GMB alginate beads had the highest amount of NR-Cl retained in the beads (7-8%).

TABLE 7

| | NR-Cl Recovered, % of Final | | | | | |
|---|---|---|---|---|---|---|
| | DMF Alginate | | | GMB Alginate | | |
| Time | Low NR-Cl | Medium NR-Cl | High NR-Cl | Low NR-Cl | Medium NR-Cl | High NR-Cl |
| 0 min. | 56 | 54 | 46 | 62 | 63 | 57 |
| 20 min. | 92 | 97 | 99 | 92 | 95 | 93 |
| 40 min. | 99 | 100 | 101 | 98 | 100 | 99 |
| 60 min. | 100 | 100 | 101 | 100 | 100 | 100 |
| 22 hours | 100 | 100 | 100 | | | |

As shown above in Table 7, percent of NR-Cl recovered from NR-Cl containing alginate beads was determined in a water time course study.

Example 4

A nicotinyl riboside compound selected from nicotinamide riboside (NR, I), nicotinic acid riboside (NAR, II), nicotinamide mononucleotide (NMN, III), nicotinic acid mononucleotide (NaMN, IV), reduced nicotinamide riboside (NRH, V), reduced nicotinic acid riboside (NARH, VI), NR triacetate (NRTA, VII), NAR triacetate (NARTA, VIII), NRH triacetate (NRH-TA, IX), and/or NARH triacetate (NARH-TA, X), or salt(s) thereof, alone or in combination with one or more vitamins selected from vitamin B1 (thiamine, XII), vitamin B2 (riboflavin, XIII), vitamin B3 (nicotinic acid, or niacin, XI), vitamin B6 (pyridoxine in supplement form, XIV), vitamin B7 (biotin, XV), vitamin B9 (folic acid, XVI), vitamin B12 (cobalamin, XVII), vitamin $A_1$ (retinol, XVIII), vitamin C (ascorbic acid, XIX), vitamin $D_3$ (cholecalciferol, XX), vitamin $D_2$ (ergocalciferol, XXI), vitamin E (alpha-tocopherol, XXII), and vitamin $K_1$ (phytomenadione, XXIII), would be combined with a molten solid (e.g., wax, butter, oils), slurries, or solution to form fairly uniform spherical particles. Liquid droplets would be produced and solidified by dropping the droplets through an ambient or cooled air stream, according to a process called prilling, the various parameters of which are readily understood by one of ordinary skill in the art. The droplet size may vary depending on the required size.

Example 4A

25% Wt/Wt Nicotinamide Riboside Chloride (NR-Cl) Wax Prills

Figure 14:
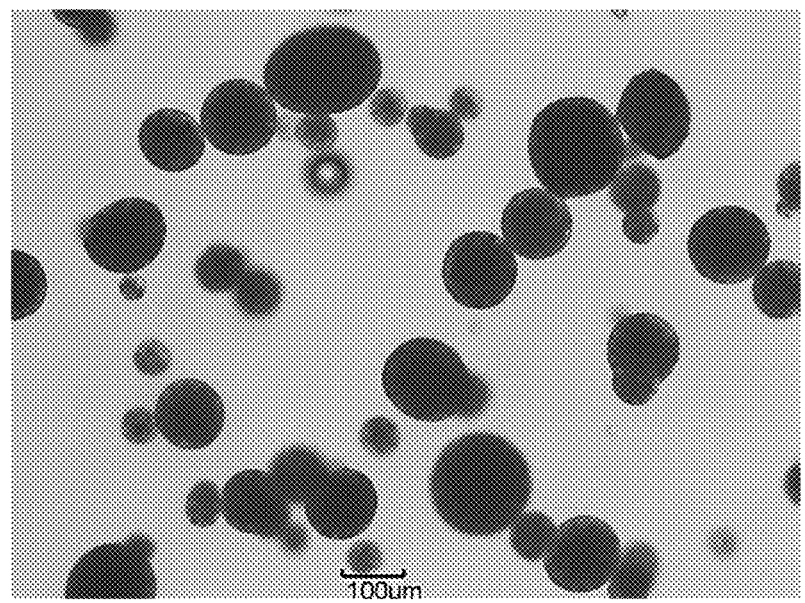
FIG. 14 is a light photomicrograph of 25% wt/wt NR-Cl containing palm oil prill showing a resolution of about 100.

Micronized NR-Cl (30-100 μm particle size) was used to create two prill formulations by spraying melted hydrogenated palm oil or hydrogenated sunflower oil containing 25% (wt/wt) NR-Cl and solidifying it in cold air. A temperature of <90° C. and flow rate of >4 kg/hour was used to prevent agglomeration. The resulting spherical prills contained <0.2% (wt/wt) water and were approximately 80-200 μm in diameter (FIG. 14).

Figure 15:
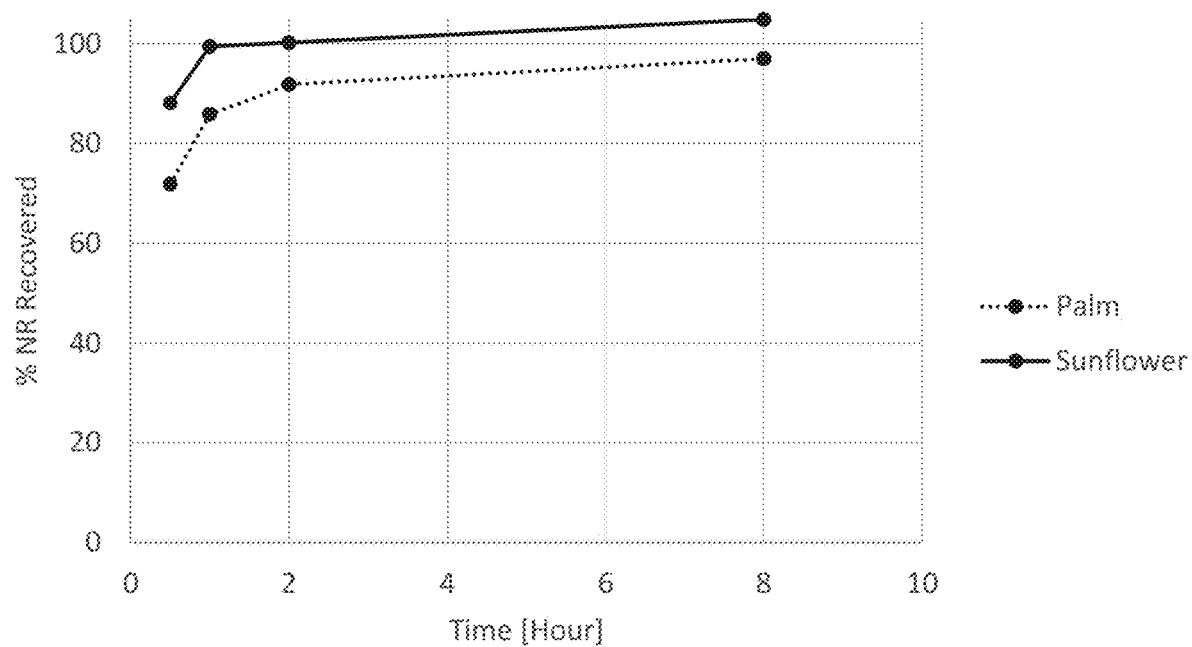
FIG. 15 depicts, in another embodiment, a graph of nicotinamide riboside chloride (NR-Cl) released over 8 hours in water from 25% wt/wt NR-Cl sunflower and palm oil prills.

To test the release of NR-Cl from the prills, the prills were added to water and analyzed for NR-Cl concentration in the water during a time course study (Table 8 and FIG. 15). The two prill formulations successfully retained approximately 10-30% of the NR-Cl for 30 minutes in water and continued to gradually release the remaining NR-Cl over the course of 8 hours.

TABLE 8

| Time (hours) | Palm Oil Prill | Sunflower Oil Prill |
|---|---|---|
| 0.5 | 72 | 88 |
| 1 | 86 | 99 |
| 2 | 92 | 100 |
| 8 | 97 | 105 |

Table 8 shows the percentage of NR-Cl recovered from NR-Cl containing Wax Prills in a water time course study.

Example 4B

An additional outer coating of sunflower oil was added to the 25% (wt/wt) NR-Cl Palm Oil prill described in Example 4A using fluidized bed coating technology, adding a weight gain of 100, 50, and 25% (wt/wt).

Figure 16:
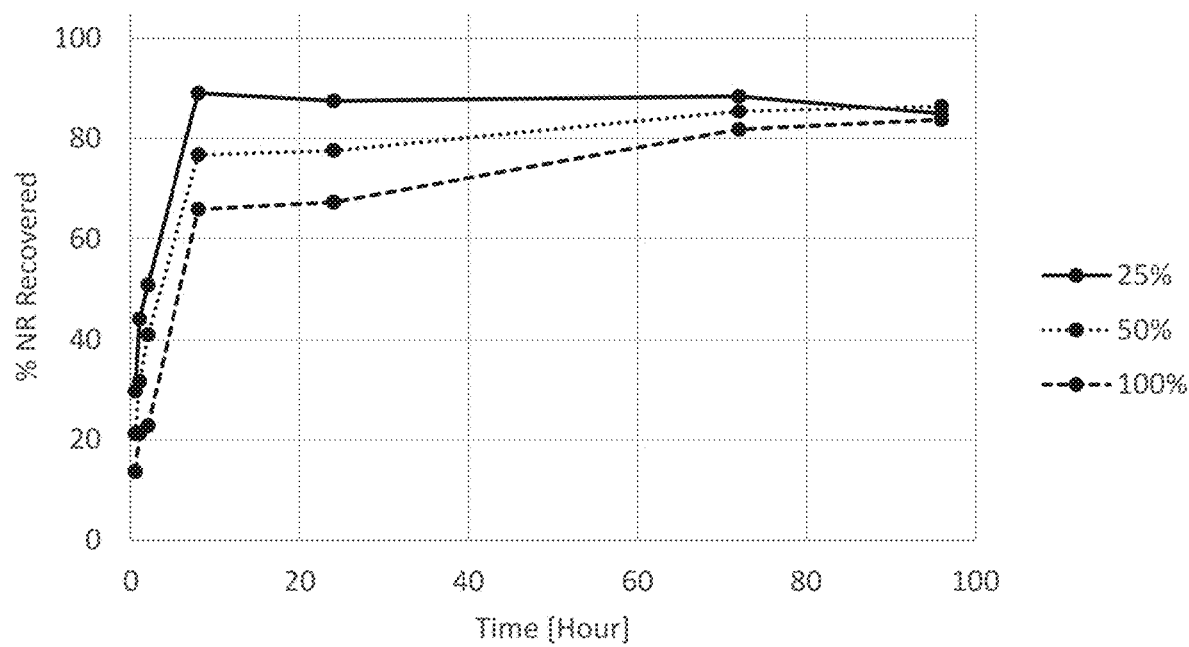
FIG. 16 depicts, in another embodiment, a graph of NR-Cl released from sunflower oil coated 25% wt/wt NR-Cl palm oil prills, with 100, 50, and 25% weight gain from sunflower oil coating, during 96 hour time course study in water.

The release of NR-Cl from the sunflower-oil-coated palm oil prills was tested by adding the materials to water and analyzing for NR-Cl concentration in the water during a time course study (Table 9 and FIG. 16). All three coated prills demonstrated increased NR-Cl retention over the uncoated prill (FIG. 15), only releasing approximately 85% of the NR-Cl in each formulation over 96 hours. It is noted that the formulation with the thickest coating demonstrated the greatest delayed release of NR-Cl.

TABLE 9

| | Weight Gain of Sunflower Oil Coating (wt/wt) | | |
|---|---|---|---|
| Time (hours) | 100% | 25% | 50% |
| 0.5 | 14 | 30 | 21 |
| 1 | 21 | 44 | 32 |
| 2 | 23 | 51 | 41 |
| 8 | 66 | 89 | 77 |
| 24 | 67 | 88 | 78 |
| 72 | 82 | 88 | 85 |
| 96 | 84 | 85 | 86 |

Table 9 shows the percentage of NR-Cl recovered from NR-Cl containing Wax Prills in a water time course study.

Example 4C

Figure 17:
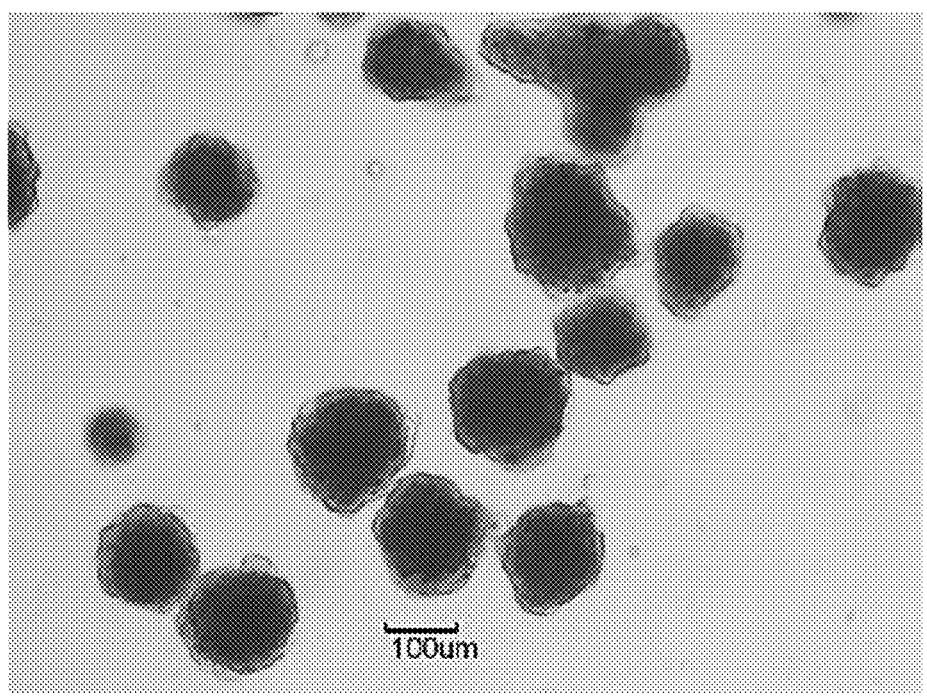
FIG. 17 is a light photomicrograph of 12.5% wt/wt NR-Cl containing palm oil prill with sunflower oil coating showing a resolution of about 100μ.

Four formulations were made using a 25% NR-Cl (wt/wt) base prill with an outer coating adding 100% weight gain using the following combinations of oil: sunflower prill with sunflower coating, palm prill with sunflower coating, sunflower prill with palm coating, palm prill with palm coating. The final particle size ranges were approximately 100-400 μm (FIG. 17). A fifth coated prill with a palm oil base prill and palm oil coating had agglomerated particles with a size range of approximately 150-550 μm. All five formulations had a final NR-Cl content of 12.5% (wt/wt) and a water content <0.2% (wt/wt).

Figure 18:
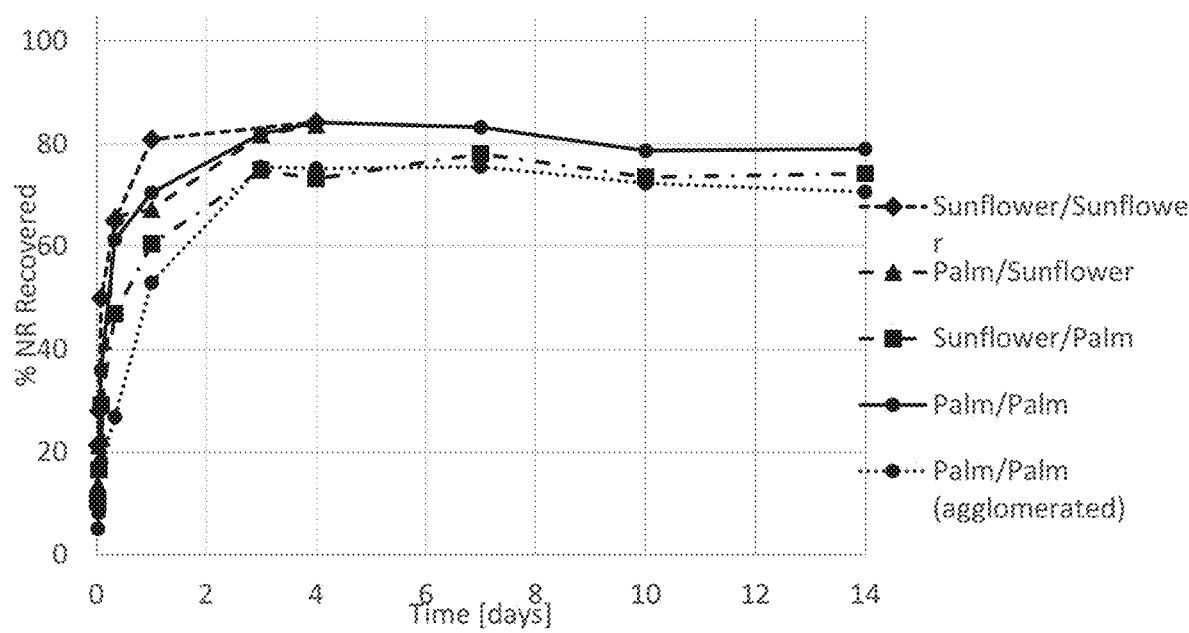
FIG. 18 depicts, in another embodiment, a graph of NR-Cl released from 12.5% wt/wt NR-Cl coated prills during 14 day time course study in water (formulation nomenclature: base prill oil/coating oil).

The release of NR-Cl from the coated prills was tested by adding the materials to water and analyzing for NR-Cl concentration in the water during a time course study (Table 10 and FIG. 18). After up to 14 days, 15-25% of the NR-Cl was still retained within the formulations and protected from the aqueous environment. The palm oil formulation which had agglomerated particles exhibited the most delayed release of NR-Cl.

TABLE 10

| | Formulation: Prill Oil/Coating Oil | | | | |
|---|---|---|---|---|---|
| Time (days) | Sunflower/ Sunflower | Palm/ Sunflower | Sunflower/ Palm | Palm/ Palm | Palm/Palm (agglom-erated) |
| 0.02 | 21 | 14 | 10 | 12 | 5 |
| 0.04 | 28 | 21 | 17 | 21 | 8 |
| 0.08 | 50 | 23 | 29 | 36 | 18 |
| 0.33 | 65 | 66 | 47 | 61 | 27 |
| 1 | 81 | 67 | 61 | 71 | 53 |
| 3 | Not Tested | 82 | 75 | 82 | 76 |
| 4 | 84 | 84 | 73 | 84 | 75 |
| 7 | Not Tested | Not Tested | 78 | 83 | 78 |
| 10 | Not Tested | Not Tested | 74 | 79 | 74 |
| 14 | Not Tested | Not Tested | 74 | 79 | 74 |

Table 10 shows the percentage of NR-Cl recovered from NR-Cl containing Wax Prills having a coating in a water time course study.

Example 5

Wax Prills Cryoground

NR-Cl was incorporated by hand into three different waxes including Carnauba, Dritex C (cottonseed, available from Stratas Foods, LLC, Memphis, Tennessee), and Dritex S (soybean, available from Stratas Foods, LLC) at 5%, 15%, and 30% NR-Cl (wt/wt) to form solid pucks. The 30% NR-Cl pucks were frozen in liquid nitrogen and cryoground in a blender into prills approximately 1-4 mm in size. The prills had <0.2% water wt/wt.

Figure 19:
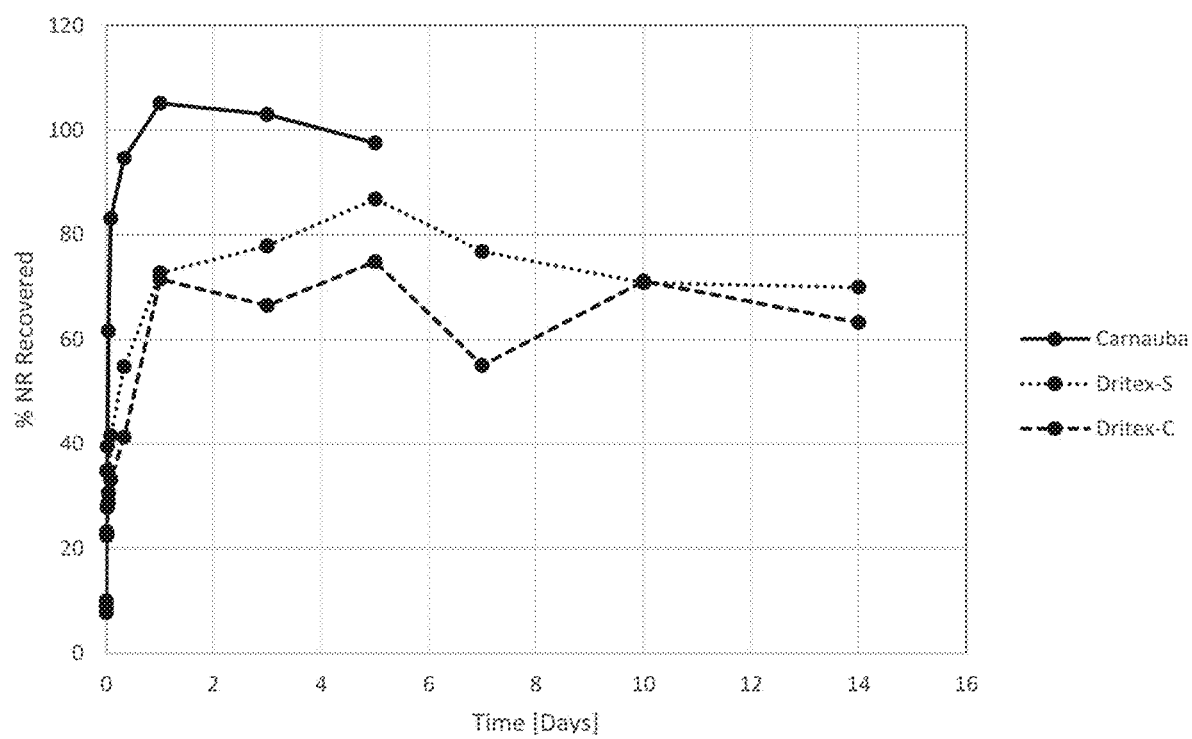
FIG. 19 depicts, in another embodiment, a graph of NR-Cl released from cryoground NR-Cl Wax Prills during time course study in water.
Figure 20:
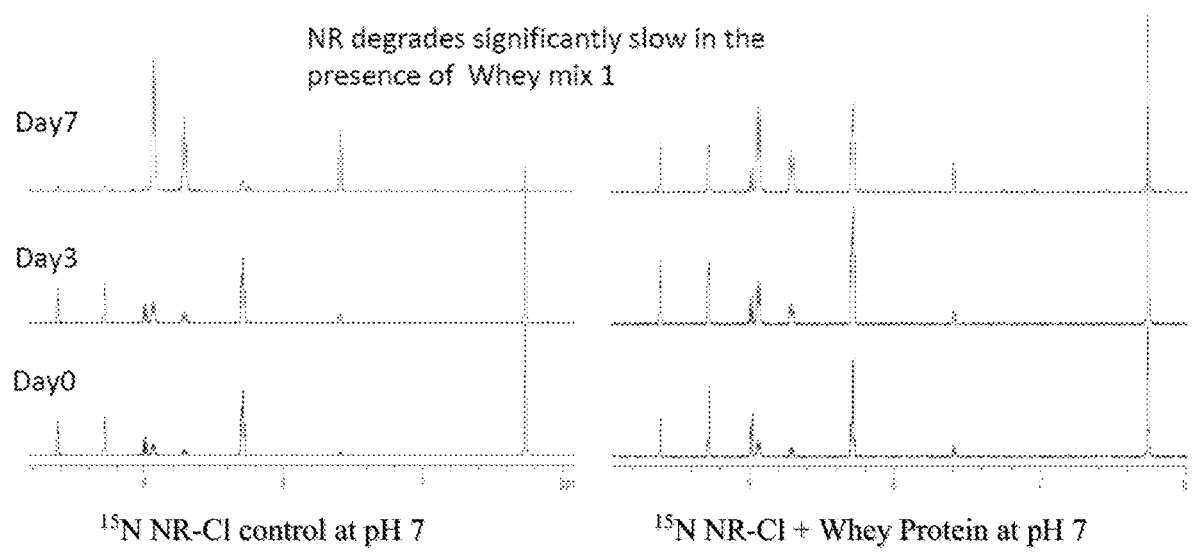
FIG. 20 depicts, in another embodiment, a $^1H$-$^{15}N$-HMBC NMR experiment showing degradation data for $^{15}N$ NR-Cl with and without Whey protein at pH 7 for Day 1, 3 and 7 days.
Figure 21:
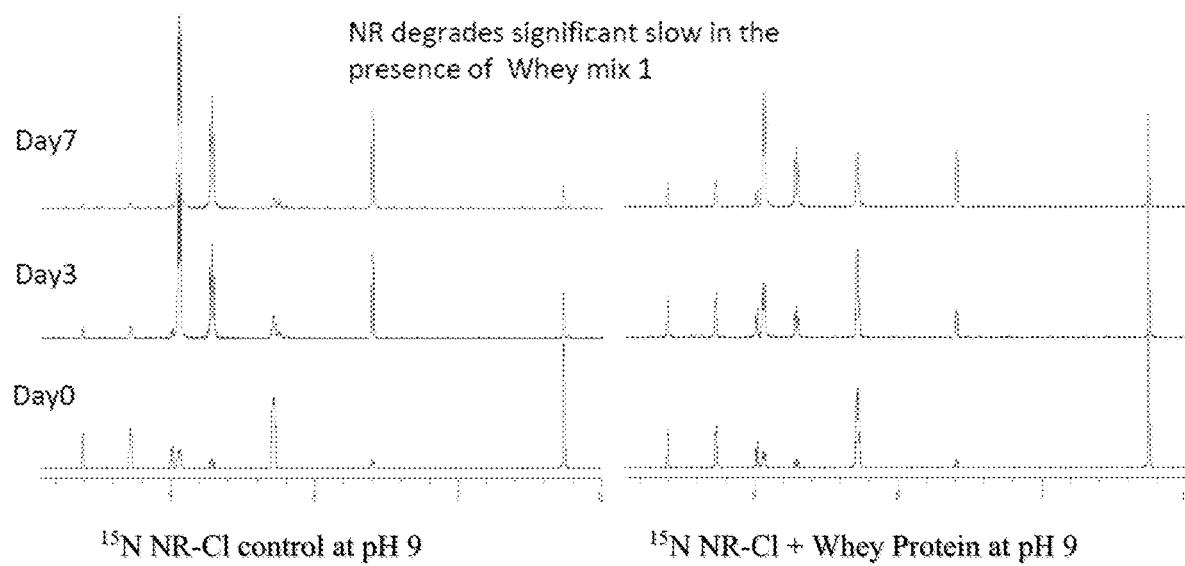
FIG. 21 depicts, in another embodiment, a $^1H$-$^{15}N$-HMBC NMR experiment showing degradation data for $^{15}N$ NR-Cl with and without Whey protein at pH 9 for Day 1, 3 and 7 days.
Figure 22:
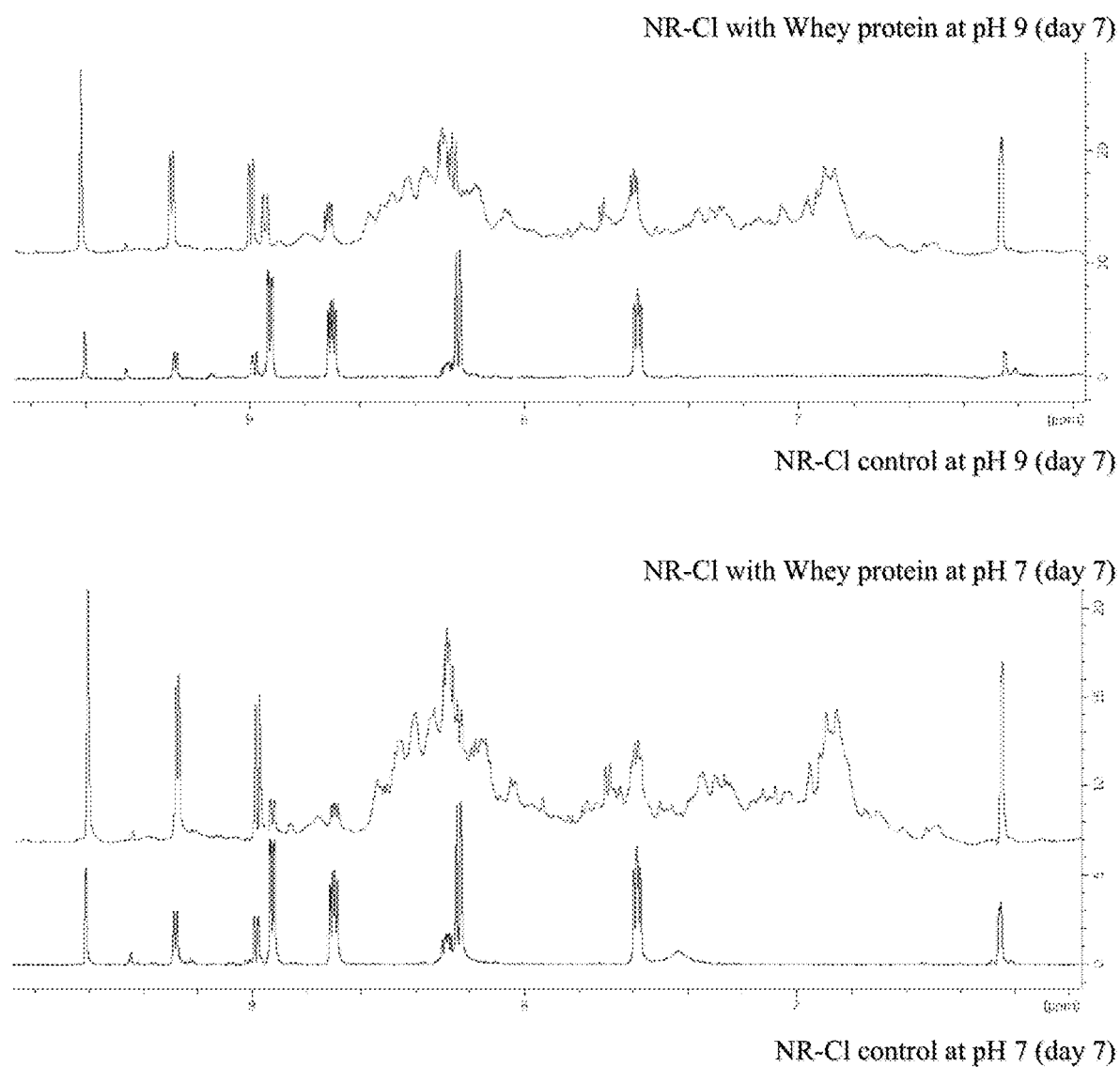
FIG. 22 depicts, in another embodiment, a comparison of 1D $^1H$-NMR spectra of NR at pH 7 and 9 with and without Whey protein after 7 days. NR-Cl (*) and nicotinamide (#).

To test the release of NR-Cl from the 30% NR-Cl prills, the prills were added to water and analyzed for NR-Cl concentration in the water during a time course study (Table 11 and FIG. 19). The prills exhibited a significant delayed release profile where the NR-Cl concentration increased slowly in the water over the first 24 hours before reaching at or near an equilibrium. After 14 days, approximately 30% of the NR-Cl was still retained within the prills and protected from the aqueous environment in the Dritex S and Dritex C formulations.

TABLE 11

| | % NR-Cl Recovered | | |
|---|---|---|---|
| Time (days) | Carnauba | Dritex S | Dritex C |
| 1 min | 8 | 9 | 10 |
| 15 min | 35 | 23 | 22 |
| 30 min | 40 | 28 | 28 |
| 1 hr | 62 | 31 | 29 |
| 2 hr | 83 | 42 | 33 |
| 8 hr | 95 | 55 | 41 |
| 1 | 105 | 73 | 72 |
| 3 | 103 | 78 | 66 |
| 5 | 98 | 87 | 75 |
| 7 | Not Tested | 77 | 55 |
| 10 | Not Tested | 71 | 71 |
| 14 | Not Tested | 70 | 63 |

Table 11 shows the percentage of NR-Cl recovered from NR-Cl containing Wax Prills in a water time course study. A significant proportion of NR-Cl was retained within the prills after 14 days indicating outstanding time release properties.

Example 6

NMR Spectroscopy. A range of NMR experimentation including WaterLOGSY, $^{15}N$-$^{1}H$ HMBC and 1D $^{1}H$-NMR were used to determine the stability of NR-Cl under aqueous conditions and screening for its binding to Milk and Soy based proteins, in this example and the next.

A series of 1D $^{1}H$ and 1D $^{15}N$-$^{1}H$ HMBC experiments were collected on a 600 MHz Bruker instrument with 5-mm cryoprobe and using 5-mm NMR tubes. Each sample contains ~10 mM $^{15}N$ isotope labeled NR-Cl (or non-isotope), in a solution containing ~0.5 mL 90% $H_2O$/10% $^{2}H_2O$ buffered at pH values of 7.0 (5 mM PBS) and 9.0 (50 mM Glycine/Sodium hydroxide), with or without whey protein. The NMR tube was incubated at 25° C. and data collected at 1, 3 and 7 days. The NMR results provided evidence of binding to milk and soy protein and provided evidence of increased stability in combination with Whey protein at different pH over a 7 day time-course.

Degradation of $^{15}N$ NR-Cl to $^{15}N$ Nicotinamide is shown as in Scheme 3.

Scheme 3

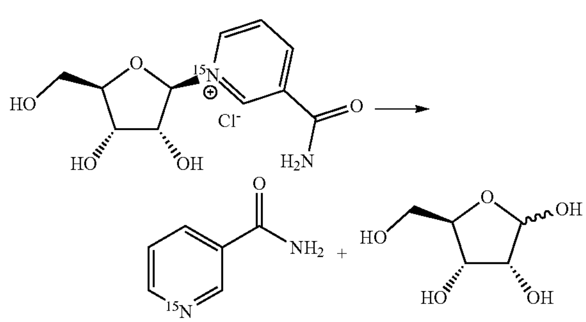

Degradation tracking experiments were carried out as above.

The data gathered for the $^{15}N$-$^{1}H$ HMBC, showed that the protein signals could be hidden while the $^{15}N$ isotope of NR-Cl could be used to clearly visualize and track the degradation of $^{15}N$ NR-Cl. $^{15}N$-$^{1}H$ HMBC spectra were optimized for degradation tracking of $^{15}N$ NR-Cl to $^{15}N$ nicotinamide (Scheme 3) in Whey protein with cnst13=10 Hz, providing the best S/N ratio.

1D$^{15}N$-$^{1}H$ HMBC NMR data (FIGS. 20 and 21) shows the degradation of $^{15}N$ NR-Cl to $^{15}N$ nicotinamide, with and without Whey protein, at pH 7.0 and 9.0 over days 1, 3 and 7. The rate of degradation in the presence of Whey protein was slower than the control under both sets of conditions providing evidence for the Whey protein stabilizing effect on $^{15}N$ NR-Cl. FIG. 22 highlights the corresponding $^{1}H$-NMR data for the increased stability of the NR-Cl at day 7 under pH 7 and 9 buffered conditions, compared to control.

The integrations for the peaks corresponding to $^{15}N$ NR-Cl and $^{15}N$ nicotinamide were measured for the degradation that had occurred to $^{15}N$—NR-Cl from Day 1 to Day 7. From this degradation data, the half-life for $^{15}N$ NR-Cl in buffered pH 7 conditions- improved from 3.4 days (control) to 28 days in the presence of Whey protein. The half-life for $^{15}$N NR-Cl in buffered pH 9 conditions- improved from 2.7 days (control) to 10 days in the presence of Whey protein.

The degradation data indicates that NR as described herein degrades faster with pH increases and Whey protein significantly slows down the degradation of NR.

Example 7

WaterLOGSY is a sensitive ligand-observed NMR experiment designed for the screening of protein ligands from a mixture of potential binders. In the WaterLOGSY experiment, compounds that bind to the target protein often give positive resonances (i.e. have the same sign as the protein resonances), and compounds that do not interact with the protein usually give negative resonances. The experiment relies on fast dissociation of bound ligands to carry into the free state magnetisation originating from irradiated water that has been transmitted via the protein complex.

NMR samples for WaterLOGSY were prepared as follows. Ligand-detect WaterLOGSY experiments were carried at 600 MHz with 5-mm cryoprobe and using 5-mm NMR tubes. Each NMR sample for WaterLOGSY contained ~0.05 mg (~0.35 mM), using unlabeled ligand NR-Cl ("NR"), in a NMR buffer containing ~0.5 mL 90% $H_2O$/10% $^2H_2O$ at pH 7.0 with or without the milk and soy protein mix (compared to the WaterLOGSY of NR as a negative control). Protein was added as a powder with a minimal 15 to 50 μM concentration. Typically, the final NMR sample of protein-compound mixtures had >20-fold higher compound concentration of ligand compared to that of the protein. Denatured samples were prepared by simply heating (80° C. for 15-20 mins) the aqueous (5-10% $^2H_2O$) protein mixture (in absence of NR).

Figure 23:
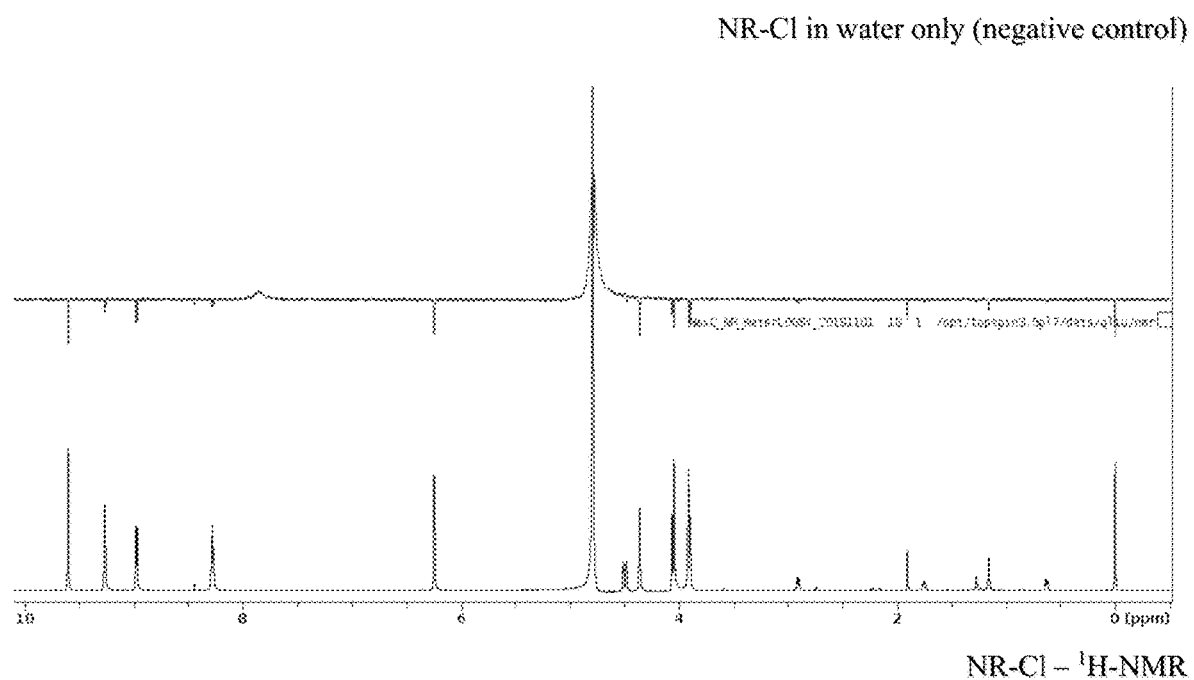
FIG. 23 depicts, in another embodiment, a WaterLOGSY NMR experiment showing NR-Cl in water only (top spectrum) vs 1D $^1H$-NMR (bottom spectrum) at pH 7.0.
Figure 24:
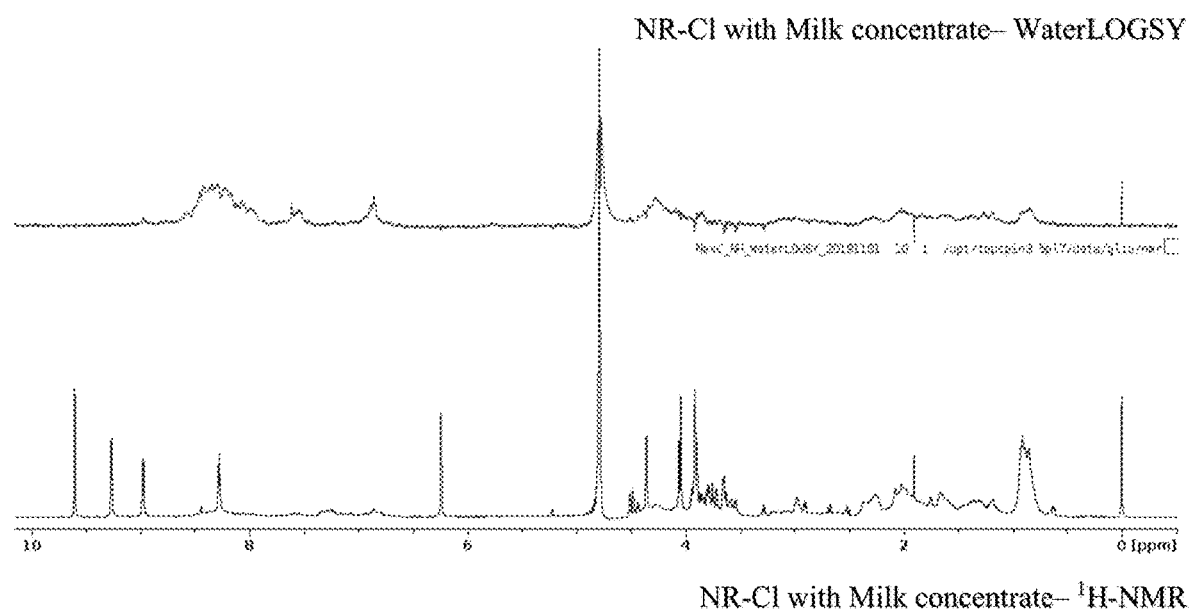
FIG. 24 depicts, in another embodiment, a WaterLOGSY NMR experiment showing NR-Cl with Milk concentrate (top spectrum) vs 1D $^1H$-NMR (bottom spectrum) at pH 7.0.
Figure 25:
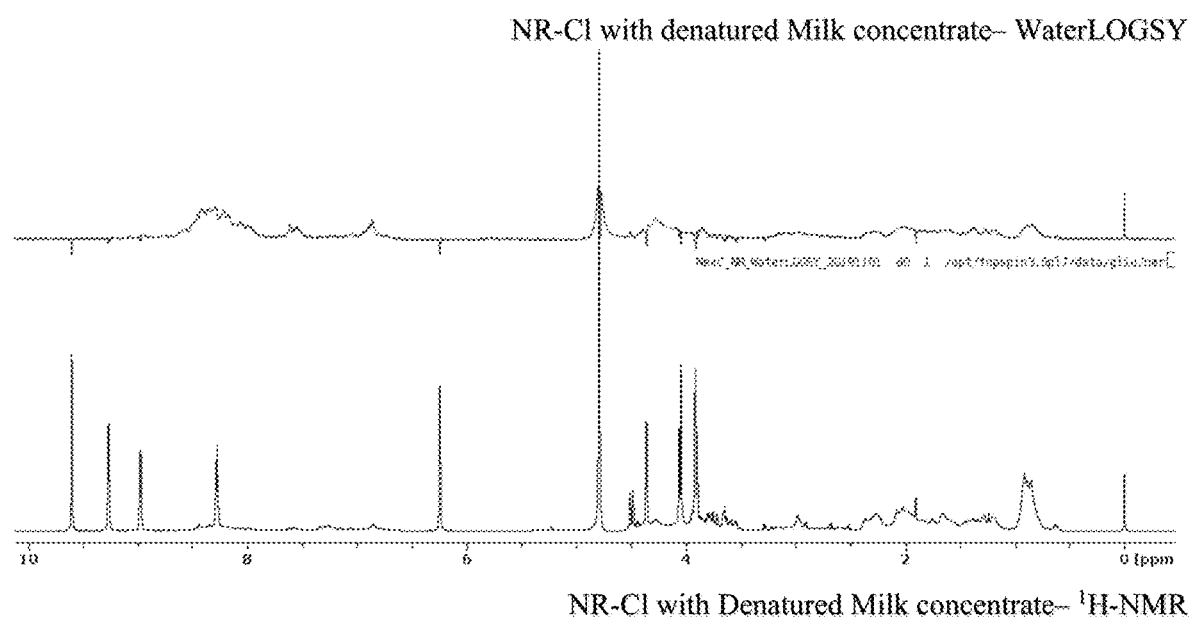
FIG. 25 depicts, in another embodiment, a WaterLOGSY NMR experiment showing NR-Cl with Denatured Milk concentrate (top spectrum) vs 1D $^1H$-NMR (bottom spectrum) at pH 7.0.

The NR only WaterLOGSY spectrum (FIG. 23) was the negative control to screen for any potential binding of NR-Cl to milk concentrate and soy isolate proteins as shown herein and discussed below. FIG. 24 shows that with a lack of negative peaks for the WaterLOGSY of NR-Cl with milk concentrate that there was evidence of positive binding. Denaturing the milk concentrate proteins provided evidence for decreased binding with NR-Cl (FIG. 25).

Figure 26:
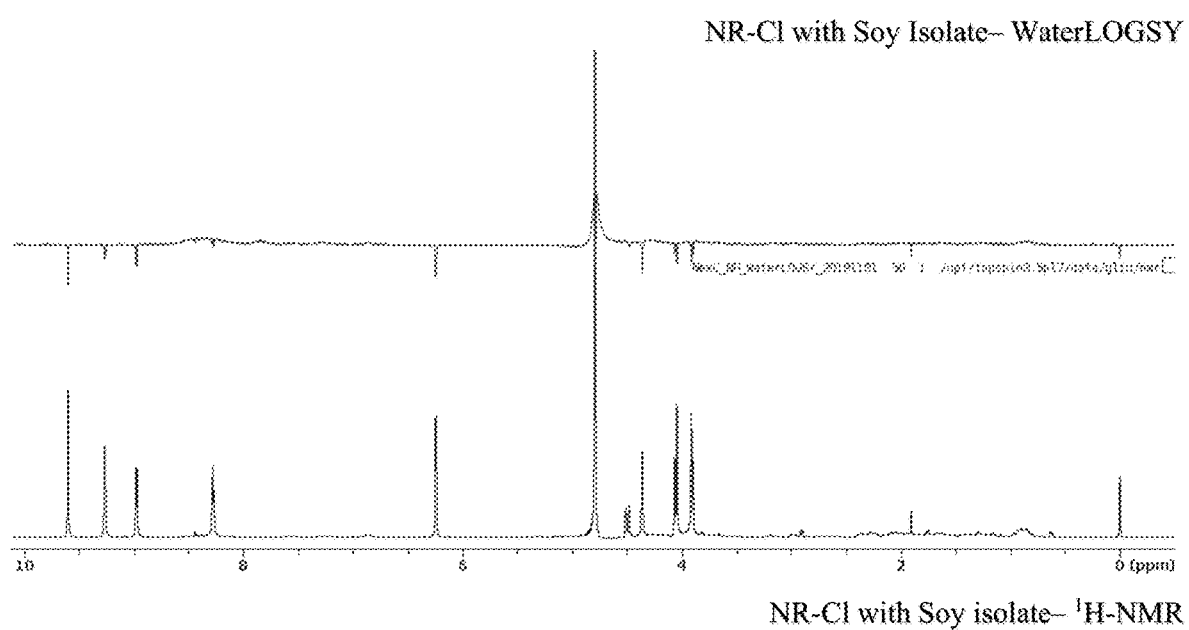
FIG. 26 depicts, in another embodiment, a WaterLOGSY NMR experiment showing NR-Cl with Soy isolate (top spectrum) vs 1D $^1H$-NMR (bottom spectrum) at pH 7.0.
Figure 27:
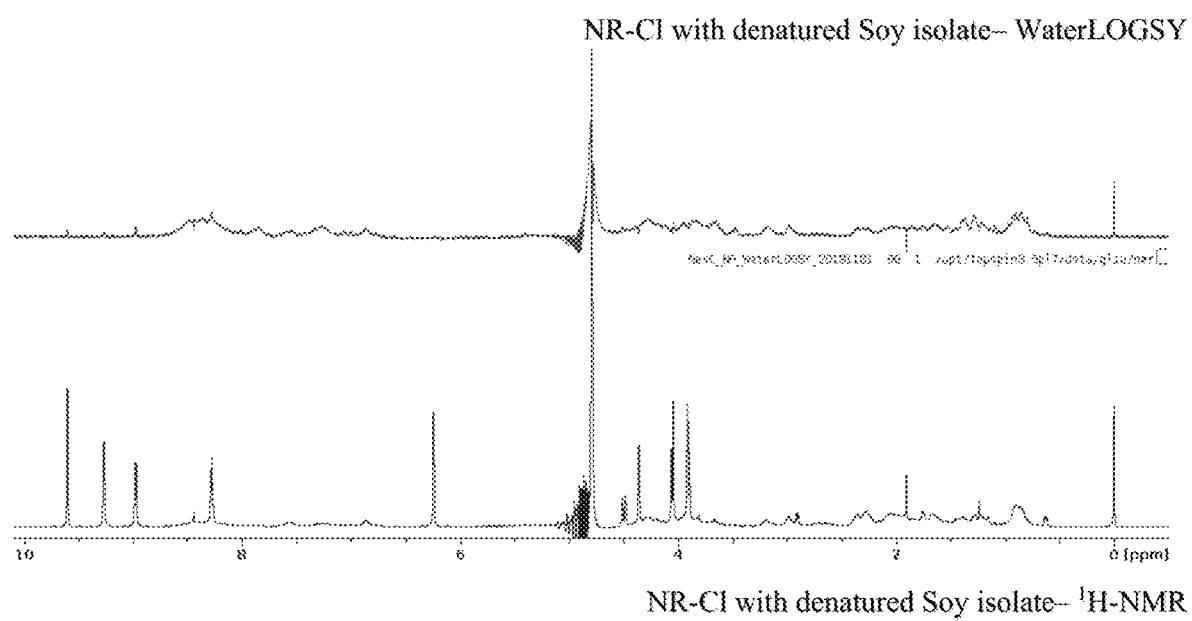
FIG. 27 depicts, in another embodiment, a WaterLOGSY NMR experiment showing NR-Cl with Denatured Soy isolate (top spectrum) vs 1D $^1H$-NMR (bottom spectrum) at pH 7.0.

In contrast, soy protein isolate showed an increase in binding with NR-Cl only after denaturation (FIGS. 26 and 27).

Figure 28:
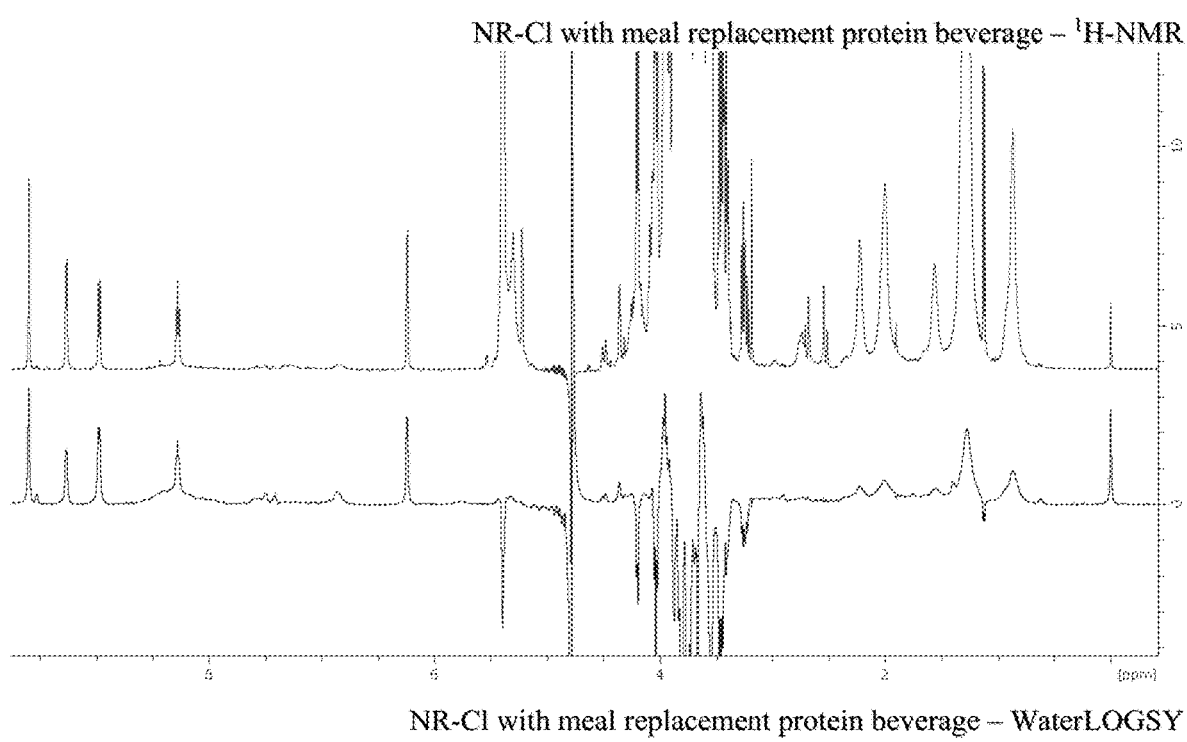
FIG. 28 depicts, in another embodiment, a WaterLOGSY NMR experiment showing NR-Cl with meal replacement protein beverage (bottom spectrum) vs $^1H$-NMR (top spectrum).

The strongest evidence of NR binding was observed to the protein components of a meal replacement beverage (FIG. 28). The beverage that was tested contained soy protein isolate and milk protein concentrate and it could only be either of these ingredients that could contribute to the positive result that was observed. Hence, we measured WaterLOGSY binding for each isolated protein mixture (soy isolate and milk concentrate) to see which may be responsible for the binding and potential stabilization of NR. However, the binding of milk and soy proteins individually did not prove to be as strong when compared to the beverage mixture. We observed comparatively weaker binding for milk protein concentrate (FIG. 24) and evidence of binding for soy isolate only when it was denatured (FIG. 27). It must be noted that the sources used for the milk and soy protein were not the same used in the meal replacement beverage.

The above study provides some rationale as to why soy protein and other proteins were tested for binding with NR.

Based on the studies described herein, it is therefore expected that, NR-Cl, or other derivatives such as NAR, NaMN, or NMN can be formulated in more stable forms including wax prills, encapsulated alginates, or protein beverages.

The use of the terms "a," "an," "the," and similar referents in the context of describing the presently claimed invention (especially in the context of the claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Use of the term "about" is intended to describe values either above or below the stated value in a range of approximately ±10%; in other embodiments the values may range in value either above or below the stated value in a range of approximately ±5%; in other embodiments the values may range in value either above or below the stated value in a range of approximately ±2%; in other embodiments the values may range in value either above or below the stated value in a range of approximately ±1%. The preceding ranges are intended to be made clear by context, and no further limitation is implied. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

While in the foregoing specification this invention has been described in relation to certain embodiments thereof, and many details have been put forth for the purpose of illustration, it will be apparent to those skilled in the art that the invention is susceptible to additional embodiments and that certain of the details described herein can be varied considerably without departing from the basic principles of the invention.

All references cited herein are incorporated by reference in their entireties. The present invention may be embodied in other specific forms without departing from the spirit or essential attributes thereof and, accordingly, reference should be made to the appended claims, rather than to the foregoing specification, as indicating the scope of the invention.

We claim:

1. An edible composition comprising agglomerated stabilized wax coated wax prills comprising:
    one or more nicotinyl riboside compounds selected from the group consisting of nicotinamide riboside (NR, I), nicotinic acid riboside (NAR, II), nicotinamide mononucleotide (NMN, III), nicotinic acid mononucleotide (NaMN, IV), reduced nicotinamide riboside (NRH, V), reduced nicotinic acid riboside (NARH, VI), NR triacetate (NRTA, VII), NAR triacetate (NARTA, VIII), NRH triacetate (NRH-TA, IX), NARH triacetate (NARH-TA, X), and salts or mixtures thereof;
    wherein the agglomerated wax coated wax prills comprise an edible oil and/or wax suitable for prilling and stabilizing the compounds,
    wherein the edible oil and/or wax is selected from the group consisting of palm oil, sunflower oil, carnauba wax, cottonseed oil, soybean oil, cocoa butter, paraffin wax, bees wax, high oleic safflower oil, soy oil, fractionated coconut oil, medium chain triglycerides, MCT oil, high oleic sunflower oil, corn oil, canola oil, coconut oil, palm kernel oil, marine oil, walnut oil, wheat germ oil, sesame oil, cod liver oil, candelilla wax, palm stearin, rapeseed oil, glycerol dibehenate, glycerol distearate, peanut oil, and mixtures thereof, wherein the edible composition has a wax coating as an outer layer, wherein said outer layer wax coating adds from about 100% by weight to about 500% by weight based on the total weight of the wax coated wax prills, and wherein the agglomerated wax coated wax prills have an average particle size from greater than about 500 microns to about 6,000 microns.

2. The edible composition of claim 1, wherein the agglomerated wax coated wax prills have an average particle size from greater than about 500 microns to about 4,000 microns.

3. The edible composition of claim 1, wherein the amount of nicotinyl riboside compound is from about 0.1% by weight to about 30% by weight, based on the total weight of the wax coated wax prills.

4. The edible composition of claim 3, wherein the amount of nicotinyl riboside compound is from about 10% by weight to about 25% by weight, based on the total weight of the wax coated wax prills.

5. The edible composition of claim 4, wherein the nicotinyl riboside compound is nicotinamide riboside chloride.

6. The edible composition of claim 1, wherein the wax coating comprises an edible oil and/or wax selected from the group consisting of palm oil, sunflower oil, carnauba wax, cottonseed oil, soybean oil, cocoa butter, paraffin wax, bees wax, high oleic safflower oil, soy oil, fractionated coconut oil, medium chain triglycerides, MCT oil, high oleic sunflower oil, corn oil, canola oil, coconut oil, palm kernel oil, marine oil, walnut oil, wheat germ oil, sesame oil, cod liver oil, candelilla wax, palm stearin, rapeseed oil, glycerol dibehenate, glycerol distearate, peanut oil, and mixtures thereof.

7. The edible composition of claim 6, wherein the wax coating has a thickness of greater than about 500 microns to about 6,000 microns.

8. The edible composition of claim 6, wherein the agglomerated wax coated wax prills have an average particle size from greater than about 500 microns to about 3,000 microns.

9. The edible composition of claim 6, wherein the agglomerated wax coated wax prills have an average particle size from greater than about 500 microns to about 1,000 microns.

10. The edible composition of claim 1, wherein the wax coated wax prills are mechanically ground or sheared to an average particle size of greater than about 500 microns to about 4,000 microns.

11. The edible composition of claim 1, further comprising one or more compounds selected from the group consisting of vitamin B1 (thiamine, XII), vitamin B2 (riboflavin, XIII), vitamin B6 (pyridoxine, XIV), vitamin B7 (biotin, XV), vitamin B9 (folic acid, XVI), vitamin B12 (cobalamin, XVII), vitamin $A_1$ (retinol, XVIII), vitamin C (ascorbic acid, XIX), vitamin D3 (cholecalciferol, XX), vitamin D2 (ergocalciferol, XXI), vitamin E (alpha-tocopherol, XXII), vitamin K1 (phytomenadione, XXIII), Co-Q10, tryptophan, alanine, arginine, asparagine, aspartic acid, cysteine, glutamine, glutamic acid, glycine, histidine, iso-leucine, leucine, lysine, methionine, phenylalanine, proline, serine, threonine, tyrosine, valine, selenocysteine, pyrrolysine, EGCG (epigallocatechin gallate), cycloastragenol, beta-alanine, l-carnitine, omega-3 fatty acids, PQQ (pyrroloquinoline quinone), curcumin, methyl nicotinate, nitrate, and mixtures thereof.

* * * * *